(12) United States Patent
Gietzen et al.

(10) Patent No.: US 12,272,050 B2
(45) Date of Patent: Apr. 8, 2025

(54) DEEP LEARNING-BASED ROOT CAUSE ANALYSIS OF PROCESS CYCLE IMAGES

(71) Applicant: Illumina, Inc., San Diego, CA (US)

(72) Inventors: Kimberly Jean Gietzen, San Diego, CA (US); Jingtao Liu, San Diego, CA (US); Yifeng Tao, Pittsburg, PA (US)

(73) Assignee: Illumina, Inc., San Diego, CA (US)

( * ) Notice: Subject to any disclaimer, the term of this patent is extended or adjusted under 35 U.S.C. 154(b) by 334 days.

(21) Appl. No.: 17/588,077

(22) Filed: Jan. 28, 2022

(65) Prior Publication Data

US 2022/0245801 A1    Aug. 4, 2022

Related U.S. Application Data

(60) Provisional application No. 63/143,673, filed on Jan. 29, 2021.

(51) Int. Cl.
*G06T 7/00* (2017.01)
*G01N 21/64* (2006.01)
(Continued)

(52) U.S. Cl.
CPC ....... *G06T 7/0012* (2013.01); *G01N 21/6428* (2013.01); *G01N 21/6456* (2013.01);
(Continued)

(58) Field of Classification Search
CPC ............... G06T 7/0012; G06T 3/40; G06T 2207/10064; G06T 2207/20132;
(Continued)

(56) References Cited

U.S. PATENT DOCUMENTS

2004/0240718 A1   12/2004  Mori
2010/0111396 A1    5/2010  Boucheron
(Continued)

FOREIGN PATENT DOCUMENTS

CN    110930347 A    3/2020
EP      3054279 A1    8/2016
(Continued)

OTHER PUBLICATIONS

Chang et al., Wafer defect inspection by neural analysis of region features, journal of intelligent manufacturing, kluwer academic publishers, BO, vol. 22, No. 6, dated Dec. 23, 2009, pp. 953-964, 12 pages.

(Continued)

*Primary Examiner* — John J Lee
(74) *Attorney, Agent, or Firm* — Flaster Greenberg P.C.

(57) ABSTRACT

The technology disclosed relates to training a convolutional neural network (CNN) to identify and classify images of sections of an image generating chip resulting in process cycle failures. The technology disclosed includes creating a training data set of images of dimensions M×N using labeled images of sections of image generating chip of dimensions J×K. The technology disclosed can fill the M×N frames using horizontal and vertical reflections along edges of J×K labeled images positioned in M×N frames. A pretrained CNN is further trained using the training data set. Trained CNN can classify a section image as normal or depicting failure. The technology disclosed can train a root cause CNN to classify process cycle images of sections causing process cycle failure. The trained CNN can classify a section image by root cause of process failure among a plurality of failure categories.

27 Claims, 34 Drawing Sheets

(51) Int. Cl.
| | |
|---|---|
| *G06N 3/08* | (2023.01) |
| *G06T 3/40* | (2006.01) |
| *G06V 10/764* | (2022.01) |
| *G06V 10/774* | (2022.01) |
| *G06V 10/82* | (2022.01) |

(52) U.S. Cl.
CPC .................. *G06N 3/08* (2013.01); *G06T 3/40* (2013.01); *G06V 10/764* (2022.01); *G06V 10/774* (2022.01); *G06V 10/82* (2022.01); *G01N 2021/6439* (2013.01); *G06T 2207/10008* (2013.01); *G06T 2207/10064* (2013.01); *G06T 2207/20132* (2013.01); *G06T 2207/30072* (2013.01); *G06V 2201/04* (2022.01)

(58) Field of Classification Search
CPC .......... G06T 2207/30072; G06V 10/82; G06V 10/774; G06V 10/764; G06N 3/08; G06N 3/40; G01N 21/6428; G01N 21/6456
See application file for complete search history.

(56) References Cited

U.S. PATENT DOCUMENTS

| | | | |
|---|---|---|---|
| 2018/0373921 | A1 | 12/2018 | Di Carlo et al. |
| 2019/0073553 | A1 | 3/2019 | Yao et al. |
| 2019/0164270 | A1 | 5/2019 | Wardell et al. |
| 2019/0213473 | A1 | 7/2019 | Dutta et al. |
| 2019/0370586 | A1* | 12/2019 | Otsuki .................. G06V 20/00 |
| 2020/0074303 | A1 | 3/2020 | Chu et al. |
| 2021/0334587 | A1 | 10/2021 | Wang |
| 2021/0383538 | A1 | 12/2021 | Deasy et al. |
| 2022/0012879 | A1 | 1/2022 | De Poly et al. |
| 2022/0091923 | A1 | 3/2022 | O'Toole et al. |
| 2022/0114593 | A1* | 4/2022 | Johnson ............ G06F 18/24133 |
| 2022/0198209 | A1* | 6/2022 | Spears ................. G06V 10/454 |

FOREIGN PATENT DOCUMENTS

| | | |
|---|---|---|
| JP | 2004361092 A | 12/2004 |
| JP | 2008284166 A | 11/2008 |
| JP | 2018005640 A | 1/2018 |
| JP | 2019159770 A | 9/2019 |
| WO | 2017106918 A1 | 6/2017 |
| WO | 2018140014 A1 | 8/2018 |
| WO | 2020081659 A1 | 4/2020 |
| WO | 2021195697 A1 | 10/2021 |

OTHER PUBLICATIONS

Hongxiang et al, The impact of padding on image classification by using pre-trained convolutional neural networks, Advances in databases and information Systems; [lecture notes in computer science], springer international publishing, vol. 11752 Chapter31, No. 558, dated Sep. 2, 2019, pp. 337-344 , 8 pages.

Muhammad et al., A Deep Convolutional Neural Network for Wafer defect identification on an imbalanced dataset in semiconductor manufacturing processes, IEEE transactions on semiconductor manufacturing, IEEE service center, vol. 33, No. 3, May 12, 2020 (May 12, 2020), pp. 436-444, 9 p. .ages.

He et. al., Deep Residual Learning for Image Recognition, in Proc. of CVPR, 2016.

Simonyan et al., Very Deep Convolutional Networks For Large-Scale Image Recognition, ICLR 2015, dated Apr. 10, 2015, 14 pages.

Deng et al., ImageNet: A large-scale hierarchical image database, published in proceedings of IEEE Conference on Computer Vision and Pattern Recognition, dated Jun. 20-25, 2009, pp. 248-255, 8 pages.

Otsu, A Threshold Selection Method from Gray-Level Histograms, IEEE Transactions on Systems, Man and Cybernetics, vol. SMC-9, No. 1, dated Jan. 1979, 5 pages.

Gonzalez et al., Section 10.3.3 Optimum Global Thresholding Using Otsu's Method, Digital Image Processing, Third edition, Pearson Prentice Hall, 2008, 7 pages.

Gonzalez et al., Digital Image Processing, Third edition, Pearson Prentice Hall, 2008, 977 pages.

Turk et al., Face Recognition Using Eigenfaces, IEEE Computer Society Conference on Computer Vision and Pattern Recognition, dated 1991, 6 pages, retrieved on Nov. 25, 2009. Retrieved from the internet [URL: https://ieeexplore.ieee.org/document/139758 ].

Navarette et al., Comparative Study between Different Eigenspace-Based Approaches for Face Recognition, Advances in Soft Computing—AFSS 2002, dated Jan. 2002, 7 pages.

Faruqe et al., Face Recognition using PCA and SVM, IEEE, dated Sep. 2009, 6 pages, retrieved on Dec. 2, 2019. Retrieved from the internet [URL: https://www.researchgate.net/publication/224599198 ].

Huang et al., Auto-validation of fluorescent primer extension genotyping assay using signal clustering and neural networks, BMC Bioinformatics, Biomed Central, London, GB, vol. 5, No. 1, dated Apr. 2, 2004. Section "Review by the neural network". Section "Methods". figures 1-4.

Poplin et. al., A universal SNP and small-indel variant caller using deep neural networks, Nature Biotechnology, dated Sep. 24, 2018, 10 pages.

Bertolini, et. al., Combined use of principal component analysis and random forests identify population-informative single nucleotide polymorphisms: application in cattle breeds, Journal of Animal Breeding and Genetics, vol. 132, No. 5, dated Mar. 17, 2015, pp. 346-356, 11 pages.

Illumina, Evaluation of Infinium Genotyping Assay Controls Training Guide, dated Jan. 1, 2012, 28 pages.

Huang et al., Auto-validation of fluorescent primer extension genotyping assay using signal clustering and neural networks, BMC Bioinformatics, dated Apr. 2, 2004, 10 pages.

Ilumina, GenomeStudio Genotyping Module v1.0 User Guide—An Integrated Platform for Data Visualization and Analysis, dated 2005-2008, 181 pages.

Illumina, Infinum Assay—Lab Setup and Procedures Guide, dated 2019, 37 pages.

Dunning et al., BeadArray expression analysis using Bioconductor, dated Nov. 5, 2019, 39 pages.

Poulsen et. al., Investigation of Parameters that Affect the Success Rate of Microarray-Based Allele-Specific Hybridization Assays, PLOS One, vol. 6—Issue 3, dated Mar. 2011, 11 pages.

Illumina, Evaluation of Infinium Genotyping Assay Controls and Transcript, 4 pages. Retrieved on Jan. 24, 2020. Retrieved from the internet [URL: https://support.illumina.com/content/dam/illumina-support/courses/eval-inf-controls/story.html ].

Dunning et al., Quality Control and Low-Level Statistical Analysis of Illumina Beadarrays, REVSTAT—Statistical Journal, vol. 4, No. 1, dated Mar. 2006, 30 pages.

Smith et al., BeadDataPackR: A Tool to Facilitate the Sharing of Raw Data from Illumina BeadArray Studies, Cancer Informatics, vol. 9, dated 2010, 11 pages.

Kuhn et al., A novel, high-performance random array platform for quantitative gene expression profiling, Genome Research, vol. 14, dated 2004, 10 pages.

U.S. Appl. No. 17/161,595, filed Jan. 28, 2021, US-2021-0241048-A1, Aug. 5, 2021, Pending.

U.S. Appl. No. 17/332,904, filed May 27, 2021, US-2021-0375398-A1, Dec. 2, 2021, Pending.

U.S. Appl. No. 17/548,424, filed Dec. 10, 2021, Pending.

PCT/US2022/014449, Jan. 28, 2022, Pending.

PCT/US2021/015906, Jan. 29, 2021, Pending.

PCT/US2021/034965, May 28, 2021, Pending.

PCT/US2022/27114, Apr. 29, 2022, Pending.

Ritchie et al., BeadArray Expression Analysis Using Bioconductor, PLOS Computational Biology—vol. 7, No. 12 dated Dec. 31, 2011, 11 pages.

Dunning et al., Analysis of Bead-level Data Using BeadArray, dated Oct. 17, 2016, 14 pages.

(56) References Cited

OTHER PUBLICATIONS

JP2008284166A, This was cited in related Japanese Application No. 2022-545420 dated Apr. 22, 2024. *The translation of Abstract, Description and Claims provided by espacenet.com*

JP2019159770A, This was cited in related Japanese Application No. 2022-545420 dated Apr. 22, 2024. *The translation of Abstract, Description and Claims provided by espacenet.com*

Fjalldal, et al., "Automated Genotyping: Combining Neural Networks and Decision Trees to Perform Robust Allele Calling", IJCNN'01. International Joint Conference on Neural Networks, Proceedings (Cat. No.01CH37222), IEE, Jul. 15, 2001, pp. A1-A6.

Namin, Sarah Taghavi, et al., "Deep phenotyping: deep learning for temporal phenotype/genotype classification", Plant Methods, vol. 14, No. 66, Aug. 4, 2018, 1-14 pages.

Takeya, et al., "Estimation of Gene Expression on Microarray by Using Mixture Distribution Modeling", 66th (2004) Collection of nationwide convention lecture papers (1), Japan, Information Processing Society of Japan, Mar. 9, 2004, pp. 201-202 (Official Copy only).

* cited by examiner

520

620

Principal Component Analysis – Top 40 Eigen Images

1270

VGG-16 Architecture

```
vgg(
  (features): Sequential(
    (0): Conv2d(3, 64, kernel_size=(3, 3), stride=(1, 1), padding=(1, 1))
    (1): ReLU(inplace=True)
    (2): Conv2d(64, 64, kernel_size=(3, 3), stride=(1, 1), padding=(1, 1))
    (3): ReLU(inplace=True)
    (4): MaxPool2d(kernel_size=2, stride=2, padding=0, dilation=1, ceil_mode=False)
    (5): Conv2d(64, 128, kernel_size=(3, 3), stride=(1, 1), padding=(1, 1))
    (6): ReLU(inplace=True)
    (7): Conv2d(128, 128, kernel_size=(3, 3), stride=(1, 1), padding=(1, 1))
    (8): ReLU(inplace=True)
    (9): MaxPool2d(kernel_size=2, stride=2, padding=0, dilation=1, ceil_mode=False)
    (10): Conv2d(128, 256, kernel_size=(3, 3), stride=(1, 1), padding=(1, 1))
    (11): ReLU(inplace=True)
    (12): Conv2d(256, 256, kernel_size=(3, 3), stride=(1, 1), padding=(1, 1))
    (13): ReLU(inplace=True)
    (14): Conv2d(256, 256, kernel_size=(3, 3), stride=(1, 1), padding=(1, 1))
    (15): ReLU(inplace=True)
    (16): MaxPool2d(kernel_size=2, stride=2, padding=0, dilation=1, ceil_mode=False)
    (17): Conv2d(256, 512, kernel_size=(3, 3), stride=(1, 1), padding=(1, 1))
    (18): ReLU(inplace=True)
    (19): Conv2d(512, 512, kernel_size=(3, 3), stride=(1, 1), padding=(1, 1))
    (20): ReLU(inplace=True)
    (21): Conv2d(512, 512, kernel_size=(3, 3), stride=(1, 1), padding=(1, 1))
    (22): ReLU(inplace=True)
    (23): MaxPool2d(kernel_size=2, stride=2, padding=0, dilation=1, ceil_mode=False)
    (24): Conv2d(512, 512, kernel_size=(3, 3), stride=(1, 1), padding=(1, 1))
    (25): ReLU(inplace=True)
    (26): Conv2d(512, 512, kernel_size=(3, 3), stride=(1, 1), padding=(1, 1))
    (27): ReLU(inplace=True)
    (28): Conv2d(512, 512, kernel_size=(3, 3), stride=(1, 1), padding=(1, 1))
    (29): ReLU(inplace=True)
    (30): MaxPool2d(kernel_size=2, stride=2, padding=0, dilation=1, ceil_mode=False)
  )
  (avgpool): AdaptiveAvgPool2d(output_size=(7, 7))
  (classifier): Sequential(
    (0): Linear(in_features=25088, out_features=4096, bias=True)
    (1): ReLU(inplace=True)
    (2): Dropout(p=0.5, inplace=False)
    (3): Linear(in_features=4096, out_features=4096, bias=True)
    (4): ReLU(inplace=True)
    (5): Dropout(p=0.5, inplace=False)
    (6): Linear(in_features=4096, out_features=2, bias=True)
  )
)
```

- conv 1 1220: layers (0)–(3)
- conv 2 1222: layers (5)–(8)
- conv 3 1224: layers (10)–(15)
- conv 4 1226: layers (17)–(22)
- conv 5 1228: layers (24)–(29)
- fc 6 1240: classifier (0)–(2)
- fc 7 1242: classifier (3)–(5)
- fc 8 1244: classifier (6)

FIG. 12C

ResNet-18 Architecture (1/2)

```
ResNet(
  (conv1): Conv2d(3, 64, kernel_size=(7, 7), stride=(2, 2), padding=(3, 3), bias=False)
  (bn1): BatchNorm2d(64, eps=1e-05, momentum=0.1, affine=True, track_running_stats=True)
  (relu): ReLU(inplace=True)
  (maxpool): MaxPool2d(kernel_size=3, stride=2, padding=1, dilation=1, ceil_mode=False)
  (layer1): Sequential(
    (0): BasicBlock(
      (conv1): Conv2d(64, 64, kernel_size=(3, 3), stride=(1, 1), padding=(1, 1), bias=False)
      (bn1): BatchNorm2d(64, eps=1e-05, momentum=0.1, affine=True, track_running_stats=True)
      (relu): ReLU(inplace=True)
      (conv2): Conv2d(64, 64, kernel_size=(3, 3), stride=(1, 1), padding=(1, 1), bias=False)
      (bn2): BatchNorm2d(64, eps=1e-05, momentum=0.1, affine=True, track_running_stats=True)
    )
    (1): BasicBlock(
      (conv1): Conv2d(64, 64, kernel_size=(3, 3), stride=(1, 1), padding=(1, 1), bias=False)
      (bn1): BatchNorm2d(64, eps=1e-05, momentum=0.1, affine=True, track_running_stats=True)
      (relu): ReLU(inplace=True)
      (conv2): Conv2d(64, 64, kernel_size=(3, 3), stride=(1, 1), padding=(1, 1), bias=False)
      (bn2): BatchNorm2d(64, eps=1e-05, momentum=0.1, affine=True, track_running_stats=True)
    )
  )
  (layer2): Sequential(
    (0): BasicBlock(
      (conv1): Conv2d(64, 128, kernel_size=(3, 3), stride=(2, 2), padding=(1, 1), bias=False)
      (bn1): BatchNorm2d(128, eps=1e-05, momentum=0.1, affine=True, track_running_stats=True)
      (relu): ReLU(inplace=True)
      (conv2): Conv2d(128, 128, kernel_size=(3, 3), stride=(1, 1), padding=(1, 1), bias=False)
      (bn2): BatchNorm2d(128, eps=1e-05, momentum=0.1, affine=True, track_running_stats=True)
      (downsample): Sequential(
        (0): Conv2d(64, 128, kernel_size=(1, 1), stride=(2, 2), bias=False)
        (1): BatchNorm2d(128, eps=1e-05, momentum=0.1, affine=True, track_running_stats=True)
      )
    )
    (1): BasicBlock(
      (conv1): Conv2d(128, 128, kernel_size=(3, 3), stride=(1, 1), padding=(1, 1), bias=False)
      (bn1): BatchNorm2d(128, eps=1e-05, momentum=0.1, affine=True, track_running_stats=True)
      (relu): ReLU(inplace=True)
      (conv2): Conv2d(128, 128, kernel_size=(3, 3), stride=(1, 1), padding=(1, 1), bias=False)
      (bn2): BatchNorm2d(128, eps=1e-05, momentum=0.1, affine=True, track_running_stats=True)
    )
  )
```

ResNet-18 Architecture (2/2)

```
(layer3): Sequential(
  (0): BasicBlock(
    (conv1): Conv2d(128, 256, kernel_size=(3, 3), stride=(2, 2), padding=(1, 1), bias=False)
    (bn1): BatchNorm2d(256, eps=1e-05, momentum=0.1, affine=True, track_running_stats=True)
    (relu): ReLU(inplace=True)
    (conv2): Conv2d(256, 256, kernel_size=(3, 3), stride=(1, 1), padding=(1, 1), bias=False)
    (bn2): BatchNorm2d(256, eps=1e-05, momentum=0.1, affine=True, track_running_stats=True)
    (downsample): Sequential(
      (0): Conv2d(128, 256, kernel_size=(1, 1), stride=(2, 2), bias=False)
      (1): BatchNorm2d(256, eps=1e-05, momentum=0.1, affine=True, track_running_stats=True)
    )
  )
  (1): BasicBlock(
    (conv1): Conv2d(256, 256, kernel_size=(3, 3), stride=(1, 1), padding=(1, 1), bias=False)
    (bn1): BatchNorm2d(256, eps=1e-05, momentum=0.1, affine=True, track_running_stats=True)
    (relu): ReLU(inplace=True)
    (conv2): Conv2d(256, 256, kernel_size=(3, 3), stride=(1, 1), padding=(1, 1), bias=False)
    (bn2): BatchNorm2d(256, eps=1e-05, momentum=0.1, affine=True, track_running_stats=True)
  )
)
                    ← 1268
(layer4): Sequential(
  (0): BasicBlock(
    (conv1): Conv2d(256, 512, kernel_size=(3, 3), stride=(2, 2), padding=(1, 1), bias=False)
    (bn1): BatchNorm2d(512, eps=1e-05, momentum=0.1, affine=True, track_running_stats=True)
    (relu): ReLU(inplace=True)
    (conv2): Conv2d(512, 512, kernel_size=(3, 3), stride=(1, 1), padding=(1, 1), bias=False)
    (bn2): BatchNorm2d(512, eps=1e-05, momentum=0.1, affine=True, track_running_stats=True)
    (downsample): Sequential(
      (0): Conv2d(256, 512, kernel_size=(1, 1), stride=(2, 2), bias=False)
      (1): BatchNorm2d(512, eps=1e-05, momentum=0.1, affine=True, track_running_stats=True)
    )
  )
  (1): BasicBlock(
    (conv1): Conv2d(512, 512, kernel_size=(3, 3), stride=(1, 1), padding=(1, 1), bias=False)
    (bn1): BatchNorm2d(512, eps=1e-05, momentum=0.1, affine=True, track_running_stats=True)
    (relu): ReLU(inplace=True)
    (conv2): Conv2d(512, 512, kernel_size=(3, 3), stride=(1, 1), padding=(1, 1), bias=False)
    (bn2): BatchNorm2d(512, eps=1e-05, momentum=0.1, affine=True, track_running_stats=True)
  )
)
(avgpool): AdaptiveAvgPool2d(output_size=(1, 1))
(fc): Linear(in_features=512, out_features=2, bias=True)
)
```

DEEP LEARNING-BASED ROOT CAUSE ANALYSIS OF PROCESS CYCLE IMAGES

PRIORITY APPLICATION

This application claims the benefit of U.S. Provisional Patent Application No. 63/143,673, entitled "DEEP LEARNING-BASED ROOT CAUSE ANALYSIS OF PROCESS CYCLES," filed Jan. 29, 2021. The provisional application is incorporated by reference for all purposes.

INCORPORATIONS

The following materials are incorporated by reference as if fully set forth herein:
  U.S. patent application Ser. No. 171/161,595, entitled "MACHINE LEARNING-BASED ROOT CAUSE ANALYSIS OF PROCESS CYCLE IMAGES," filed Jan. 28, 2021;
  U.S. patent application Ser. No. 17/332,904, entitled, "MACHINE LERNING-BASED ANALYSIS OF PROCESS INDICATORS TO PREDICT SAMPLE REEVALUATION SUCCESS," filed May 27, 2021;
  U.S. patent application Ser. No. 17/548,424, entitled, "MACHINE LEARNING-BASED GENOTYPING PROCESS OUTCOME PREDICTION USING AGGREGATE METRICS," filed Dec. 10, 2021.

FIELD OF THE TECHNOLOGY DISCLOSED

The technology disclosed relates to classification of images for evaluation and root cause failure analysis of production processes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Genotyping is a process that can take multiple days to complete. The process is vulnerable to both mechanical and chemical processing errors. Collected samples for genotyping are extracted and distributed in sections and areas of image generating chips. The samples are then chemically processed through multiple steps to generate fluorescing images. The process generates a quality score for each section analyzed. This quality score cannot provide insight into the root cause of failure a low-quality process. In some cases, a failed section image still produces an acceptable quality score.

Accordingly, an opportunity arises to introduce new methods and systems to evaluate section images and determine root causes of failure analysis during production genotyping.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 12C presents an example architecture of a first convolutional neural network to identify and classify bad process cycle images.

FIGS. 12D and 12E present an example architecture of a second convolutional neural network to identify and classify bad process cycle images.

DETAILED DESCRIPTION

Figure 1:
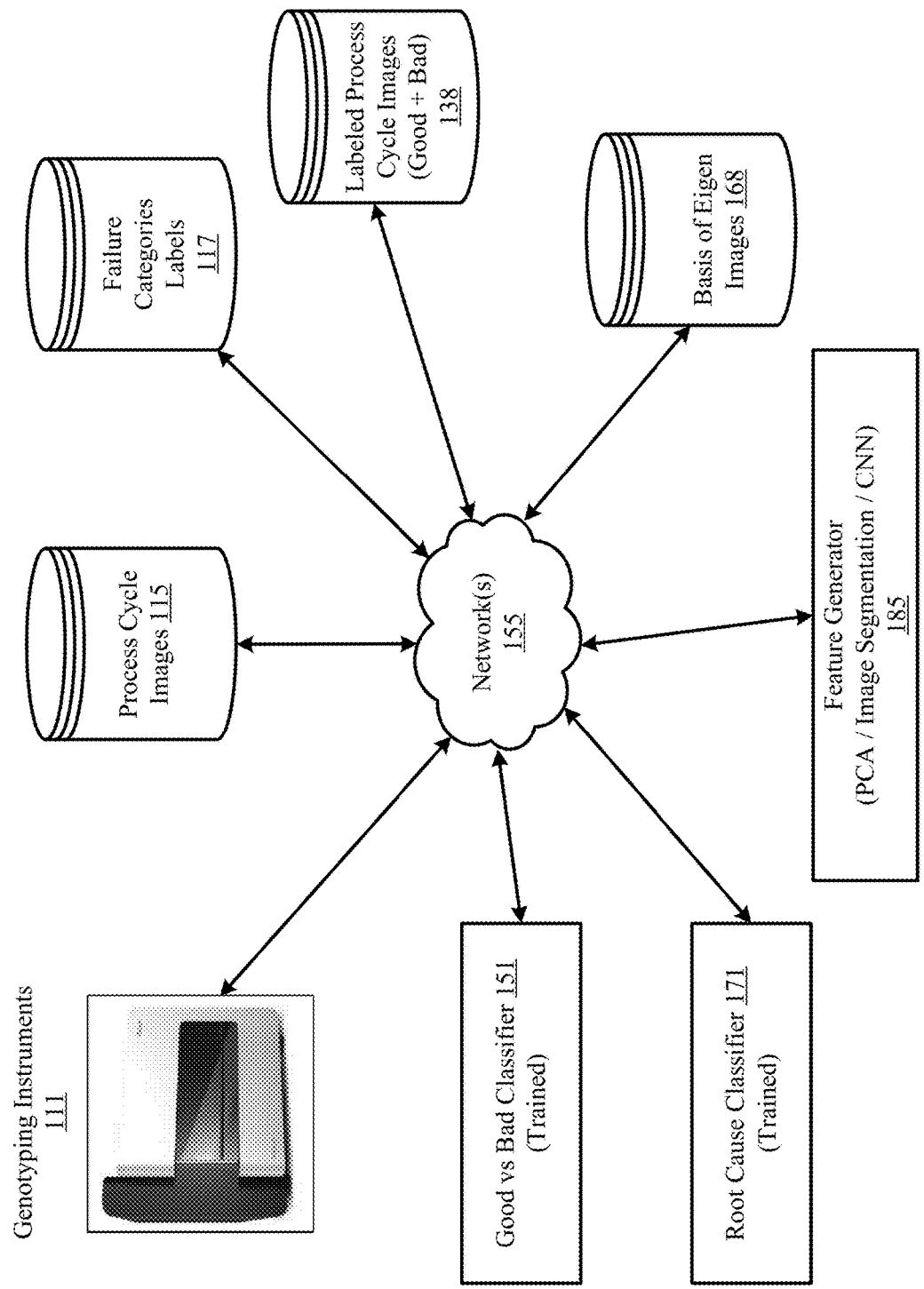
FIG. 1 shows an architectural level schematic of a system in which process cycle images from genotyping instruments are classified and root cause of bad or failed images is determined.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technology disclosed applies vision systems and image classification for evaluation and root cause failure analysis of production genotyping. Three distinct approaches are described, first involving Eigen images, second based on thresholding by area, and third using deep learning models such as convolutional neural networks (or CNNs). Principal components analysis (PCA) and non-negative matrix factorization (NMF) are among the techniques disclosed. Other dimensionality reduction techniques that can applied to images include, independent component analysis, dictionary learning, sparse principal component analysis, factor analysis, mini-batch K-means. Variations of image decomposition and dimensionality reduction techniques can be used. For example, PCA can be implemented using singular value decomposition (SVD) or as kernel PCA. Outputs from these techniques are given as inputs to classifiers. Classifiers applied can include random forest, K-nearest neighbors (KNN), multinomial logistic regression, support vector machines (SVM), gradient boosted trees, Naïve Bayes, etc. As larger bodies of labeled images become available, convolutional neural networks such as ResNet, VGG, ImageNet can also be used as presented below in description of the third image processing technology.

The genotyping production process is vulnerable to both mechanical and chemical processing errors. Collected samples are extracted, distributed in sections and areas of BeadChips, then chemically processed through multiple steps to generate fluorescing images. A final fluorescing image, or even intermediate fluorescing images, can be analyzed to monitor production and conduct failure analysis.

The vast majority of production analyses are successful. The failed analyses currently are understood to fit in five categories plus a residual failure category. The five failure categories are hybridization or hyb failures, spacer shift failures, offset failures, surface abrasion failures and reagent flow failures. The residual category is unhealthy patterns due to mixed effects, unidentified causes, and weak signals. In time, especially as root cause analysis leads to improved production, more and different causes may be identified.

The first image processing technology applied to quality control and failure analysis is evolved from facial recognition by Eigen face analysis. From tens of thousands of labeled images, a linear basis of 40 to 100 or more image components was identified. One approach to forming an Eigen basis was principal component analysis (PCA) followed by rank ordering of components according to a measure of variability explained. It was observed that 40 components explained most of the variability. Beyond 100 components, the additional components appeared to reflect patterns of noise or natural variability in sample processing. The number of relevant components is expected to be impacted by image resolution. Here, resolution reduction was applied so that sections of the image generating chip were analyzed at a resolution of 180×80 pixels. This was sufficient resolution to distinguish successful from unsuccessful production and then to classify root causes of failure among six failure categories. No formal sensitivity analysis was applied, but it is expected that slightly lower resolution images also would work and that images with 4 to 22 times this resolution could be processed in the same way, though with increased computational expense. Each image to be analyzed by Eigen image analysis is represented as a weighted linear combination of basis images. Each weight for the ordered set of basis components is used as a feature for training a classifier. For instance, in one implementation, 96 weights for components of labeled images were used to train random forest classifiers. A random forest classifier with 200 trees and a depth of 20 worked well. Two tasks were performed by the random forest classifiers: separation of successful and unsuccessful production images, then root cause analysis of the unsuccessful production images. This two-stage classification was selected due to the dominance of successful production runs, but a one-stage classification also could be used.

The second image processing technology applied involved thresholding of image areas. A production image of a section of an image generating chip captures several physically separated areas. Structures that border the section and that separate physical areas of the section are visible in a production image. The thresholding strategy involves separating the active areas from the border structures and then distinguishing among the separated areas. Optionally, the structures that separate the physical areas also can be filtered out of the image. At least the active areas are subject to thresholding for luminescence. The thresholding determines how much of an active area is producing a desired signal strength. Each active area is evaluated after thresholding for success or failure. A pattern of failures among areas and sections of an image generating chip can be further evaluated for root cause classification.

Processing of production images to detect failed production runs and determine root causes, can be performed immediately during production, more quickly even than results are read from the image generating chip and judged for quality. This image processing can be done more quickly because reducing the size of an image in pixels to $1/20$ times the original size on a side greatly reduces computational requirements and direct processing of a reduced resolution image does not require correlation of individual glowing pixels in an area to individual probes. Quick turnaround of root cause analysis can be used to correct upstream processes before chemicals and processing time are wasted.

The third image processing technology involves applying deep learning models such as convolutional neural networks (CNNs). ResNet (He et al. CVPR 2016 available at <<arxiv.org/abs/1512.03385>>) and VGG (Simonyan et al. 2015 available at <<arxiv.org/abs/1409.1556>>) are examples of convolutional neural networks (CNNs) used to identify and classify. We applied ResNet-18 and VGG-16 architectures of respective models for detecting failed images and classifying the failed images into respective failure categories. The CNN model parameters are pre-trained on ImageNet dataset (Deng et al. 2009, "ImageNet: A large-scale hierarchical image database", published in proceedings of IEEE Conference on Computer Vision and Pattern Recognition, pp. 248-255) which contains around 14 million images. The pre-trained models are fine-tuned using labeled images of sections of image generating chips. Around 75 thousand labeled images of sections are used for fine-tuning the pre-trained CNNs. The training data consists of normal images from successful process cycles and abnormal (or bad, or failed) images of sections from failed process cycles. The images from failed process cycles belong to five failure categories presented above.

The ResNet-18 and VGG-16 CNN models can use a square input image of size 224×224 pixels. In one implementation, sections of the image generating chip are rectangular such as 180×80 pixels as described above. Larger image sizes of sections can be used. The technology disclosed applies feature engineering to create a training data using rectangular labeled images which may be smaller than 224×224 pixels sized images required as input to CNN models. The technology can apply three feature engineering techniques to create the input data set including, cropping, zero padding, and reflection padding.

In cropping, the central part of rectangular shaped section images of image generating chip are cropped to 224×224 pixels size. In this case, the input image of section is larger than 224×224 pixels. In one implementation, the input section images are of size 504×224 pixels. Other sizes of labeled images, larger than 224×224 may be used to crop out square portions. The input images are cropped to match the input image size (224×224 pixels) required by the CNN models.

In zero-padding, the labeled input image size is smaller than 224×224 pixels. For example, the input image can be 180×80 pixels. The input labeled image of smaller size (such as 180×80 pixels) is placed in an analysis frame of 224×224 pixels. The image can be placed at any position inside the analysis frame. The pixels in surrounding area in the analysis frame can be zero-padded or in other words the surrounding pixels are assigned zero image intensity values. The larger sized analysis frame can then be given as input to the CNN models.

In reflection padding, the smaller sized labeled input image can be placed in center of the larger sized analysis frame. The labeled image is then reflected horizontally and vertically along the edges to fill the surrounding pixels in larger sized analysis frames (224×224 pixels). The reflected labeled image is given as input to the CNN models. The reflection padding can produce better results as features in the input labeled images are copied at multiple locations in the larger sized analysis frames.

The technology disclosed can perform data augmentation to increase the size of the training data. Horizontal and vertical translation can be performed by placing the smaller sized (J×K pixels) rectangular labeled input images at multiple locations in the larger sized (M×N pixels) analysis frames. In one implementation, the rectangular labeled input images are of size 180×80 pixels and larger sized analysis frames are 224×224 pixels. Other sizes of the labeled input images and analysis frames can be used. In one implementation, the J×K images can be systematically translated horizontally, vertically or diagonally in the M×N analysis frame to generate additional training data. In one implementation, the J×K images can be randomly positioned at different locations in the M×N analysis frames to generate additional training data.

A two-step detection and classification process can be applied using two separately trained convolutional neural networks (CNNs). A first CNN is trained for detection task in which the trained classifier can classify the images as normal or depicting process failure. The failed process cycle images can be fed to a second CNN, trained to classify the images by root cause of process failure. In one implementation, the system can classify the images into five different types of failure types listed above. The two-step process can be combined in a one step process using a CNN to classify a production section image as normal or as belonging to one of the failure categories.

Environment

We describe a system for early prediction of failure in genotyping systems. Genotyping is the process of determining differences in genetic make-up (genotype) of an individual by examining the individual's DNA sequence using biological assays and comparing it to a reference sequence. Genotyping enables researchers to explore genetic variants such as single nucleotide polymorphisms (SNPs) and structural changes in DNA. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The figure illustrates genotyping instruments 111, a process cycle images database 115, a failure categories labels database 117, a labeled process cycle images database 138, a trained good vs. bad classifier 151, a basis of Eigen images database 168, a trained root cause classifier 171, a feature generator 185, and a network(s) 155.

The technology disclosed applies to a variety of genotyping instruments 111, also referred to as genotyping scanners and genotyping platforms. The network(s) 155 couples the genotyping instruments 111, the process cycle images database 115, the failure categories labels database 117, the labeled process cycle images database 138, the trained good vs. bad classifier 151, the basis of Eigen images database 168, the trained root cause classifier 171, and the feature generator 185, in communication with one another.

The genotyping instruments can include Illumina's BeadChip imaging systems such as ISCAN™ system. The instrument can detect fluorescence intensities of hundreds to millions of beads arranged in sections on mapped locations on image generating chips. The genotyping instruments can include an instrument control computer that controls various aspects of the instrument, for example, laser control, precision mechanics control, detection of excitation signals, image registration, image extraction, and data output. The genotyping instruments can be used in a wide variety of physical environments and operated by technicians of varying skills levels. The sample preparation can take two to three days and can include manual and automated handling of samples.

Figure 3:
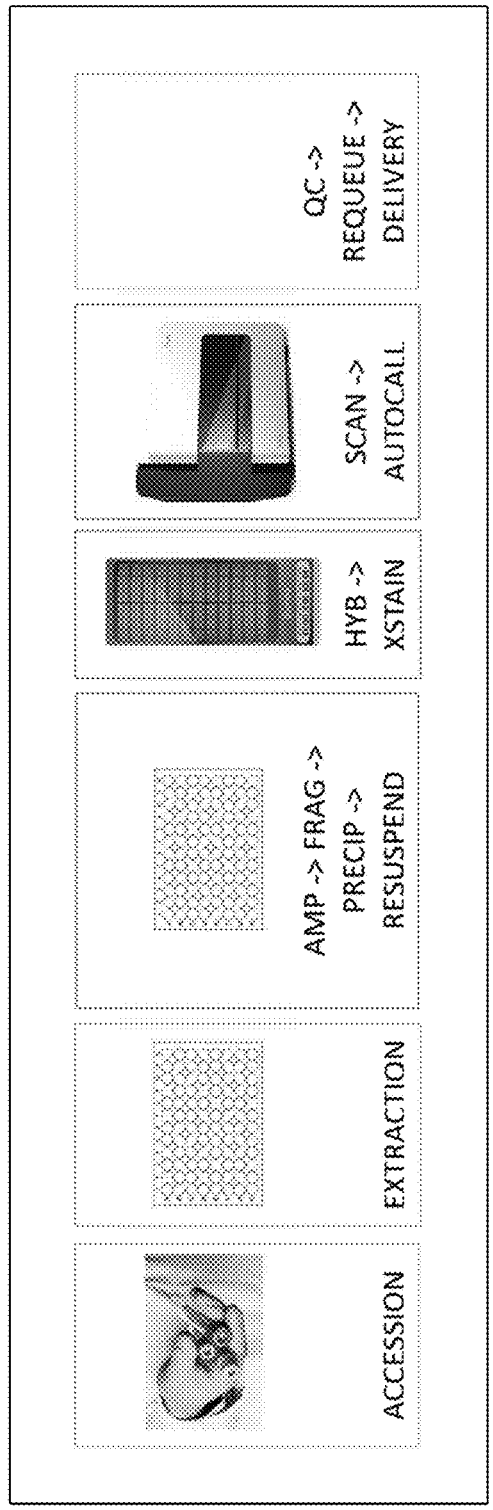
FIG. 3 presents process steps for an example genotyping process.

We illustrate process steps of an example genotyping process 300 in FIG. 3. This example genotyping process is referred to as Illumina's INFINIUM™ Assay Workflow. The process is designed to investigate many SNPs at extensive levels of loci multiplexing. Using a single bead type and dual-color (such as red and green) channel approach, the process scales genotyping from hundreds to millions of SNPs per sample. The process starts with accession and extraction of DNA samples. The process can operate with relatively low input sample such as 200 ng which can assay millions of SNP loci. The samples are amplified. The amplification process can take from a few hours to overnight to complete. The amplified sample undergoes controlled enzymatic fragmentation. This is followed by alcohol precipitation and resuspension. The image generating chip is prepared for hybridization in a capillary flow-through chamber. The samples are then applied to prepared image generating chips and incubated overnight. During this overnight hybridization, the samples anneal to locus-specific 50-mers covalently linked to up to millions of bead types. One bead type corresponds to each allele per SNP locus. The allelic specificity is conferred by enzymatic base extension followed by fluorescent staining. The genotyping instrument or scanner (such as ISCAN™ system) detects the fluorescence intensities of the beads and performs genotype calling.

In one example, the results of the genotyping are presented using a metric called "Call Rate". This metric represents the percentage of genotypes that were correctly scanned on the image generating chip. A separate call rate is reported per section of the image generating chip. A threshold can be used to accept or reject the results. For example, a call rate of 98% or more can be used to accept the genotyping results for a section. A different threshold value such as lower than 98% or higher than 98% can be used. If the call rate for a section is below the threshold, the genotyping process is considered as failed. The genotyping process can span over many days and is therefore, expensive to repeat. Failures in genotyping process can occur due to operational errors (such as mechanical or handling errors) or chemical processing errors.

The genotyping systems can provide process cycle images of sections of the image generating chip along with respective call rates of sections upon completion of the genotyping process. The technology disclosed can process these section images to classify whether the genotyping process is successful (good image of section) or not successful (bad or failed image of section). The technology disclosed can further process the bad or failed images to determine a category of failure. Currently, the system can classify the failed images in one of the six failure categories: hybridization or hyb failures, spacer shift failures, offset failures, surface abrasion failures, reagent flow failures and overall unhealthy images due to mixed effects, unknown causes, weak signals etc. In time, especially as root cause analysis leads to improved production, more and different causes may be identified.

We now refer to FIG. 1 to provide description of remaining components of the system 100. The failure category labels for the six failure types can be stored in the failure categories labels database 117. A training dataset of labeled process image cycles is stored in the database 138. The labeled training examples can comprise of successful (good) and unsuccessful (bad) process cycle images. The unsuccessful process cycle images are labeled as belonging to one of the six failure categories listed above. In one implementation, the training database 138 comprises of at least 20,000 training examples. In another implementation, the size of the training data set is increased up to 75,000 training examples using feature engineering techniques. The size of the training database can increase as more labeled image data is collected from laboratories using the genotyping instruments.

The technology disclosed includes three independent image processing techniques to extract features from process cycle images. The feature generator 185 can be used to apply one of the three techniques to extract features from process cycle images for input to machine learning models. The first image processing technique is evolved from facial recognition by Eigen face analysis. A relatively small number of linear basis such as from 40 to 100 or more image components are identified from tens of thousands of labeled images. One approach to form Eigen basis is Principal Component Analysis (PCA). The production cycle images are represented as a weighted linear combination of basis images for input to classifiers. For example, in one implementation, 96 weights for components of labeled images are used to train the classifiers. The basis of Eigen images can be stored in the database 168.

The second image processing technique to extract features involves thresholding of section images. A production image of a section of an image generating chip captures several physically separated areas. Structures that border the section and that separate physical areas of the section are visible in a production image. Thresholding technique determines how much of an active area is producing a desired signal strength. The output from thresholding technique can be given as input to a classifier to distinguish good images from bad images. A pattern of failures among areas and sections of an image generating chip can be further evaluated for root cause analysis.

The third image processing technique includes a variety of feature engineering techniques to prepare images for input to deep learning models. The section images of image generating chips are rectangular in shape. An image generating chip can have 12, 24, 48, or 96 sections arranged in two or more columns. The convolutional neural networks (CNNs) applied by the technology disclosed require square shaped input images. Therefore, the system includes logic to position rectangular shaped (J×K pixels) section images into square shaped (M×N pixels) analysis frames.

The system can apply one or more of the following feature engineering techniques. The system can apply zero-padding to fill pixels surrounding the section image in the larger square shaped analysis frames. The system can crop a center portion of a section image in square dimensions and fill the analysis frame with the cropped section image. In this case, the section image is of larger dimensions than the analysis frame. When the labeled section image is smaller than the analysis frame, the system can position the labeled input image inside the analysis frame. The system can use horizontal and vertical reflections along the edges of the input section image to fill the larger sized analysis frame. The system can augment the labeled training data by using translation in which the labeled input image is positioned at multiple locations in the analysis frame.

The image features of production images generated by the feature generator 185 are given as input to trained classifiers 151 and 171. Two types of classifiers are trained. A good vs. bad classifier can predict successful and unsuccessful production images. A root cause analysis classifier can predict failure categories of unsuccessful images. In one implementation, classifiers used by the technology disclosed include random forest classifiers. Other examples of classifiers that can be applied include K-nearest neighbors (KNN), multinomial logistic regression, and support vector machines. In another implementation of the technology disclosed, convolutional neural networks (CNNs) are applied to identify and classify images of sections of image generating chip.

Completing the description of FIG. 1, the components of the system 100, described above, are all coupled in communication with the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Feature Generator—System Components

Figure 2:
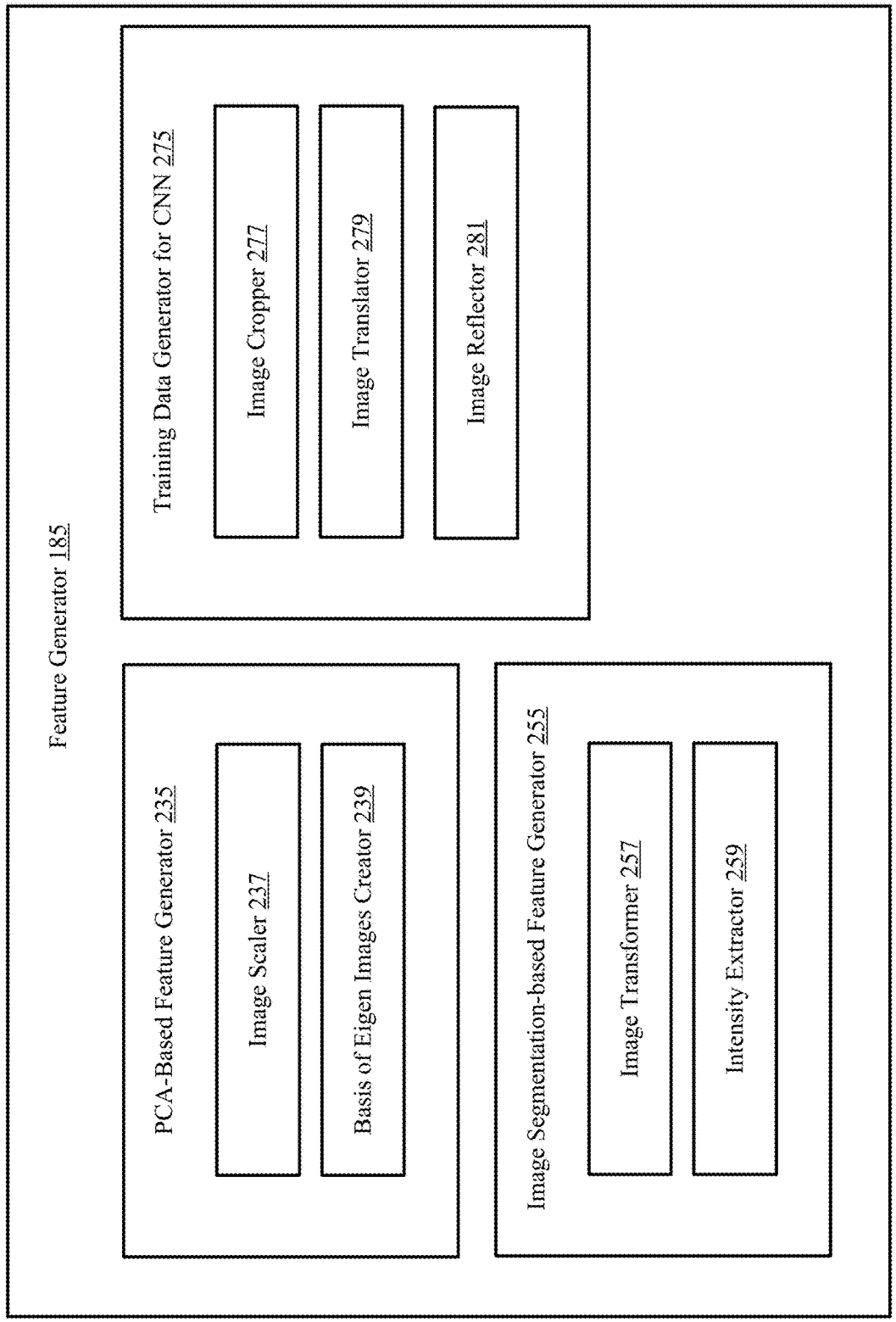
FIG. 2 illustrates subsystem components of feature generator of FIG. 1.

FIG. 2 is a high-level block diagram of components of feature generator 185. These components are computer implemented using a variety of different computer systems as presented below in description of FIG. 16. The illustrated components can be merged or further separated, when implemented. The feature generator 185 consists of three high-level components implementing the three image processing techniques: Principal Component Analysis or PCA-based feature generator 235, image segmentation-based feature generator 255, and training data generator for CNN 275. The PCA-based feature generator comprises of an image scaler 237 and a basis of Eigen images creator 239. The image segmentation-based feature generator 255 comprises of an image transformer 257 and an intensity extractor 259. The training data generator for CNN 275 comprises of an image cropper 277, an image translator 279, and an image reflector 281. In the following sections, we present further details of the implementation of these components.

PCA-Based Feature Generator

The first image processing technique is evolved from facial recognition by Eigen face analysis. One approach to forming an Eigen basis is principal component analysis (PCA). The PCA-based feature generator 235 applies PCA to resized process images. The image scaler component 237 resizes the process cycle images. Scaling reduces size of process images so that they can be processed in a computationally efficient manner by the basis of Eigen images creator component 239. We present details of these components in the following sections.

Image Scaler

Higher resolution images obtained from genotyping instruments or scanners can require more computational resources to process. The images obtained from genotyping scanners are resized by the image scaler 237 so that images of sections of image generating chips are analyzed at a reduced resolution such as 180×80 pixels. Throughout this text, we are referring to scaling (or rescaling) as resampling an image. Resampling changes the number of pixels in the image which are displayed. When the number of pixels in the initial image are increased, the image size increases, and it is referred to as upsampling. When the number of pixels in the initial image are decreased, the image size decreases, and it is referred to as downsampling. In one implementation, images of the sections obtained from the scanner are at a resolution of 3600×1600 pixels. In another implementation, images of sections obtained from the scanner are at a resolution of 3850×1600 pixels. These original images are downsampled to reduce the size of images in pixels to $\frac{1}{20}$ times per side from the original resolution. This is sufficient resolution to distinguish successful production images from unsuccessful production images and then to classify root causes of failure among six failure categories. Images can be downsampled to $\frac{1}{4}$ to $\frac{1}{40}$ the number of pixels per side at the original resolution and processed in the same way. In another implementation, the images can be downsampled to $\frac{1}{2}$ to $\frac{1}{50}$ the number of pixels per side at the original resolution and processed in the same way. An example technique to resample the high-resolution images is presented below.

The technology disclosed can apply a variety of interpolation techniques to reduce the size of the production images. In one implementation, bilinear interpolation is used to reduce size of the section images. Linear interpolation is a method of curve fitting using linear polynomials to construct new data points with the range of a discrete set of known data points. Bilinear interpolation is an extension of linear interpolation for interpolating functions of two variables (e.g., x and y) on a two-dimensional grid. Bilinear interpolation is performed using linear interpolation first in one direction and then again in a second direction. Although each step is linear in the sampled values and in the position, the interpolation as a whole is not linear but rather quadratic in the sample location. Other interpolation techniques can also be used for reducing the size of the section images (rescaling) such as nearest-neighbor interpolation and resampling using pixel area relation.

Basis of Eigen Images Creator

The first image processing technique applied to section images to generate input features for classifiers is evolved from facial recognition by Eigen face analysis. From tens of thousands of labeled images, a linear basis of 40 to 100 or more image components is identified. One approach to forming the basis of Eigen images is principal component analysis (PCA). A set B of elements (vectors) in a vector space V is called a basis, if every element of V may be written in a unique way as a linear combination of elements of B. Equivalently, B is a basis if its elements are linearly independent, and every element of V is a linear combination of elements of B. A vector space can have several bases. However, all bases have the same number of elements, called the dimension of the vector space. In our technology, the basis of the vector space are Eigen images.

PCA is often used to reduce the dimensions of a d-dimensional dataset by projecting it onto a k-dimensional subspace where k<d. For example, a resized labeled image in our training database describes a vector of dimension d=14,400-dimensional space (180×80 pixels). In other words, the image is a point in 14,400-dimensional space. Eigen space-based approaches approximate the image vectors with lower dimension feature vectors. The main supposition behind this technique is that the image space given by the feature vectors has a lower dimension than the image space given by the number of pixels in the image and that the recognition of images can be performed in this reduced space. Images of sections of image generating chips, being similar in overall configuration, will not be randomly distributed in this huge space and thus can be described by a relatively low dimensional subspace. The PCA technique finds vectors that best account for the distribution of section images within the entire image space. These vectors define the subspace of images which is also referred to as "image space". In our implementation, each vector describes a 180×80 pixels image and is a linear combination of images in the training data. In the following text, we present details of how principal component analysis (PCA) can be used to create the basis of Eigen images.

The PCA-based analysis of labeled training images can comprise of the following five steps.

Step 1: Accessing Multi-Dimensional Correlated Data

The first step in application of PCA is to access high dimensional data. In one instance, the PCA-based feature generator used 20,000 labeled images as training data. Each image is resized to 180×80 pixels resolution and represented as a point in a 14,400-dimensional space, one dimension per pixel. This technique can handle images of higher resolution or lower resolution than specified above. The size of the training data set is expected to increase as we collect more labeled images from laboratories.

Step 2: Standardization of the Data

Standardization (or Z-score normalization) is the process of rescaling the features so that they have properties of a Gaussian distribution with mean equal to zero or μ=0 and standard deviation from the mean equal to 1 or σ=1. Standardization is performed to build features that have similar ranges to each other. Standard score of an image can be calculated by subtracting the mean (image) from the image and dividing the result by standard deviation. As PCA yields a feature subspace that maximizes the variance along the axes, it helps to standardize the data so that it is centered across the axes.

Step 3: Computing Covariance Matrix

The covariance matrix is a d×d matrix of d-dimensional space where each element represents covariance between two features. The covariance of two features measures their tendency to vary together. The variation is the average of the squared deviation of a feature from its mean. Covariance is the average of the products of deviations of feature values from their means. Consider feature k and feature j. Let {x(1, j), x(2, j), ..., x(i, j)} be a set of i examples of feature j, and let {x(1, k), x(2, k), ..., x(i, k)} be a set of i examples of feature k. Similarly, let $\bar{x}_j$ be the mean of feature j and $\bar{x}_k$ be the mean of feature k. The covariance of feature j and feature k is calculated as follows:

$$\sigma_{jk} = \frac{1}{n-1} \sum_{i=1}^{n} (x(i, j) - \bar{x}_j)(x(i, k) - \bar{x}_k) \quad (1)$$

We can express the calculation of the covariance matrix via the following matrix equation:

$$\Sigma = \frac{1}{n-1}((X - \bar{x})^T (X - \bar{x})) \quad (2)$$

Where the mean vector can be represented as:

$$\bar{x} = \frac{1}{n} \sum_{i=1}^{n} x_i.$$

The mean vector is a d-dimensional vector where each value in this vector represents the sample mean of a feature column in the training dataset. The covariance value $\sigma_{jk}$ can vary between the "$-(\sigma_{ij})(\sigma_{ik})$" i.e., inverse linear correlation to "$+(\sigma_{ij})(\sigma_{ik})$" linear correlation. When there is no dependency between two features the value of $\sigma_{jk}$ is zero.

Step 4: Calculating Eigenvectors and Eigenvalues

The eigenvectors and eigenvalues of a covariance matrix represent the core of PCA. The eigenvectors (or principal components) determine the directions of the new feature space and the eigenvalues determine their magnitudes. In other words, eigenvalues explain the variance of the data along the axes of the new feature space. Eigen decomposition is a method of matrix factorization by representing the matrix using its eigenvectors and eigenvalues. An eigenvector is defined as a vector that only changes by a scalar when linear transformation is applied to it. If A is a matrix that represents the linear transformation, v is the eigenvector and λ, is the corresponding eigenvalue, it can be expressed as Av=λv. A square matrix can have as many eigenvectors as it has dimensions. If we represent all eigenvectors as columns of a matrix V and corresponding eigenvalues as entries of a diagonal matrix L, the above equation can be represented as AV=VL. In case of a covariance matrix all eigenvectors are orthogonal to each other and are the principal components of the new feature space.

Step 5: Using Explained Variance to Select Basis for Eigen Images

The above step can result in 14,400 principal components for our implementation which is equal to the dimension of the feature space. An eigenpair consists of the eigenvector and the scalar eigenvalue. We can sort the eigen pairs based on eigenvalues and use a metric referred to as "explained variance" to create a basis of eigen images. The explained variance indicates how much information (or variance) can be attributed to each of the principal component. We can plot the results of explained measure values on a two-dimensional graph. The sorted principal components are represented along x-axis. A graph can be plotted indicating cumulative explained variance. The first in components that represent a major portion of the variance can be selected.

In our implementation, the first 40 components expressed a high percentage of the explained variance, therefore, we selected the first 40 principal components to form bases of our new feature space. In other implementations, 25 to 100 principal components or more than 100 principal components, up to 256 or 512 principal components, can be selected to create a bases of Eigen images. Each production image to be analyzed by Eigen image analysis is represented as a weighted linear combination of the basis images. Each weight of the ordered set of basis components is used as a feature for training the classifier. For instance, in one implementation, 96 weights for components of labeled images were used to train the classifier.

The technology disclosed can use other image decomposition and dimensionality reduction techniques. For example, non-negative matrix factorization (NMF) which learns a parts-based representation of images as compared to PCA which learns complete representations of images. Unlike PCA, NMF learns to represent images with a set of basis images resembling parts of images. NMF factorizes a matrix X into two matrices W and H, with the property that all three matrices have no negative elements. Let us assume that matrix X is set-up so that there are n data points (such as images of sections on image generating chips) each with p dimensions (e.g., 14,400). Thus, matrix X has p rows and n columns. We want to reduce the p dimensions to r dimensions or in other words create a rank r approximation. NMF approximates matrix X as a product of two matrices: W (p rows and r columns) and H (r rows and n columns).

The interpretation of matrix W is that each column is a basis element. By basis element we mean some component that is present in the n original data points (or images). These are the building blocks from which we can reconstruct approximations to all of the original data points or images. The interpretation of matrix H is that each column gives the coordinates of a data point in the basis matrix W. In other words, it tells us how to reconstruct an approximation to the original data point from a linear combination of the building blocks in matrix W. In case of facial images, the basis elements (or basis images) in matrix W can include features such as eyes, noses, lips, etc. The columns of matrix H indicate which features are present in which image.

Image Segmentation-Based Feature Generator

The second image processing technique to extract features from process cycle images is based on thresholding of image areas. The image segmentation-based feature generator 255 applies thresholding by first segmenting images of sections of an image generating chip using image segmentor 257 and then extracting intensity of active areas or regions of interest of a section image. The thresholding determines how much of an active area is producing a desired signal strength.

An image generating chip can comprise of multiple sections such as 24, 48, 96 or more, organized into rows and columns. This design enables processing of multiple samples in one process cycle as many samples (one per section) can be processed in parallel. A section is physically separated from other sections so that samples do not mix with each other. Additionally, a section can be organized into multiple parallel regions referred to as "slots". The structures at borders of sections and slots are therefore visible in the process cycle images from genotyping scanners. We present below, details of the two components of image segmentation-based feature generator 255 that can implement techniques to transform section images for extraction of image features.

Image Transformer

The image transformer 257 applies a series of image transformation techniques to prepare the section images for extracting intensities from regions of interest. In one implementation, this process of image transformation and intensity extraction is performed by some or all of the following five steps. The image transformation converts grayscale image of a section into a binary image consisting of black and bright pixels. Average intensity values of active areas of grayscale image and binary image are given as input features to a classifier to classify the image as a healthy (good) or unhealthy (bad) image. In the following text we present details of the image transformation steps which include applying thresholding to convert the grayscale image into binary image. The process steps include applying filters to remove noise.

The first step in the image transformation process is to apply a bilateral filter to process cycle images of sections. The bilateral filter is a technique to smooth images while preserving edges. It replaces the intensity of each pixel with a weighted average of intensity values from its neighboring pixels. Each neighbor is weighted by a spatial component that penalizes distant pixels and a range component that penalizes pixels with a different intensity. The combination of both components ensures that only nearby similar pixels contribute to a final result. Thus, bilateral filter is an efficient way to smooth an image while preserving its discontinuities or edges. Other filters can be used such as median filter and anisotropic diffusion.

The second step in image transformation includes applying thresholding to output images from step 1. In one implementation, we apply Otsu's method (Otsu, N., 1979, "A threshold selection method from gray-level histograms", IEEE Transactions on Systems, Man, and Cybernetics, Volume 9, Issue 1) that uses histogram of intensities and searches for a threshold to maximize a weighted sum of grayscale variance between pixels assigned to dark and bright intensity classes. Otsu's method attempts to maximize the between-class variance. The basic idea is that well-thresholded classes should be distinct with respect to the intensity values of their pixels and, conversely, that a threshold giving the best separation between classes in terms of their intensity values would be the best threshold. In addition, Otsu's method has the property that it is based entirely on computations performed on the histogram of an image, which is an easily obtainable one-dimensional array. For further details of Otsu's method, refer to Section 10.3.3 of Gonzalez and Woods, "Digital Image Processing", $3^{rd}$ Edition.

The third step in image transformation is application of noise reduction Gaussian blur filter to remove speckle-like noise. Noise can contaminate the process cycle images with small speckles. Gaussian filtering is a weighted average of the intensity of adjacent positions with a weight decreasing with the spatial distance to the center position.

The fourth step in image transformation includes image morphology operations. The binary output images from third step are processed by morphological transformation to fill holes in the images. A hole may be defined as a background region (represented by 0s) surrounded by a connected border of foreground pixels (represented by 1s). Two basic image morphology operations are "erosion" and "dilation". In erosion operation, a kernel slides (or moves) over the binary image. A pixel (either 1 or 0) in the binary image is considered 1 if all the pixels under the kernel are 1s. Otherwise, it is eroded (changed to 0). Erosion operation is useful in removing isolated 1s in the binary image. However, erosion also shrinks the clusters of 1s by eroding the edges. Dilation operation is the opposite of erosion. In this operation, when a kernel slides over the binary image, the values of all pixels in the binary image area overlapped by the kernel are changed to 1 if value of at least one pixel under the kernel is 1. If dilation operation is applied to the binary image followed by erosion operation, the effect is closing of small holes (represented by 0s in the image) inside clusters of 1s. The output from this step is provided as input to intensity extractor component 259 which performs the fifth step of this image transformation technique.

Intensity Extractor

The intensity extractor 259 divides section images into active areas or segments by filtering out the structures at the boundaries of sections and slots. The intensity extractor can apply different segmentations to divide section images from eight up to seventeen or more active areas. Examples of areas in a section image include four slots, four corners, four edges between corners and various vertical and horizontal lines at the borders of the section and the slots. The areas that correspond to known structures that separate active areas are then removed from the image. The image portions for remaining active areas are processed by the intensity extractor 259. Intensity values are extracted and averaged for each active area of transformed image and corresponding non-transformed image. For example, if intensity values are extracted from 17 active areas of transformed image then the intensity extractor also extracts intensity values from the same 17 active areas of the non-transformed image. Thus, a total of 34 features are extracted per section image.

In case of binary images, the average intensity of an active area can be between 1 and 0. For example, consider intensity of a black pixel is 0 and intensity of a bright (or blank) pixel is 1. If all pixels in an active area are black, then the average intensity of the active area will be 0. Similarly, if all pixels in an active area are bright then the intensity of that area will be 1. The active areas in healthy images appear as blank or bright in the binary images while black pixels represent unhealthy images. The average intensities of corresponding active areas in grayscale image are also extracted. The average intensities of active areas from both grayscale image and transformed binary image are given as input to the good vs. bad classifier. In one implementation, the classification confidence score from the classifier is compared with a threshold to classify the image as a healthy (or good or successful) image or an unhealthy (or bad or failed) image. An example of threshold value is 80%. A higher value of a threshold can result in more images classified as unhealthy.

Training Data Generator for Convolutional Neural Network (CNN)

The third image processing technique can use cropping, translation, and reflection to prepare input images for training convolutional neural networks (CNNs). The section images are rectangular and the CNNs such as ResNet (He et al. CVPR 2016 available at <<arxiv.org/abs/1512.03385>>) and VGG (Simonyan et al. 2015 available at <<arxiv.org/abs/1409.1556>>) use square input images of size 224×224 pixels. The training data generator for CNN 275 includes the image cropper 277, the image translator 279, and the image reflector 281 to prepare input images for the CNNs. The image translator 279 can also augment the labeled input images to increase the size of training data.

Image Cropper

The image cropper 277 includes logic to crop images of sections of the image generating chip to match the input image size required by convolutional neural networks (CNNs). In one implementation, high resolution images obtained from the genotyping instrument have dimensions of 3600×1600 pixels. As described above, the higher resolution images can require more computational resources to process therefore, the technology disclosed downsamples the images to reduce the size. The size of image can be reduced to ¼ to ¹⁄₄₀ per side from the original image's size in pixels, thus resulting in images of sizes ranging from 964×400 pixels to 90×40 pixels. In one instance, section images are downsampled to ¹⁄₂₀ times per side from the original image's size of 3600×1600 pixels, resulting in a size of 180×80 pixels (J×K images). The downsampled images can be provided to an image cropper to prepare the input as required by the convolutional neural network (CNN).

Image cropper can crop out, different portions of the rectangular section images for preparing the square input images for the CNN. For example, a central part of rectangular shaped section images of image generating chip can be cropped and placed inside the analysis frame of 224×224 pixels. If the input image of section is larger than 224×224 pixels such as 504×224 pixels, the image cropper can crop out 224×224 pixels from the image to fill the M×N analysis frame. The image cropper can crop out smaller portions than 224×224 pixels for placing in an M×N analysis frame.

Image Translator

The image translator 279 includes logic to position the labeled input images of sections of image generating chip in multiple locations in analysis frames. "Translation" can be referred to as moving a shape or section image in our case, without rotating or flipping. Translation can also be referred to as sliding the section image in an analysis frame. After translation, the section image looks the same and has the same dimensions but is positioned at a different place in the analysis frame. The image translator includes logic to horizontally, vertically, or diagonally move or slide the section images at different position in the analysis frame.

The analysis frames can be larger than the size of the labeled input images. In one case, the analysis frame is square-shaped having a size 224×224 pixels. The analysis frames of other sizes and shapes can be used. The labeled input images of sections can be positioned at multiple locations in the analysis frame. When the image size is 180×80 pixels, and the analysis frame is 224×224 pixels then image can be translated horizontally and can also be translated vertically. In another example, when the image size is 224×100 pixels, the image can only be translated horizontally in the analysis frame of 224×224 pixels. In another example, when the image size is 200×90 pixels, it can be translated horizontally and vertically in the analysis frame of 224×224 pixels.

The pixels in the analysis frame surrounding the labeled input image can be zero-padded. In this case, the pixels surrounding the labeled input image are assigned "0" values for respective intensities. The translation of one input labeled image can result in multiple analysis frames containing the input image at different locations in the frame. This process can augment the training data thus increasing the number of training examples.

Image Reflector

The image reflector 281 includes logic to horizontally and vertically reflect the smaller sized input labeled image positioned in the larger sized analysis frame. Reflection refers to an image of an object or of a section image in our case, as seen in a mirror. The smaller sized labeled input image can be placed in center of the larger sized analysis frame. The image reflector 281 includes logic to reflect the section images, horizontally and vertically along the edges to fill the surrounding pixels in larger sized analysis frames (such as 224×224 pixels). The reflection padding can increase probability of detecting failed process images as the image or portions of the image are copied in multiple locations in the analysis frame.

Process Cycle Images

Figure 4:
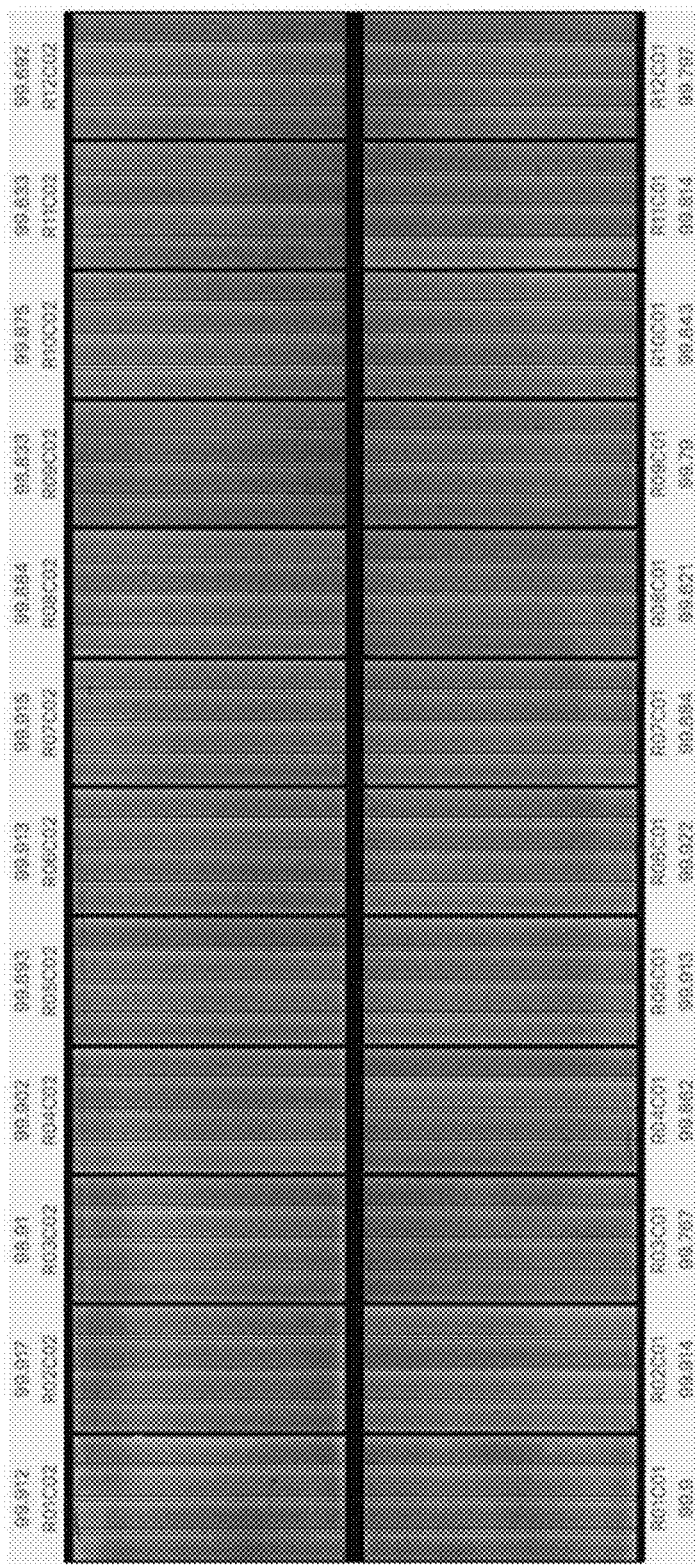
FIG. 4 presents images of sections arranged in an image generating chip after successful process completion.

We now present examples of successful and unsuccessful production images of sections on image generating chips. FIG. 4 is an illustration 400 of production images of 24 sections on an image generating chip. The sections are arranged in twelve rows and two columns. Each section has four slots. The illustration 400 shows section images of a successful production cycle. Image generating chips with other configurations of sections can also be used such as including 48, 96 or more sections. In the following figures we present examples of section images of unsuccessful production cycles. The production process is vulnerable to both operational and chemical processing errors. The operational defects can be caused due to mechanical or sample handling issues. Chemical processing errors can be caused by issues in samples or chemical processing of the samples.

The technology disclosed attempts to classify bad process image cycles occurring due to both operational and chemical processing errors.

Figure 5A:
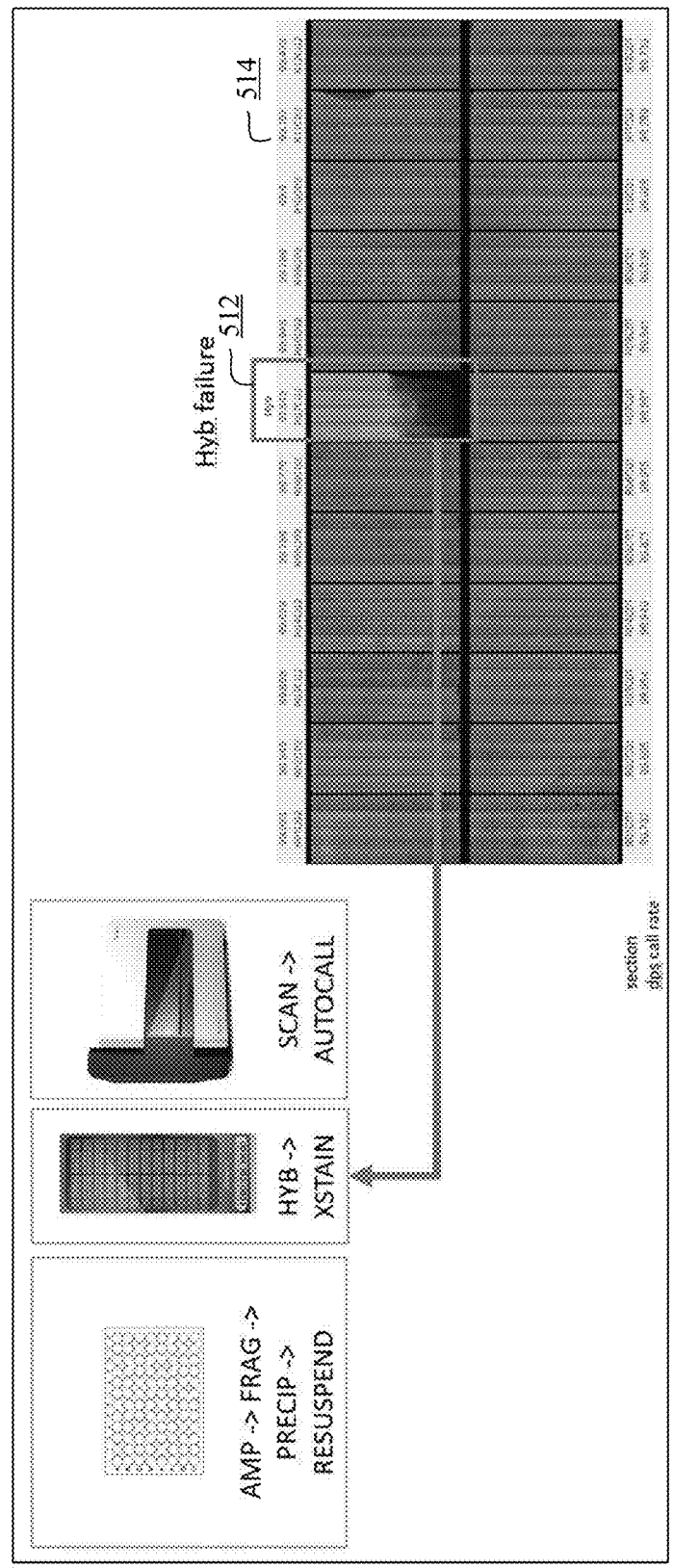
FIGS. 5A and 5B present examples of failed section images due to hybridization failure during genotyping process.

FIG. 5A shows an example 510 of a section image from an unsuccessful production cycle. The image of section 512 in second column and seventh row of the image generating chip in FIG. 5A is dark colored in bottom half portion and slightly light colored in top portion. The cause of this failure is linked to the hybridization process. Therefore, the failed image of the section is labeled as "Hyb" failure. Hybridization failures can also occur due to failures of robots that handle samples during sample preparation process on image generating chips. The call rate for this section is "97.545" which is below the 98 percent pass threshold. In some cases, the call rate for section from genotyping instruments can be above the pass threshold and even then, the section image can fail due to hybridization error.

Figure 5B:
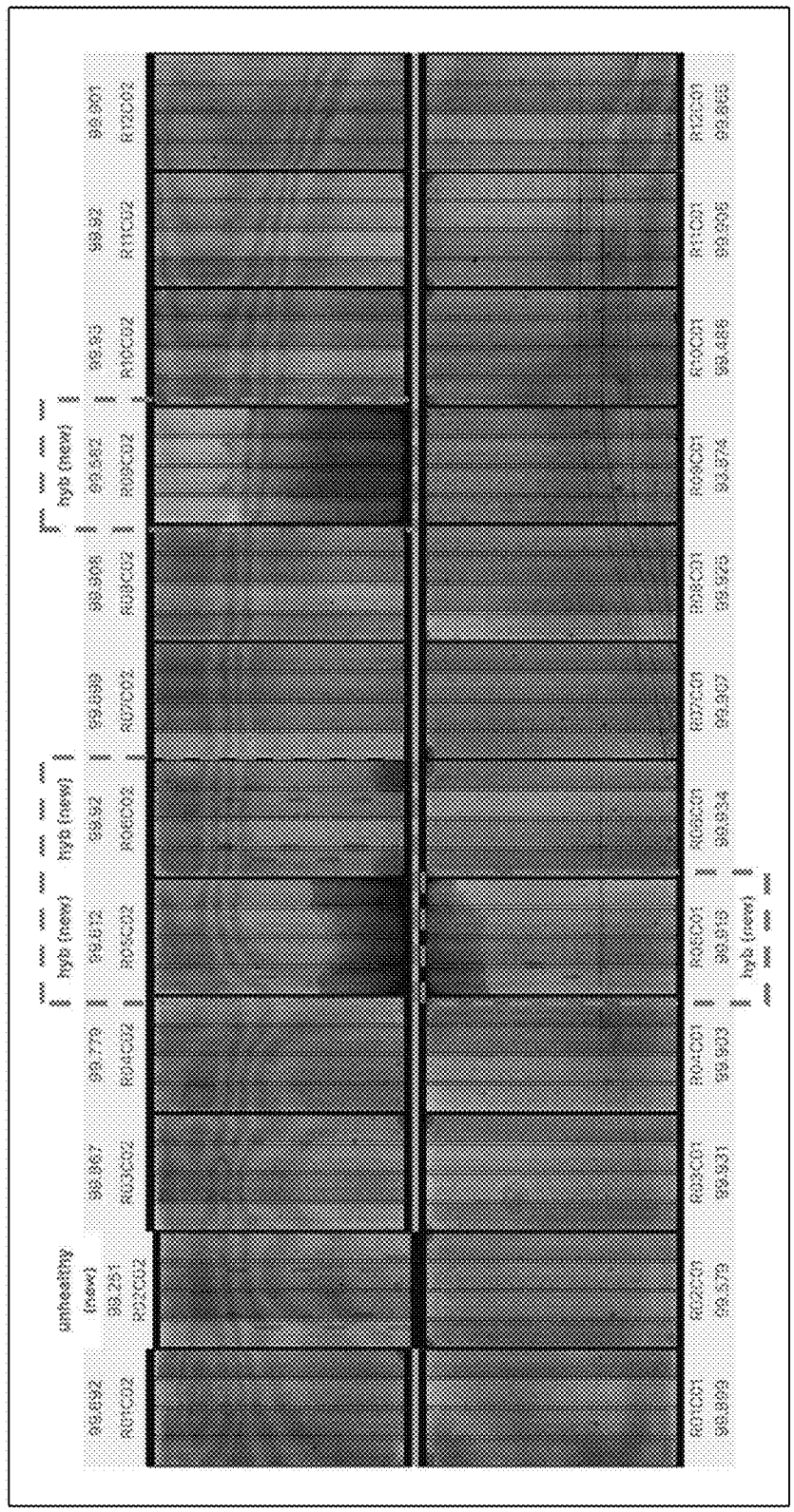

It can be noted that in illustration 510, the image of section 514 at row 11 and column 2 has a dark colored region on the right wall. This may also indicate a processing issue, however, the overall call rate of this image is above the pass threshold and it is not labeled as a failed image. There is sufficient redundancy of samples on the section due to which small areas of sections with apparent failure can be ignored and may not cause errors in the results. For example, in one instance, the scanner reads fluorescence from about 700K probes on a section with a redundancy of 10. Therefore, the call rate is based on readout of about 7 million probes. We present further examples of hybridization failures in illustration 515 in FIG. 5B. Four sections on image generating chip in broken line boundaries show bad production images of sections due to hybridization failure. Note that the call rate values for these four sections are above pass threshold but images of these sections are labeled as failed due to hybridization error.

Figure 5C:
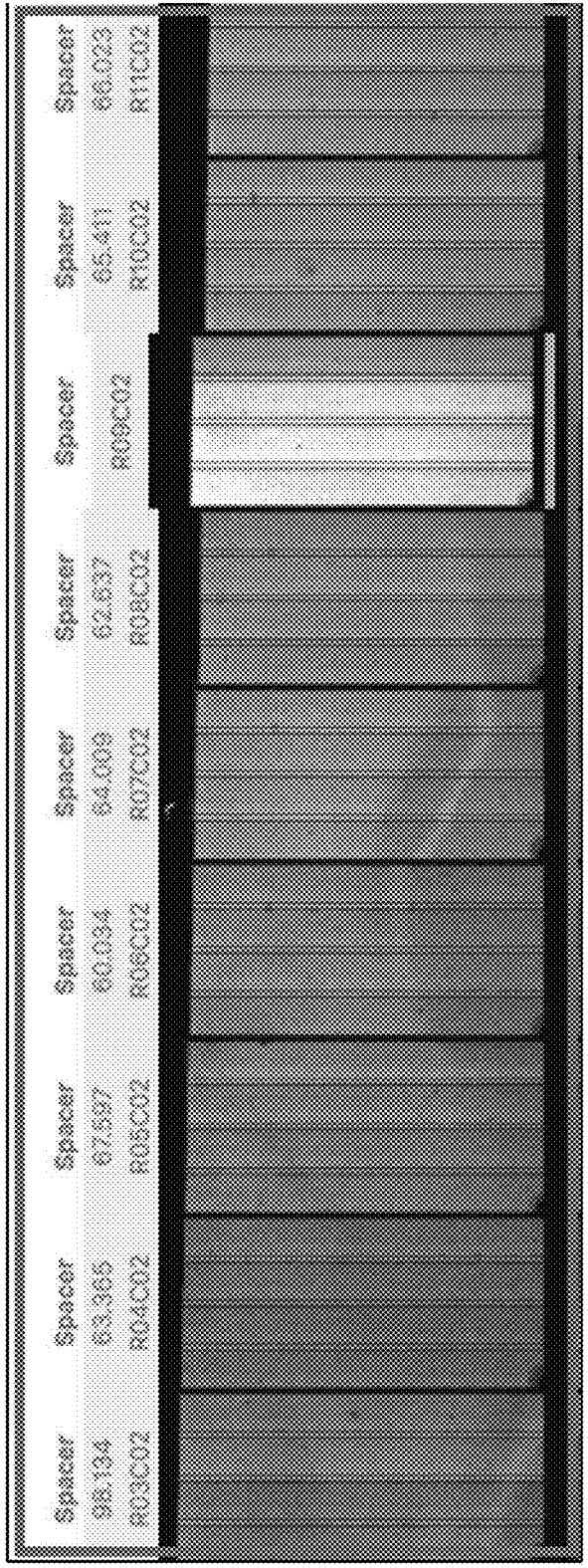
FIGS. 5C and 5D present examples of failed section images due to spacer shift failures.
Figure 5D:
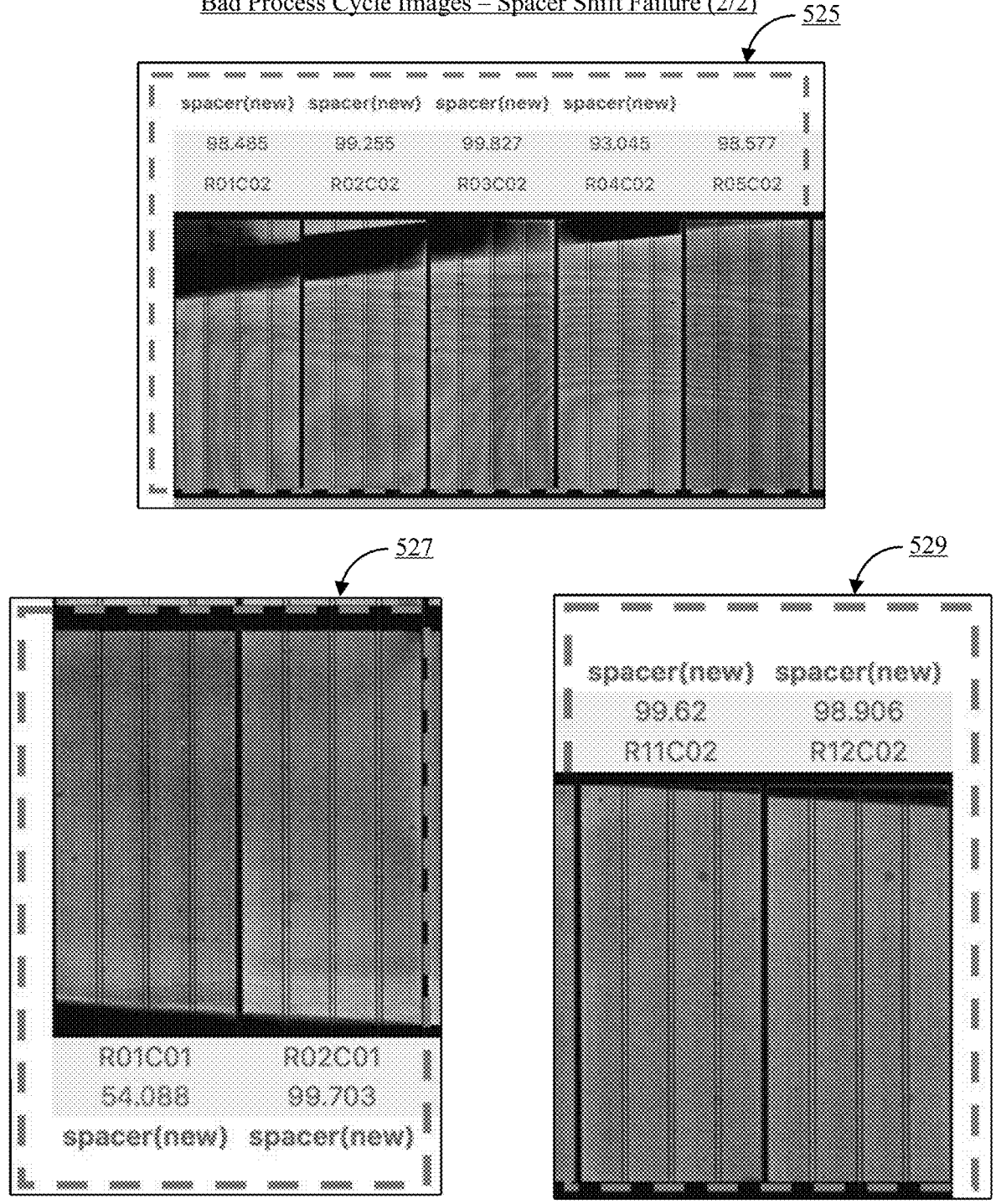

FIG. 5C presents an illustration 520 of nine section images that show unsuccessful processing due to spacer shift failure. When samples are prepared on sections on an image generating chip, a dark colored marker is placed around the sections. The spacer separates samples in each section from other samples in neighboring sections. If the marker is not placed correctly, it can block part of the image signal. The offset error can happen across multiple neighboring sections as shown in FIG. 5C. The top portions of nine sections in this figure appear as dark colored. The dark portion on top part of the sections increases as we move from left to right. Space shift issue is an operational error as it is caused by inaccurate placement of marker by laboratory technicians during preparation of samples on image generating chip. FIG. 5D presents three more examples of failed images of sections due to spacer shift failure. A box 525 shows five section images with spacer shift failure as top portions of the section images are dark colored increasing in width from top right to top left. A box 527 shows two section images that indicate failed process due to spacer shift issue at the bottom portions of the sections. Similarly, a box 529 shows images of two sections that failed due to space shift issue.

Figure 5E:
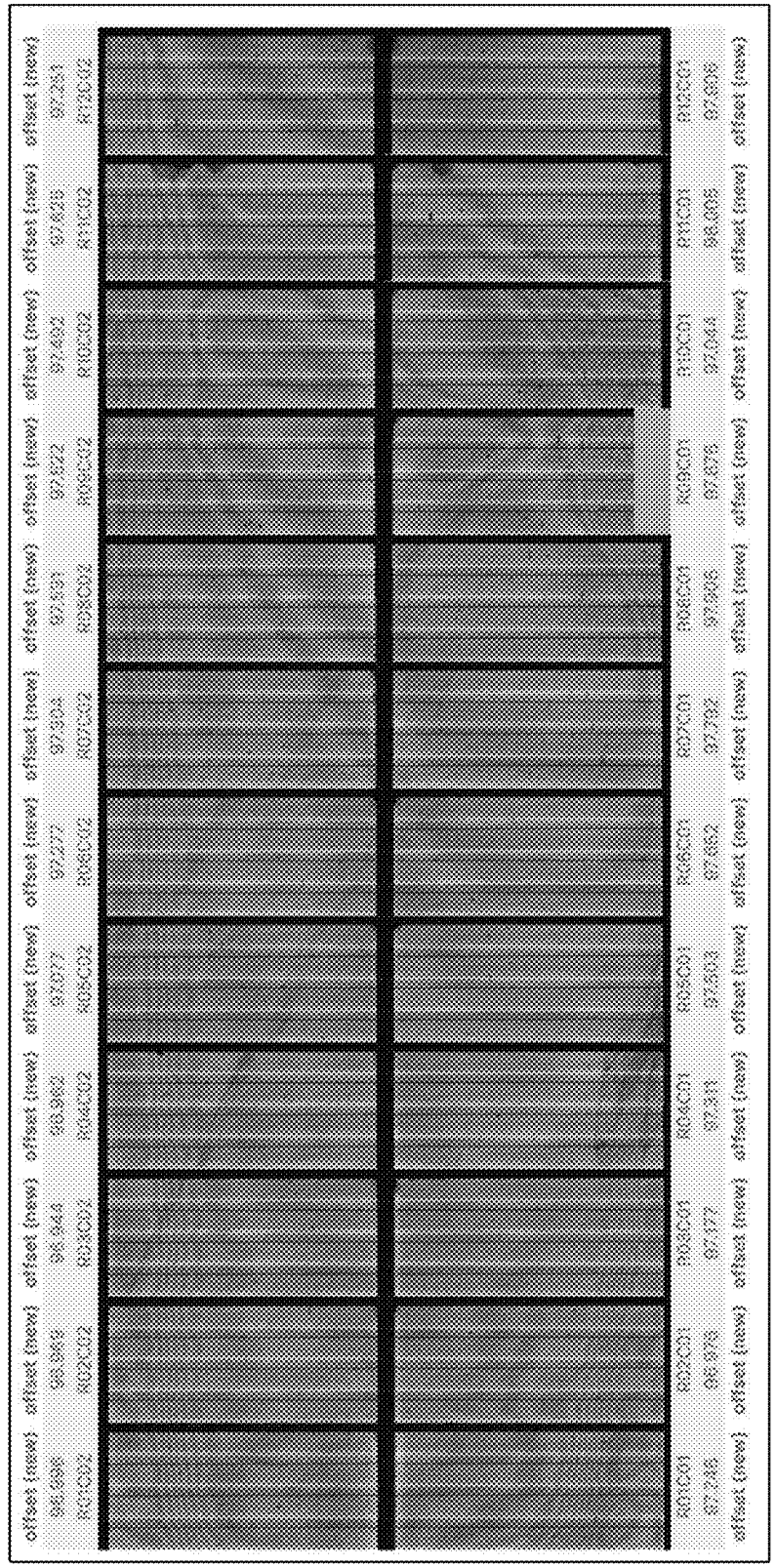
FIG. 5E presents examples of failed section images due to offset failures.

FIG. 5E shows an example of failed images of sections due to unsuccessful processing caused by offset failure. In offset failure, images of sections on the image generating chip are shifted to one side. For example, in the illustration 530, all section images on the image generating chip are shifted towards left side thus the dark colored outer border of the image generating chip on the left edge is cutoff from the image. Offset failures can be caused by scanning errors such as scanner misalignment or misplacement of image generating chip on the chip carrier.

Figure 5F:
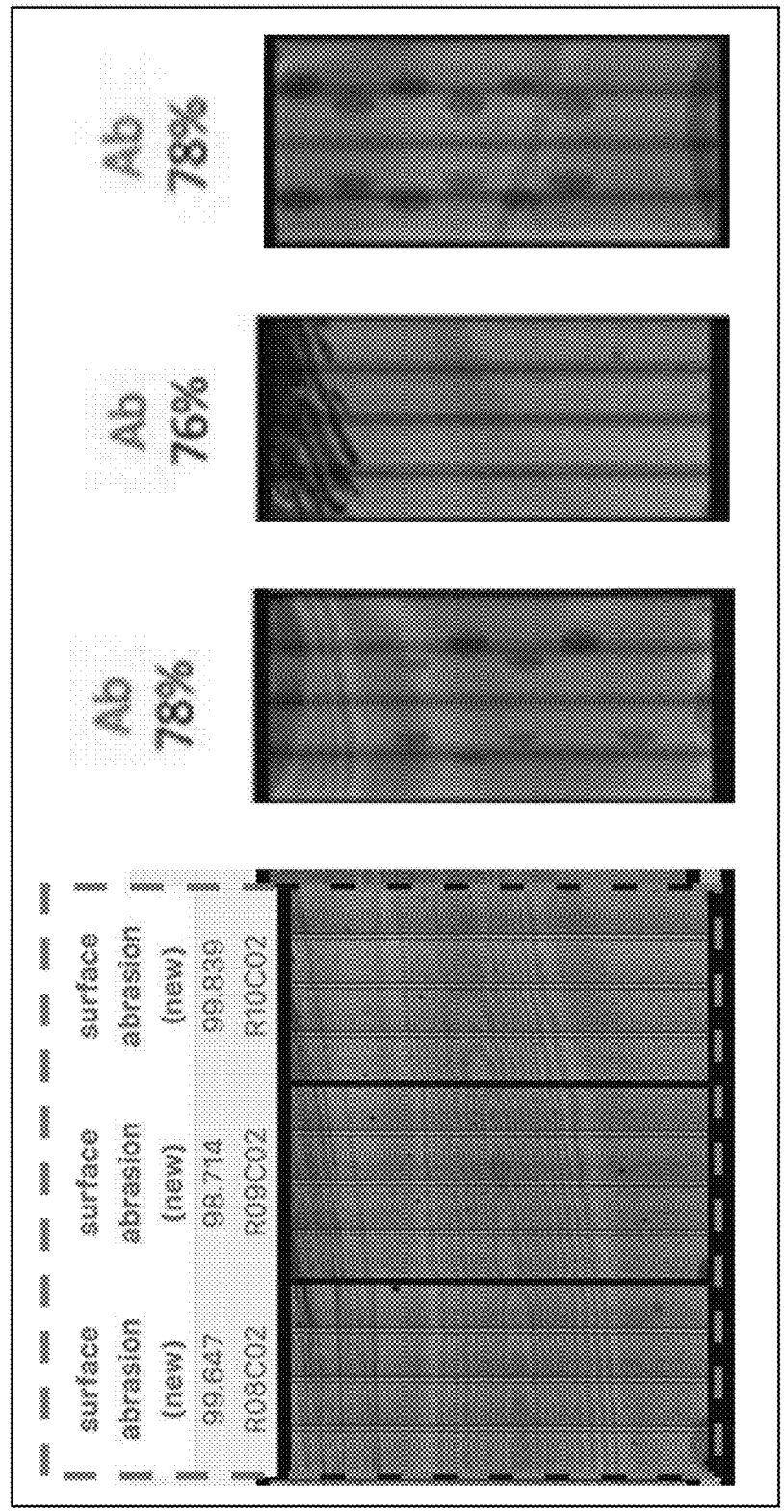
FIG. 5F presents examples of failed section images due to surface abrasion failure.

FIG. 5F shows examples of failed section images due to surface abrasion failure. The surface abrasion is caused by scratches on surface of sections in image generating chip during manufacturing process or during preparation of samples on sections. The scratches are visible as lines on images of the sections as shown in illustration 535. Note that despite call rate values are above pass threshold for three sections in a broken line box on the left, the images are labeled as failed due to surface abrasion failure.

Figure 5G:
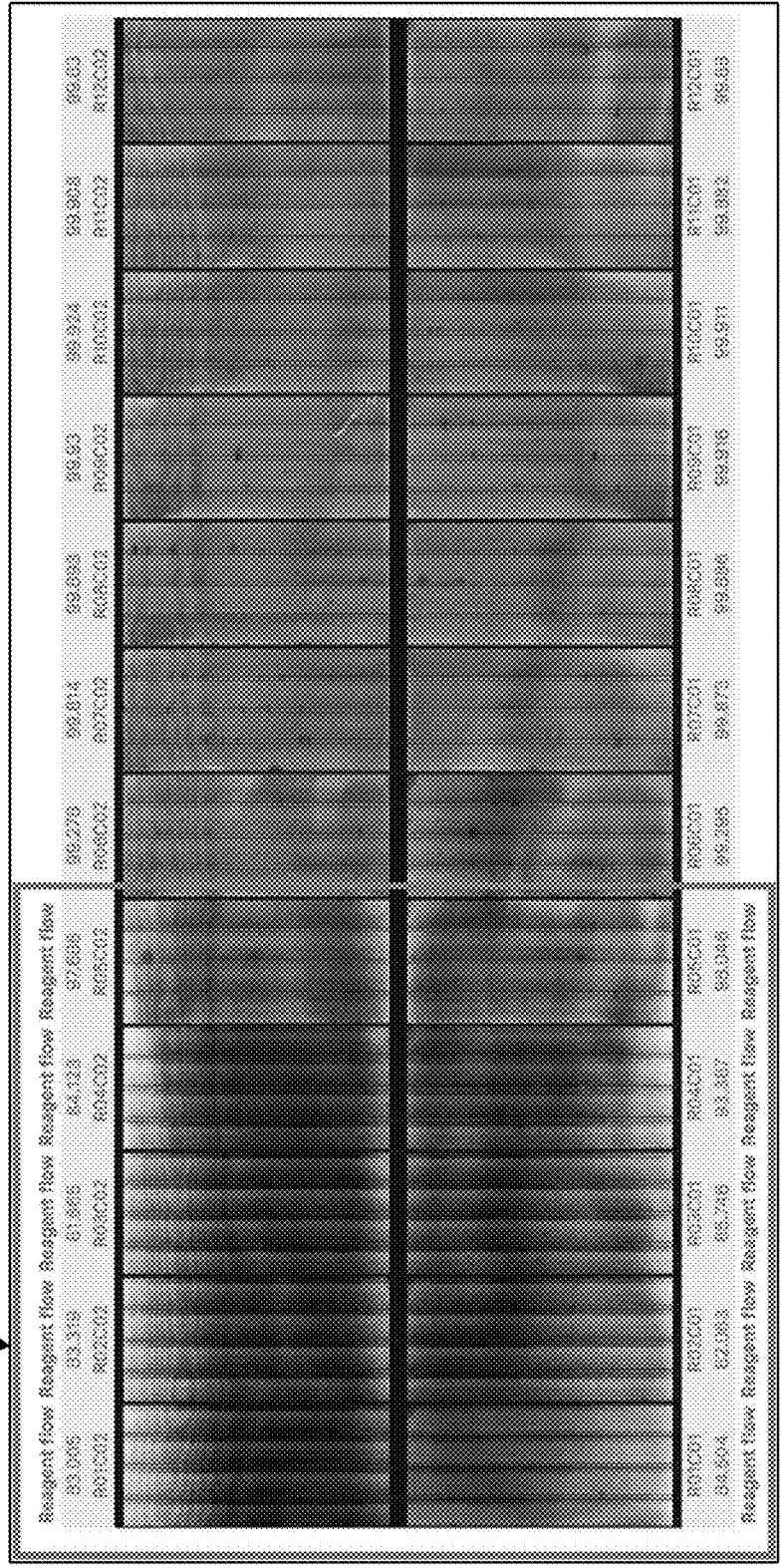
FIGS. 5G and 5H present examples of failed section images due to reagent flow failure.
Figure 5H:
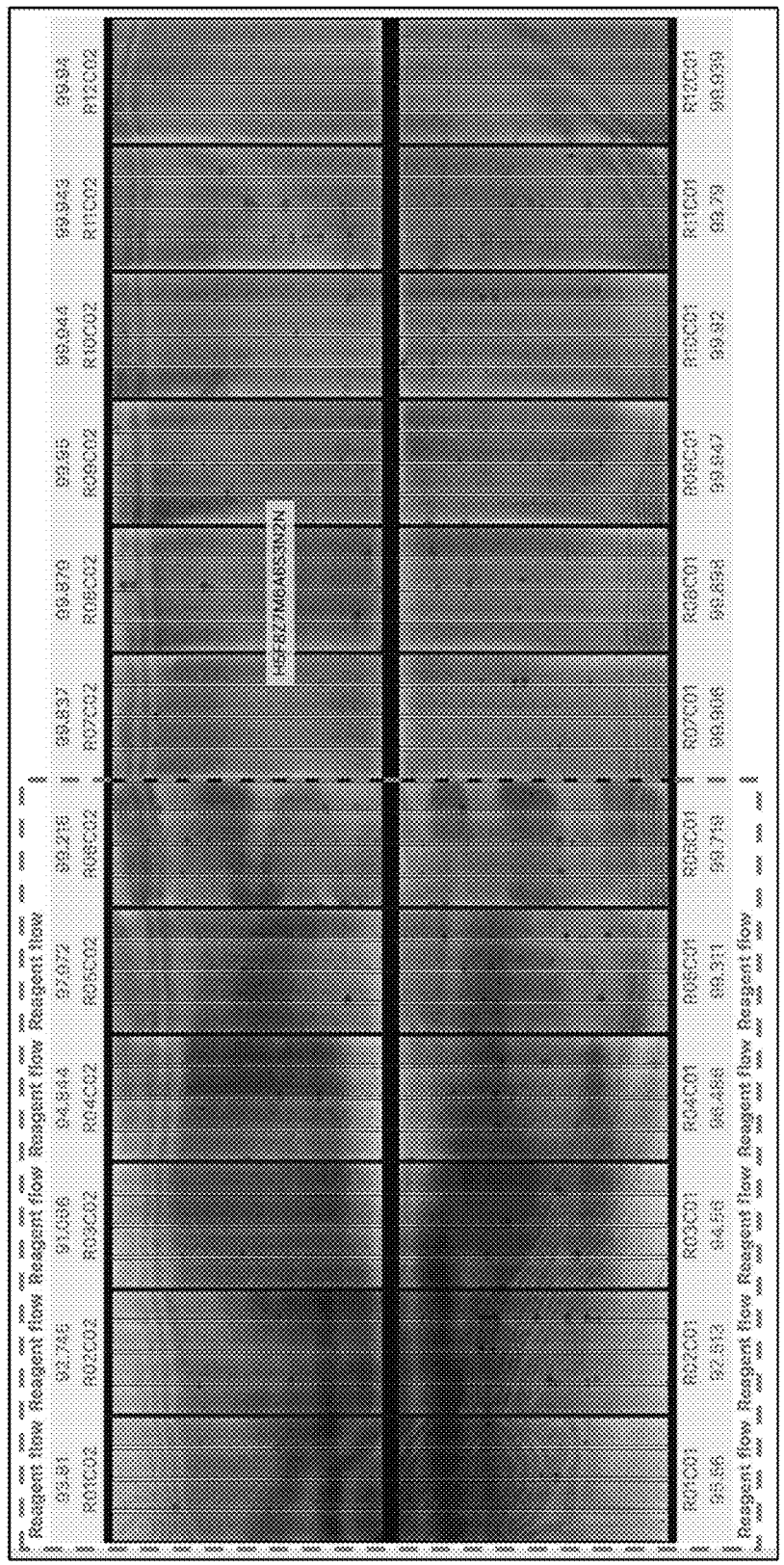

FIG. 5G is an illustration 540 of failed section images due to reagent flow failure. Ten section images in a box 542 are labeled as failed images due to reagent flow failure. The section images failed due to unsuccessful process caused by improper reagent flow. During genotyping process, reagent is introduced in image generating chip from one side. The reagent flows from one end of the image generating chip towards the opposite end and completely covers all sections. Sometimes, there is an issue in flow of the reagent, and it does not propagate evenly to all sections. In this case, the reagent may become dry when sufficient amount of reagent does not cover a section. Improper reagent flow can reduce the strength of emitted signal from some sections as the fluorescence dye may not be evenly distributed over all sections thus impacting the image quality. The failed images due to reagent flow failure can appear as darker in color compared to section images representing successful process cycle. FIG. 5H shows further examples of failed section images due to reagent flow failure in an illustration 545. The reagent flow failure can impact multiple neighboring sections in a region of the image generating chip as shown in FIG. 5G and FIG. 5H.

Figure 5I:
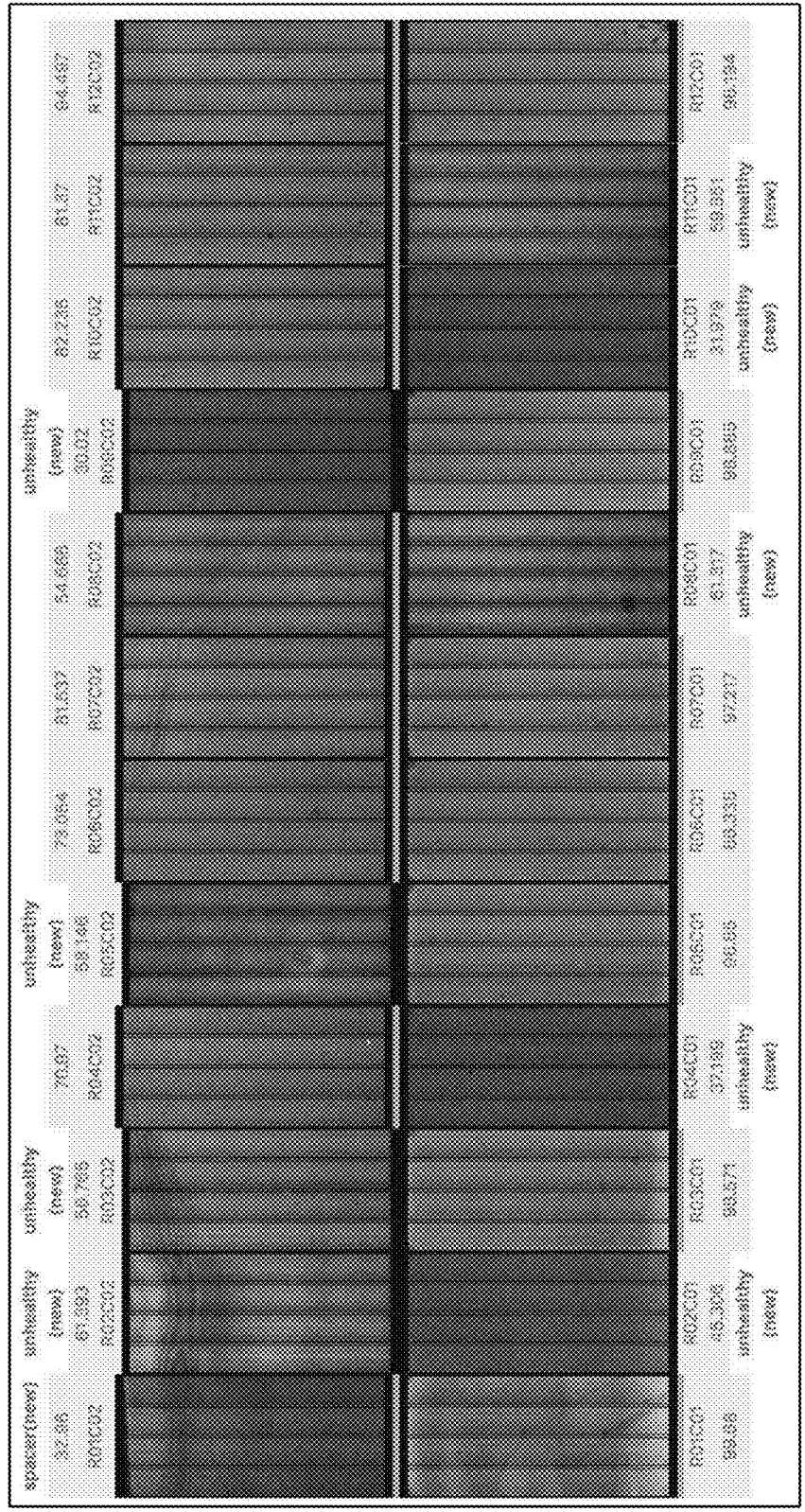
FIG. 5I presents examples of failed section images for which source of failure is unknown.

FIG. 5I presents examples of failed images due to unknown reasons. The failed section images are labeled as "unhealthy". The failed images in unhealthy class of failures can be due to mixed or unidentified causes and weak signals. The illustration 550 of the images of sections also show an example of spacer failure for section on the top left of the image generating chip. The image section on the top left position (row 1 and column 2) is labeled as spacer failure. It can be seen that top portion of the failed section image is dark colored. The portion of dark colored region on the top increases from right corner of the section image to the left corner.

Principal Component Analysis-Based Feature Generation

Figure 6A:
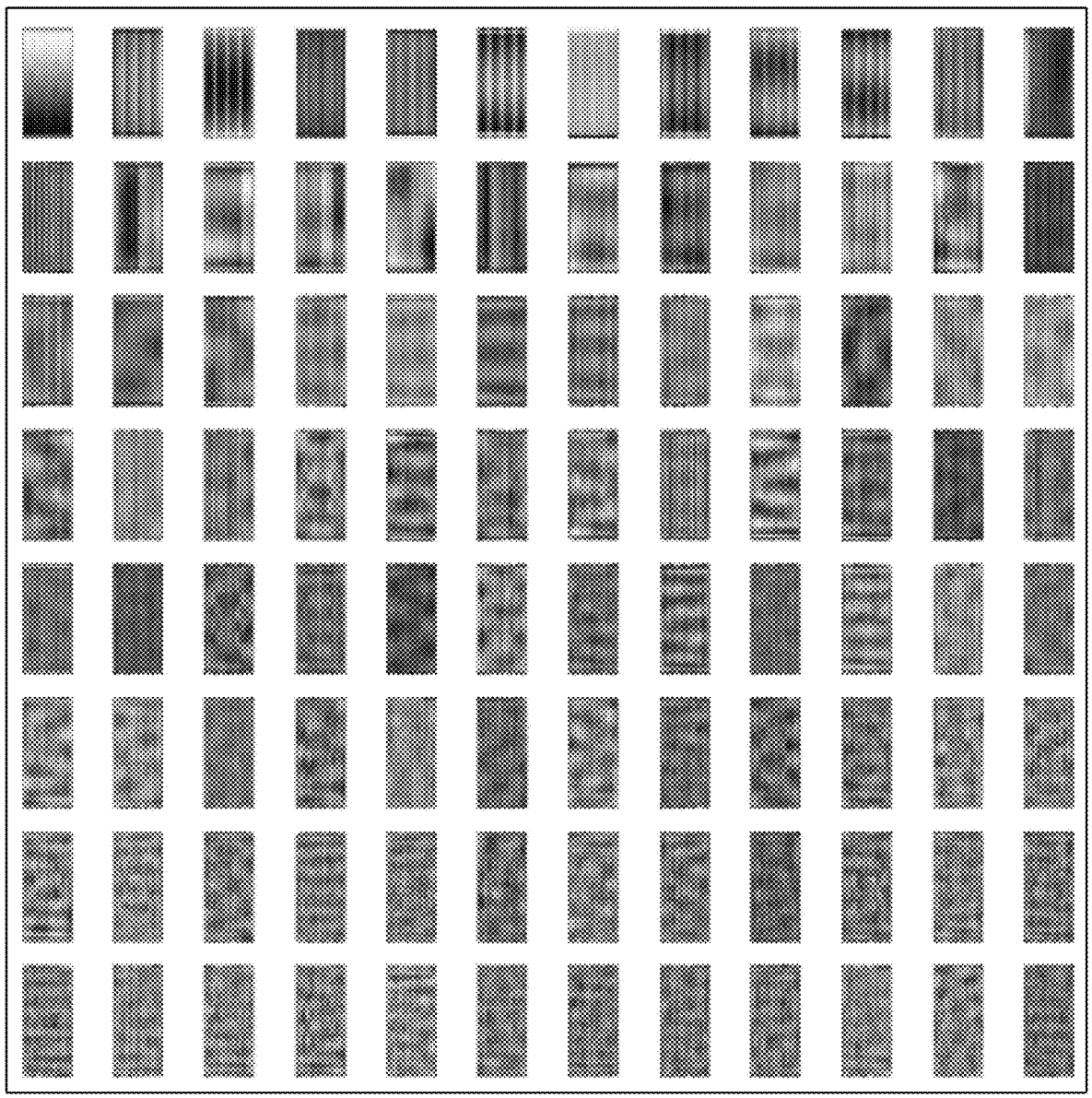
FIG. 6A is an example of 96 Eigen image components selected by rank ordering of principal components that are generated using Principal Component Analysis (PCA).
Figure 6B:
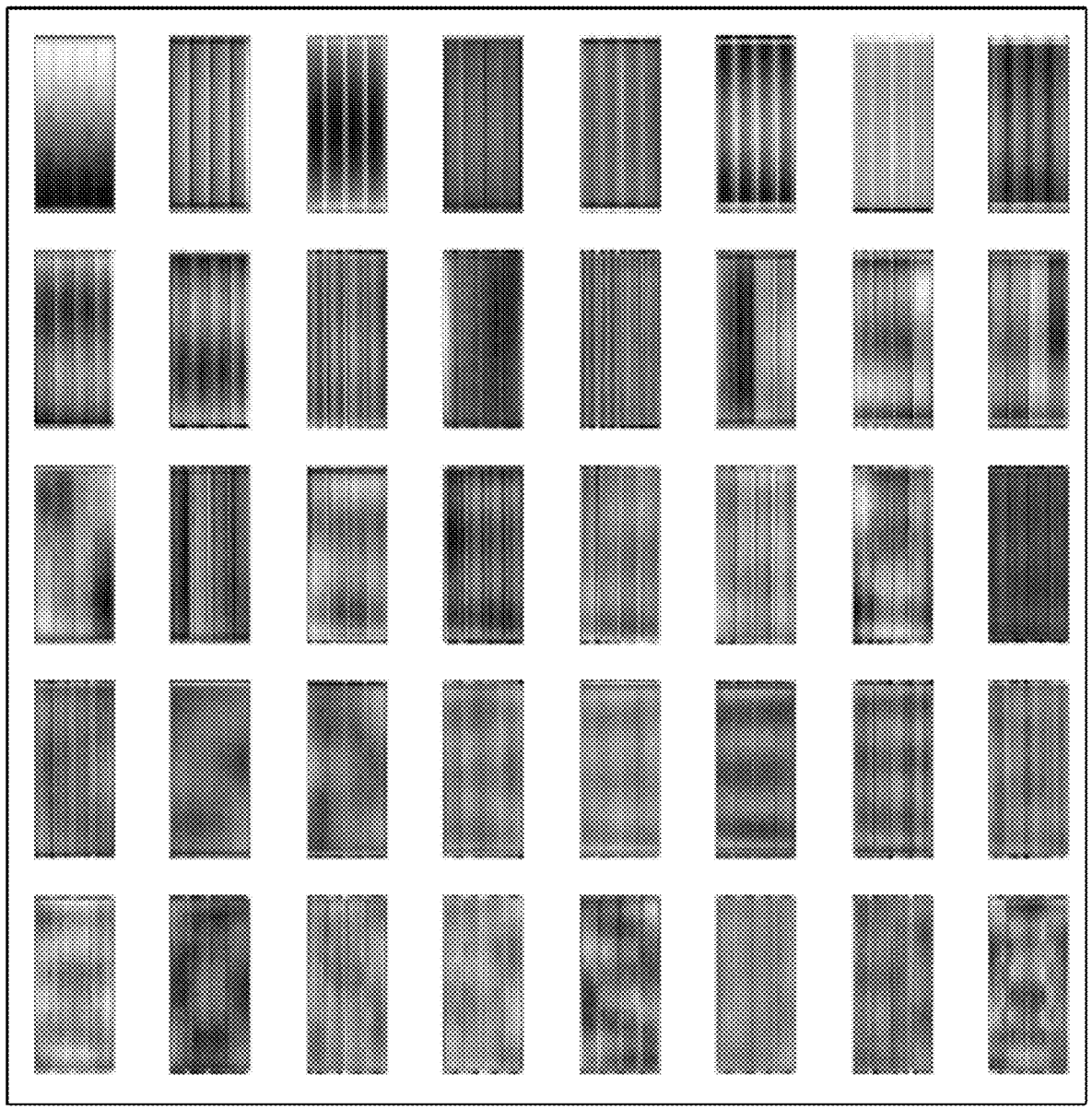
FIG. 6B is an enlargement of the top 40 Eigen image components selected from the 96 images in FIG. 6A.

We now present examples of Eigen images, which, in the field of facial recognition, are referred to as Eigen faces. From tens of thousands of labeled images, a linear basis of 40 to 100 or more image components is identified. FIG. 6A presents an example of 96 Eigen images obtained by applying Principal Component Analysis (PCA). The 96 Eigen images are selected based on rank ordering of components according to a measure of explained variability as presented above. FIG. 6B shows top 40 ranked Eigen images from the 96 Eigen images in FIG. 6A. In one implementation, it was observed that 40 components explained most of the variability. Additional components selected appeared to reflect patterns of noise or natural variability in sample processing.

Figure 7A:
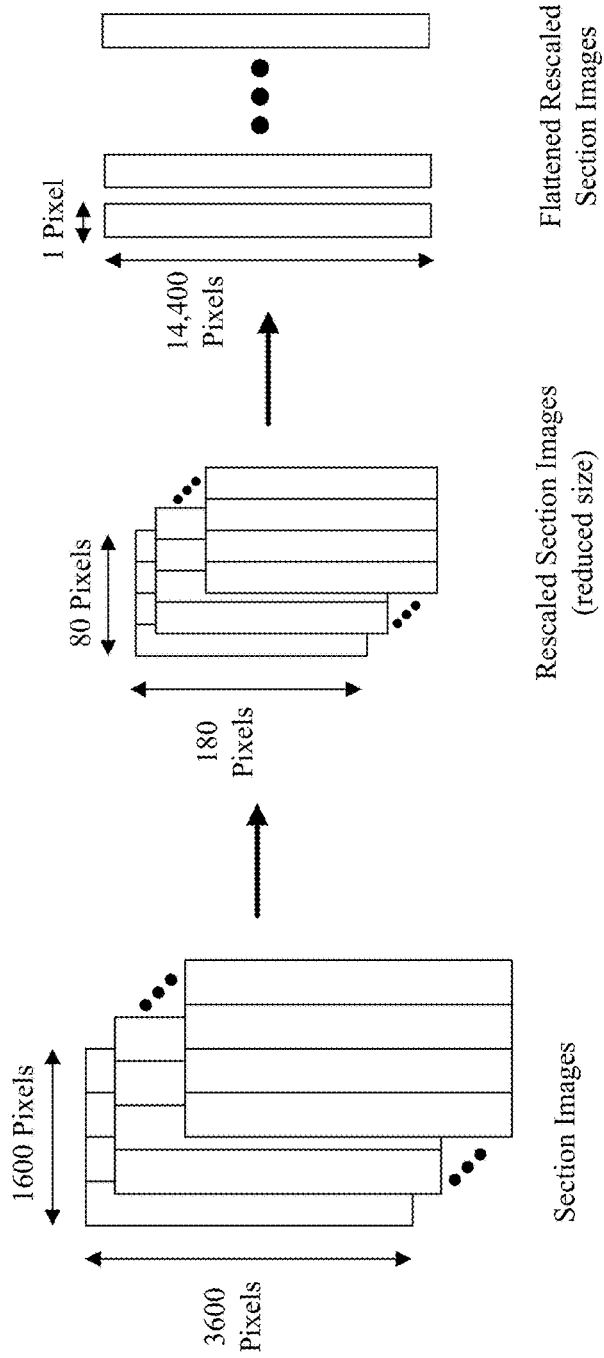
FIG. 7A illustrates image rescaling and flattening of section images for input to Principal Component Analysis.

We now describe dimensionality reduction and creation of basis of Eigen images using PCA. The first step is to reduce the resolution of images of sections and prepare the reduced images for input to PCA. FIG. 7A presents an illustration 710 showing dimensionality reduction. The section images of 3600×1600 pixels resolution are downsampled to 1/20 times per side resulting in section images with reduced size of 180×80 pixels. The downsampled section images are flattened. The resulting flattened section images are a one-dimensional array, i.e., 14,400×1 pixels each.

Other dimensionality reductions can be used as alternatives to 1/20 size on each edge. The principle is that it takes much less information, much less pixel density, to evaluate the overall health of a flow cell than to call individual clusters or balls in the flow cell. Thus, reductions in a range of 1/2 to 1/50 or in a range of 1/4 to 1/40 could be used, with more extreme reductions in resolution expected as the initial resolution of a section image increases. It is desirable to select a resolution reduction that fits a captured section into the input aperture of the deep learning framework, especially when transfer learning can be applied to leverage pre-training of the deep learning framework. The downsampling to 180×80 pixel, to 1/20, with reflections both horizontally and vertically proved to be a good choice with an input aperture of 224×224 pixels. Other reductions will be evident for different section images and different deep learning input apertures.

Figure 7B:
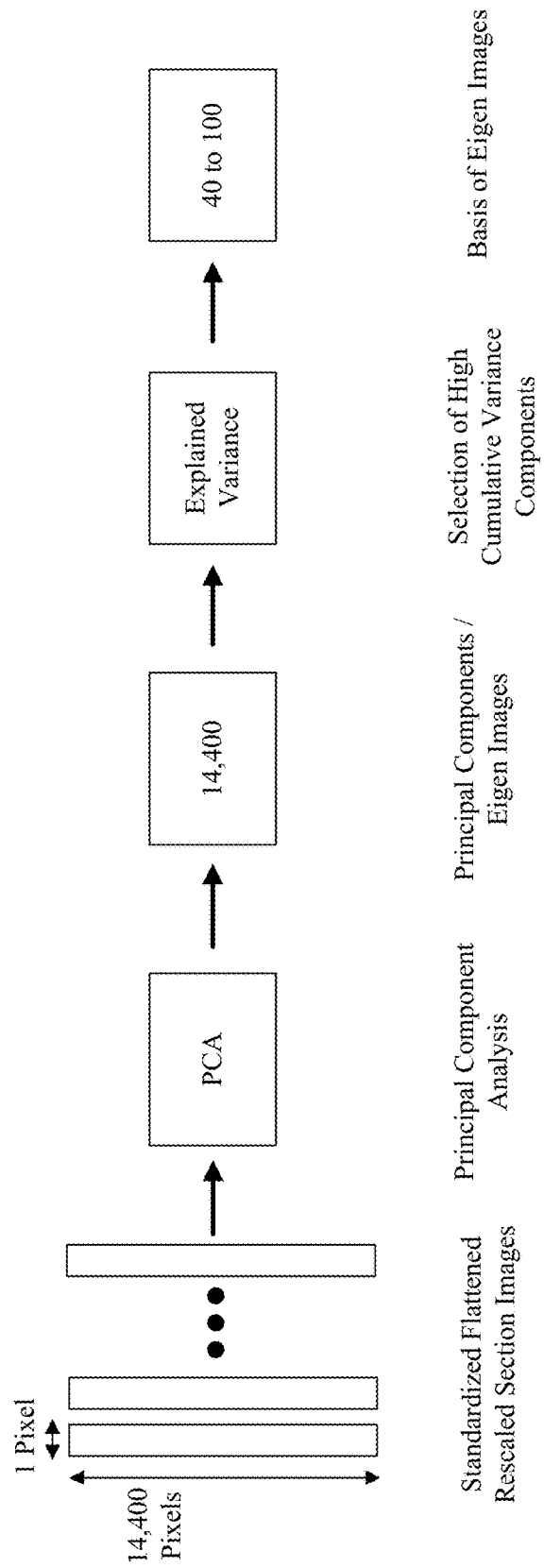
FIG. 7B illustrates creation of a basis of Eigen images using Principal Component Analysis.

In alternative implementations, PCA is applied to downsampled images, as described in a prior application. The flattened section images are standardized as explained above, thus resulting in standardized flattened rescaled section images as shown in an illustration 740 in FIG. 7B which are given as input to PCA. The PCA thus produces 14,400 principal components or Eigen images. Each input image is a vector in 14,400-dimensional space. We then use explained variance to rank order principal components or Eigen images and create a basis, for instance a basis of 40 to 100 components. The components form a basis of a linear space.

Image Segmentation-Based Feature Generation

Figure 8A:
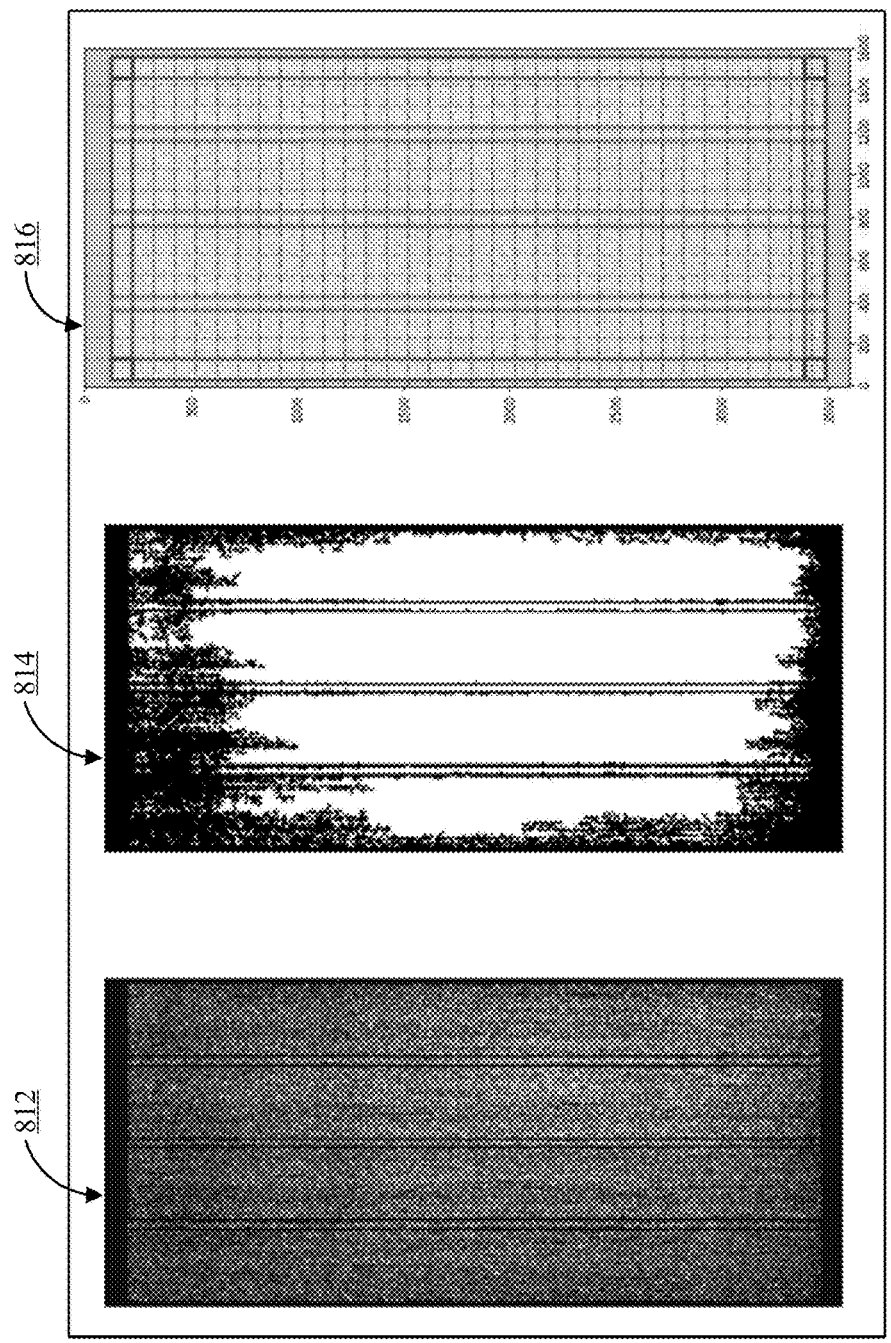
FIG. 8A illustrates an example of feature generation using intensities of areas of sections.

The second image processing technique to generate features from images of section involves thresholding of image areas or segments. FIG. 8A shows an example 810 of segmentation-based feature generation applied to a section image. The illustration 812 in the example 810 is a production image of a section of an image generating chip. We apply image transformation to transform this grayscale production image 812 to generate a counterpart binary image 814. In one implementation, some, or all of the five steps presented above with reference to image transformer 257 can be performed to transform the grayscale image to a binary image. The black pixels in binary image 814 indicate unhealthy or bad image pixels while bright pixels indicate healthy or good image pixels.

In FIG. 8A, an illustration 816 on the right is an example schematic of a section indicating various areas of the section and borders or lines around these areas. The areas from which intensity of the fluorescent signal is recorded are also referred to as active areas or regions of interest. For example, the section schematic 816 indicates active areas of four slots that run parallel to each other from top to bottom. The areas of the section image that are not active areas are filtered out of the image. For examples, the boundary areas of slots that are separated from each other by vertical lines that indicate boundaries or borders of slots. Similarly, the borders on the four sides of the section image can be filtered out. The segmentation technique can divide the section images into 4 to 20 or more segments or active areas. The thresholding determines how much of an active area is producing a desired signal strength.

The number of active areas determine the number of features generated per image. For example, if the section image is segmented into eight active areas, then image intensity from eight active areas of the transformed image and the image intensity values from the same eight active areas of the original section image before transformation are given as input to the classifier. Thus, in this example, a total of 16 features per section image will be given to the classifier. An average intensity of the signal strength from an active area can be used as input to a classifier. For example, if the section image is segmented into eight active areas then average intensity of these eight active areas is calculated for both grayscale image and binary image. These sixteen intensity values are given as input to the classifier to classify the section image as good vs bad. Other segmentation schemes can be used which divide the image into fewer or more segments such as 4, 12, 17 or more segments per image. If given as input to a random forest classifier, a subset of features is randomly selected for each decision tree. The decision tree votes the image as healthy (or successful) or unhealthy (or failed). The majority votes in random forest are used to classify the image. In one implementation, the value of number of trees in the random forest classifier is in the range of 200 to 500 and the value of the depth of the model is in the range of 5 to 40. The patterns of failures among areas and sections of an image generating chip can be further evaluated for root cause classification.

Figure 8B:
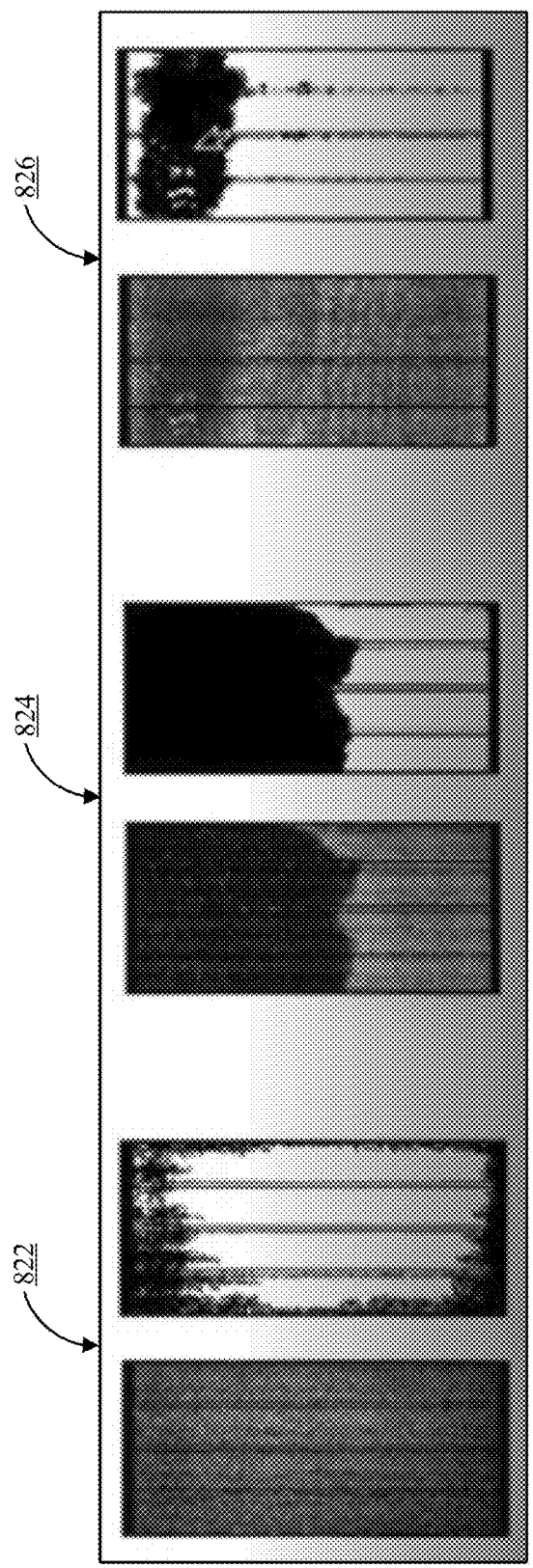
FIG. 8B illustrates another example of feature generation using intensities of areas of sections.

FIG. 8B presents an illustration 820 of three pairs of section images 822, 824, and 826. The left image in each pair is the pre-transformed grayscale section image and the right image in each pair is processed binary image after applying the image transformations as described with reference to FIG. 2. The first image pair 822 is a production image of a successful genotyping process. The second image pair 824 is a production image of failed production image due to hybridization (or hyb) failure. The third image pair 826 is of a failed image due to surface abrasion issue.

One Vs. The Rest (OvR) Classification

Figure 9:
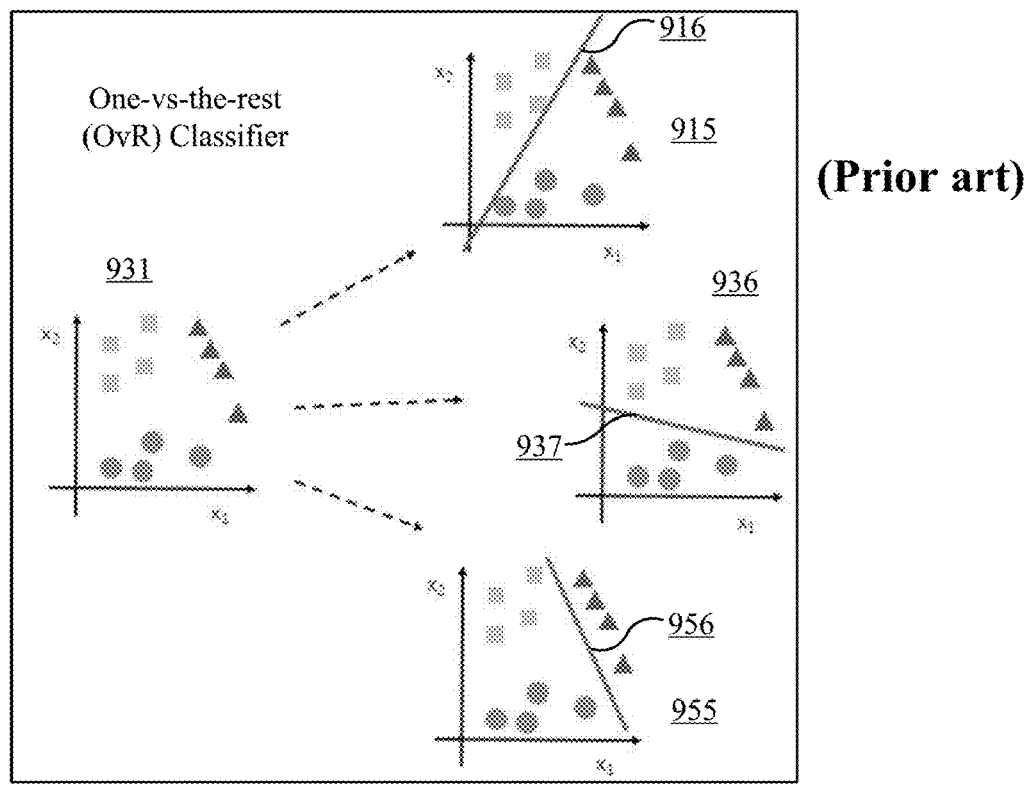
FIG. 9 is a graphical illustration of one-vs-the-rest (OvR) classifier.

FIG. 9 presents graphical illustrations 900 of running one-vs-the-rest classifier. The graphs show examples of running one-vs-the-rest (OvR) classifier on a data set consisting of samples belonging to three classes (squares, circles, and triangles) as shown in the left graph 931. A first hyperplane 916 as shown in the top right graph 915 shows a hyperplane determination for the square class as the ground truth. The hyperplane 916 partitions the data points in the square class from the rest of the data points (circles and triangles). Similarly, graphs 936 and 955 respectively partition data points in circle and triangle classes from other classes in the data via hyperplanes 937 and 956 respectively. The position of the hyperplane is determined by the weight vector. The training algorithm attempts to maximize the margin of the hyperplane from the ground truth class for generalization, however it may result in incorrect classification of one or more data points. We apply OvR classification to distinguish section images from process cycles belonging to a good class from images belonging to multiple bad (or failure) classes.

Random Forest Classifiers

The technology disclosed can apply a variety of classifiers to distinguish images from good or healthy images from bad or unhealthy images belonging to multiple failure classes. Classifiers applied includes random forest, K-nearest neighbors, multinomial logistic regression, and support vector machines. We present the implementation of the technology disclosed using random forest classifier as an example.

Random forest classifier (also referred to as random decision forest) is an ensemble machine learning technique. Ensembled techniques or algorithms combine more than one technique of the same or different kind for classifying objects. The random forest classifier consists of multiple decision trees that operate as an ensemble. Each individual decision tree in random forest acts as base classifier and outputs a class prediction. The class with the most votes becomes the random forest model's prediction. The fundamental concept behind random forests is that a large number of relatively uncorrelated models (decision trees) operating as a committee will outperform any of the individual constituent models.

The technology disclosed applies the random forest classifiers in a two-staged classification process. A first trained random forest classifier performs the task of separating successful production images from unsuccessful production images. A second trained random forest classifier performs the task of root cause analysis of unsuccessful production images by predicting the failure class of an unsuccessful image. This two-stage classification was selected due to dominance of successful production runs but a one-stage classification can also be used. Another reason for selecting the two-stage approach is that it allows us to control the sensitivity threshold for classifying an image as a healthy or successful production image versus an unhealthy or a failed production image. We can increase the threshold in first stage classification thus causing the classifier to classify more production images as failed images. These failed images are then processed by the second stage classifier for root cause analysis by identifying the failure class.

Training of Random Forest Classifiers

Figure 10A:
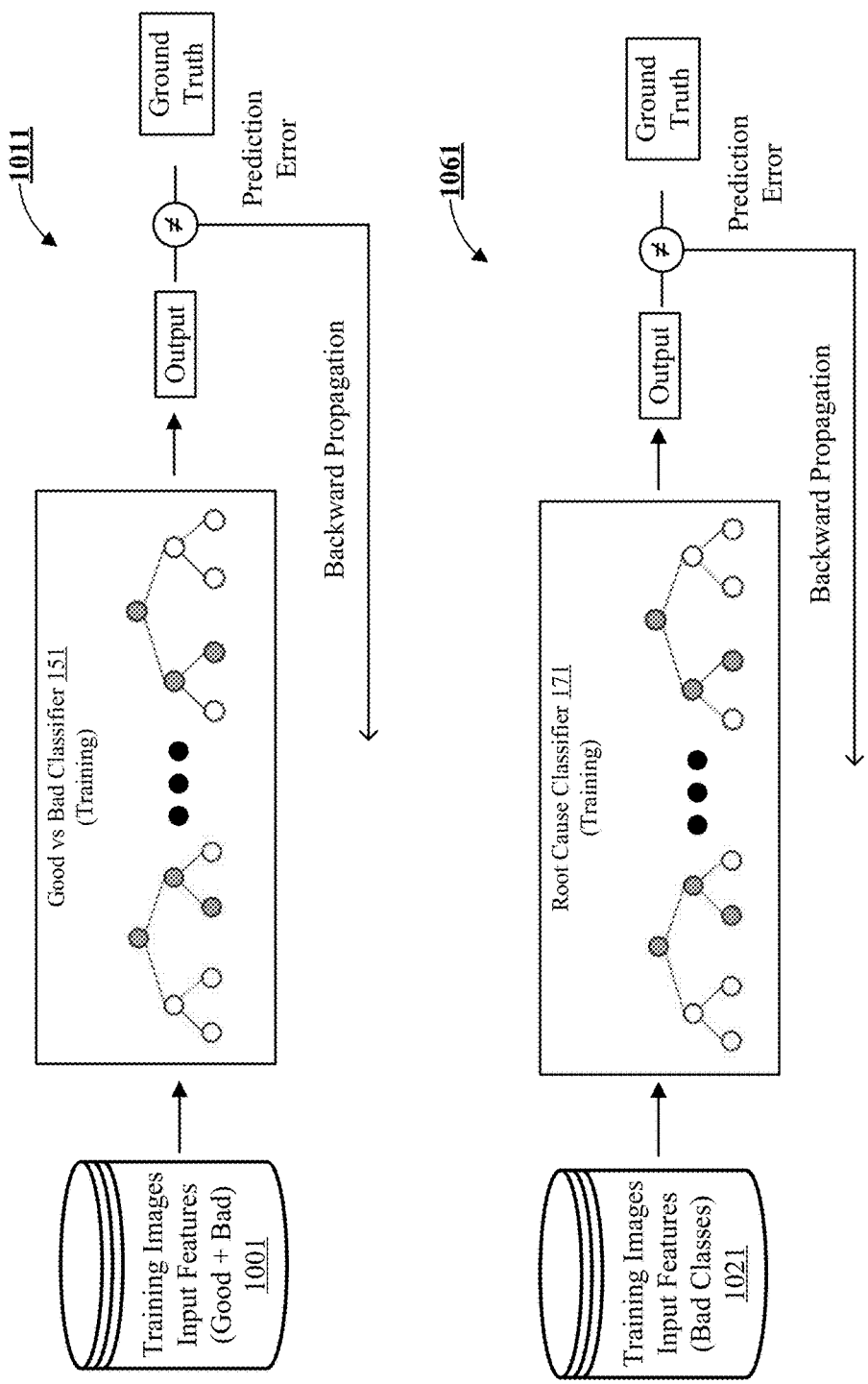
FIG. 10A illustrates training of a binary (good vs. bad) classifier and a multiclass (root cause) classifier using labeled training data comprising process cycle images.

FIG. 10A describes training of two random forest classifiers as shown in an illustration 1000. The training data comprises of input features for the labeled process cycle images stored in the training database 138 as shown in FIG. 1. In one example training of the classifiers, we used 20,000 labeled production images of sections. The labeled images include both good images from successful production cycles and failed images from unsuccessful production cycles. The size of the training database 138 will grow as more labeled production images are received from laboratories performing the genotyping process.

In one implementation, we used 96 weights of components of labeled production images to train random forest classifiers. A random forest classifier with 200 decision trees and a depth of 20 worked well. It is understood that random forest classifiers with a range of 200 to 500 decision trees and a range of depth from 10 to 40 is expected to provide good results for this implementation. We tuned the hyperparameters using randomized search cross-validation. The search range for depth was from 5 to 150 and search range for number of trees was from 100 to 500. Increasing the number of trees can increase the performance of the model however, it can also increase the time required for training. A training database 1001 including features for 20,000 production cycle images is used to train the binary classifier which is labeled as Good vs. Bad classifier 151. The same training database can be used to training root cause classifier 171 to predict the failure class. The root cause classifier 171 is trained on training database 1021 consisting of only the bad or failed production images as shown in FIG. 10A.

Decision trees are prone to overfitting. To overcome this issue, bagging technique is used to train the decision trees in random forest. Bagging is a combination of bootstrap and aggregation techniques. In bootstrap, during training, we take a sample of rows from our training database and use it to train each decision tree in the random forest. For example, a subset of features for the selected rows can be used in training of decision tree 1. Therefore, the training data for decision tree 1 can be referred to as row sample 1 with column sample 1 or RS1+CS1. The columns or features can be selected randomly. The decision tree 2 and subsequent decision trees in the random forest are trained in a similar manner by using a subset of the training data. Note that the training data for decision trees is generated with replacement i.e., same row data can be used in training of multiple decision trees.

The second part of bagging technique is the aggregation part which is applied during production. Each decision tree outputs a classification for each class. In case of binary classification, it can be 1 or 0. The output of the random forest is the aggregation of outputs of decision trees in the random forest with a majority vote selected as the output of the random forest. By using votes from multiple decision trees, a random forest reduces high variance in results of decision trees, thus resulting in good prediction results. By using row and column sampling to train individual decision trees, each decision tree becomes an expert with respect to training records with selected features.

During training, the output of the random forest is compared with ground truth labels and a prediction error is calculated. During backward propagation, the weights of the 96 components (or the Eigen images) are adjusted so that the prediction error is reduced. The number of components or Eigen images depends on the number of components selected from output of principal component analysis (PCA) using the explained variance measure. During binary classification, the good vs. bad classifier uses the image description features from the training data and applies one-vs-the-rest (OvR) classification of the good class (or healthy labeled images) versus the multiple bad classes (images labeled with one of the six failure classes). The parameters (such as weights of components) of the trained random forest classifier are stored for use in good vs. bad classification of production cycle images during inference.

The training of the root cause classifier 171 is performed in a similar manner. The training database 1021 comprises of features from labeled process cycle images from bad process cycles belonging to multiple failure classes. The random forest classifier 171 is trained using the image description features for one-vs-the-rest (OvR) classification of each failure class verses the rest of the labeled training examples.

Classification Using Random Forest Classifiers

Figure 10B:
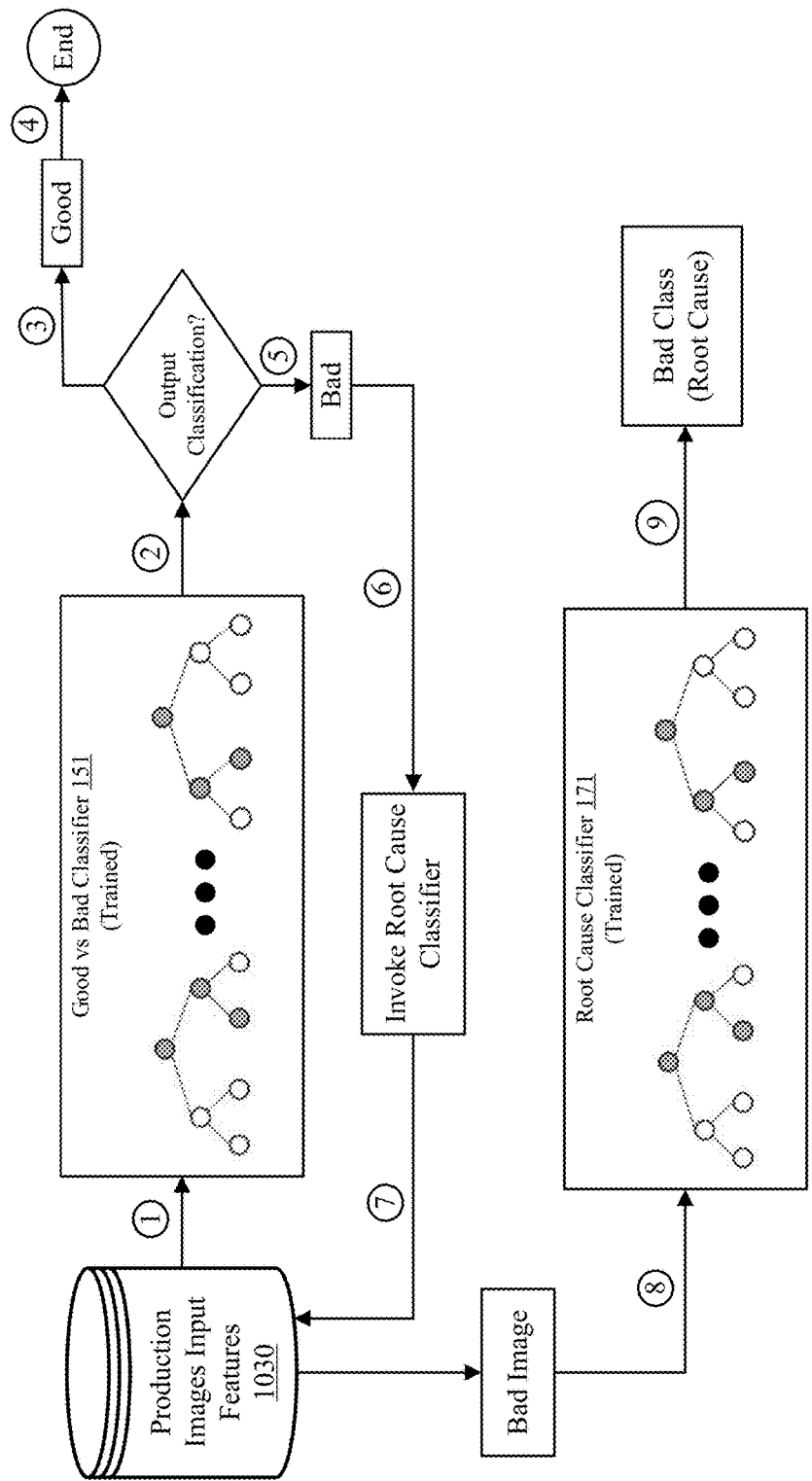
FIG. 10B illustrates a two-step process in which production process cycle images are classified as good vs. bad and further a failure category of the bad images is determined.

We now describe the classification of production images using the trained classifiers 151 and 171. FIG. 10B presents the two-stage classification 1080 of production images using the good vs. the bad classifier 151 in a first stage and a root cause classifier 171 in a second stage. The process is presented using a sequence of process flow steps labeled from 1 to 9. The process starts at a step 1 by accessing a trained random forest classifier labeled as good vs. bad classifier 151. Input features of production images stored in a database 1030 are provided as input to the classifier 151. The classifier distinguishes good images belonging to successful process cycle from bad images belonging failed process cycles. The bad images belong to multiple failure classes for example, each image can belong to one of the six failure classes as described above. The trained classifier accesses a basis of Eigen images with which to analyze a production image. The trained classifier creates image description features for the production image based on linear combination of Eigen images. The weights of the Eigen images are learned during the training of the classifier as described above.

As we apply the one-versus-the-rest classification, all decision trees in the random forest classifier predict output for each class, i.e., whether the image belongs to one of the seven classes (one good class and six failure classes). Therefore, each decision tree in the random forest will output seven probability values, i.e., one value per class. The results from the decision trees are aggregated and majority vote is used to predict the image as good or bad. For example, if more than 50% of the decision trees in the random forest classify the image as good, the image is classified as a good image belonging to a successful production cycle. The sensitivity of the classifier can be adjusted for example, by setting the threshold higher will result in more images classified as bad. In process step 2, the output from the classifier 151 is checked. If the image is classified as a good image (step 3), the process ends (step 4). Otherwise, if the image is classified as a bad image indicating a failed process cycle (step 5), the system invokes root cause classifier 171 (step 6).

The root cause classifier is applied in the second stage of the two-stage process to determine the class of failure of the bad image. The process continues in the second stage by accessing the production image input feature for the bad image (step 7) and providing the input features to the trained root cause classifier 171 (step 8). Each decision tree in the root cause classifier 171 votes for the input image features by applying the one-vs-the-rest classification. In this case, the classification determines whether the image belongs to one of the six failure class versus the rest of the five failure classes. Each decision tree provides classification for each class. Majority votes from decision trees determine the failure class of the image (step 9).

We can use other classifiers to classify good section images vs. bad section images and perform root cause analysis. For example, the technology disclosed can apply K-nearest neighbors (k-NN or KNN) algorithm to classify section images. The k-NN algorithm assumes similar examples (or section images in our implementation) exist in close proximity. The k-NN algorithm captures the idea of similarity (also referred to as proximity, or closeness) by calculating the distance between data points or images. A straight-line distance (or Euclidean distance) is commonly used for this purpose. In k-NN classification, the output is a class membership, for example, a good image class or a bad image class. An image is classified by a plurality of votes of its neighbors, with the object being assigned to the class most common among its k nearest neighbors. The value of k is a positive integer.

To select the right value of k for our data, we run the k-NN algorithm several times with different values of k and choose the value of k that reduces the number of errors we encounter while maintaining the algorithm's ability to accurately make predictions when it is given data that it has not seen before. Let us assume, we set the value of k to 1. This can result in incorrect predictions. Consider we have two clusters of data points: good images and bad images. If we have a query example that is surrounded by many good images data points, but it is near to one bad image data point that is also in the cluster of good images data points. With k=1, the k-NN incorrectly predicts that the query example is bad image. As we increase the value of k, the prediction of the k-NN algorithm become more stable due to majority voting (in classification) and averaging (in regression). Thus, the algorithm is more likely to make more accurate predictions, up to a certain value of k. As the value of k is increased, we start observing increasing number of errors. The value of k in the range of 6 to 50 is expected to work.

Examples of other classifiers that can be trained and applied by the technology disclosed include multinomial logistic regression, support vector machines (SVM), gradient boosted trees, Naïve Bayes, etc. We evaluated the performance of classifiers using three criteria: training time, accuracy and interpretability of results. Random forest classifier performed better than other classifiers. We briefly present other classifiers in the following text.

Support vector machines classifier also performed equally well as random forest classifier. An SVM classifier positions a hyperplane between feature vector for the good class vs feature vectors for the multiple bad classes. The technology disclosed can include training a multinomial logistic regression. The multinomial regression model can be trained to predict probabilities of different possible outcomes (multi-class classification). The model is used when the output is categorical. Therefore, the model can be trained to predict whether the image belongs to a good class or one of the multiple bad classes. The performance of the logistic regression classifier was less than the random forest and SVM classifiers. The technology disclosed can include training a gradient boosted model which is an ensemble of prediction models such as decision trees. The model attempts to optimize a cost function over function space by iteratively choosing a function that points in the negative gradient direction. For example, the model can be trained to minimize the mean squared error over the training data set. Gradient boosted model required more training time as compared to other classifiers. The technology disclosed can include training Naïve Bayes classifier that assume that the value of a particular feature is independent of the value of any other feature. A Naïve Bayes classifier considers each of the features to contribute independently to the probability of an example belonging to a class. Naïve Bayes classifier can be trained to classify images in a good class vs. multiple bad classes.

Examples of Feature Engineering for Deep Learning-Based Classification

We present examples of feature engineering of images for input to convolutional neural networks (CNNs). The feature engineering techniques shown in FIG. 11A such as cropping, zero-padding and reflection operations are used to generate analysis frames 1105, 1107, and 1109 that have a size of M×N pixels. The analysis frame is sized to match the input image size used by a particular convolutional neural network. In one instance, the size of analysis frame is 224×224 pixels which matches the size of input images required by, ResNet-18 and VGG-16 models. The dimensions used in this example are 3600×1600 pixels for a section image. The example illustrates how the section image of 3600×1600 pixels is adapted to a square frame of size 224×224 pixels for input to the convolutional neural network (CNN). The first step in this process is to downsample the section image of 3600×1600 pixels by ½₀ on each side to get a reduced sized image of 180×80 pixels. The second step is to place the 180×80 pixels image into a frame of 224×224 pixels. Then the placed image is reflected horizontally to fill the 224×224 pixel square frame on the left and right side of the placed image of 180×80 pixels. The 180×80 pixels image is then reflected vertically to fill the top and bottom portion of the 224×224 square frame.

Figure 11A:
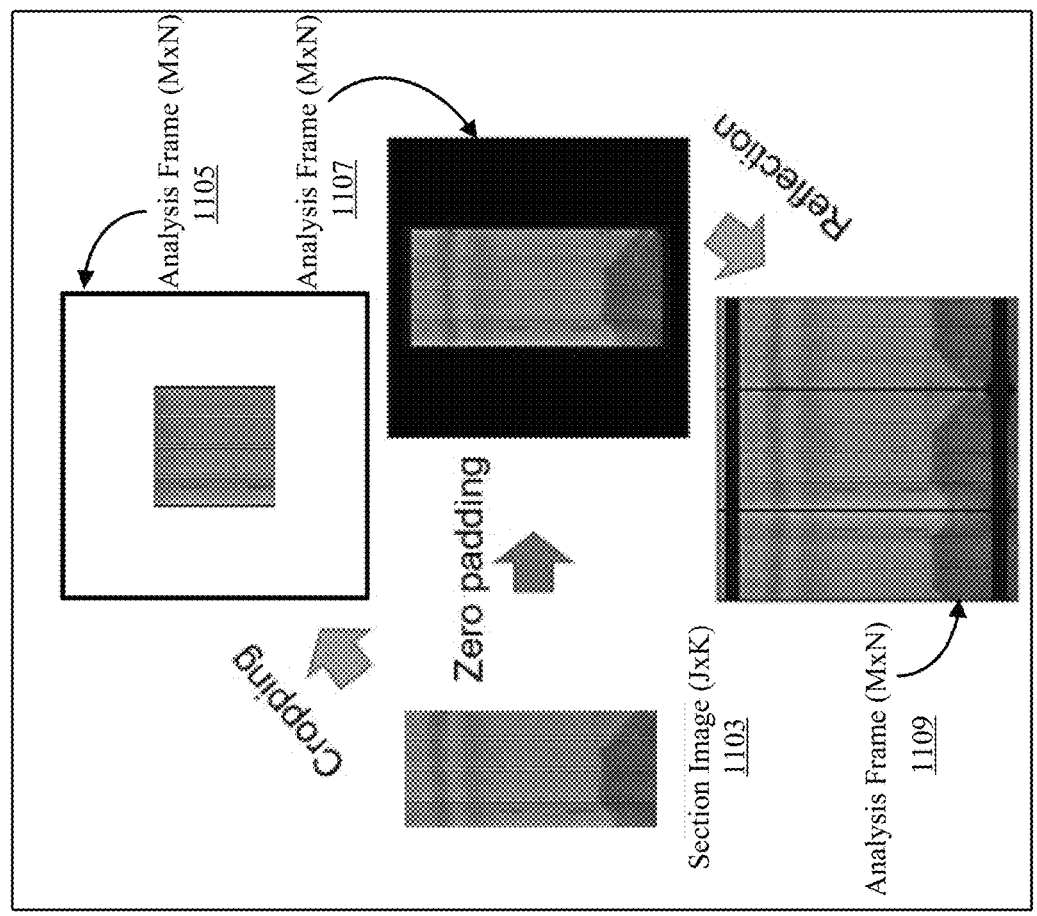
FIGS. 11A and 11B present examples of feature engineering techniques applied to training data images.

FIG. 11A includes an illustration 1100 showing cropping, zero-padding, and reflection operations on section images. An example section image 1103 is shown. The section image 1103 is rectangular in shape. In cropping, a center portion or any other portion of the section image is cropped. FIG. 11A, illustrates a cropped portion from the section image 1103, placed in the analysis frame 1105. The cropped portion of the section image can be of square dimensions, i.e., the cropped portion has a same number of pixels along the height and the width of the cropped portion. For example, the cropped image placed in the analysis frame 1105 can be 80×80 pixels cropped portion of the J×K image 1103. The cropped portion can be positioned in the center of the analysis frame. In other implementations, the cropped portion can be positioned closer to one side of the analysis frame. In another implementation, the cropped portion can be resampled to make the size of the cropped section equal to the size of the analysis frame e.g., 224×224 pixels. This will result in the cropped section completely filling the analysis frame.

FIG. 11A shows zero-padding operation after the section image 1103 is placed in the analysis frame 1107. The section image can be positioned in the center of the analysis frame as shown in illustration 1107. The section image can also be positioned in any other location in the analysis frame. The surrounding pixels in the analysis frame can be given "0" image intensity values.

FIG. 11A also shows applying reflection to fill the pixels in analysis frame 1109. The section image can be positioned in the center of analysis frame 1107, then reflected horizontally to fill the analysis frame along the left and right edges of the analysis frame. It can also be reflected vertically along the top and bottom edges fill the top and bottom portions of the analysis frame 1109. Evaluation of various strategies, detailed below, revealed that reflection to fill a frame worked well in both training and production, without requiring any change in the input aperture of the image processing frameworks evaluated. Surprisingly, reflection significantly outperformed zero padding.

Figure 11B:
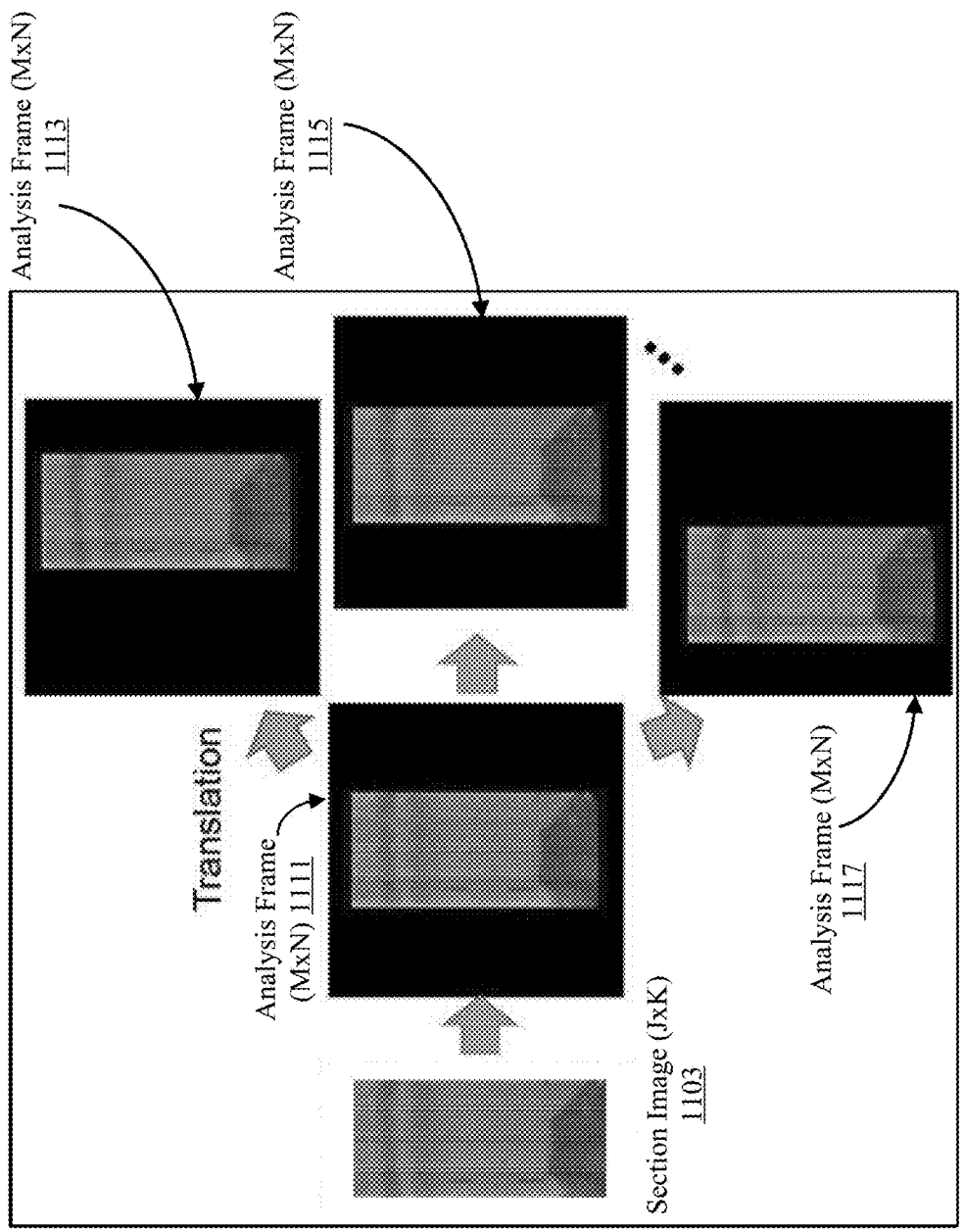

FIG. 11B illustrates augmentation of training data by applying translation to the training example section image 1103. Applying translation for data augmentation includes placing the section image at multiple positions in the analysis frame. For example, the section image is positioned in the center of the analysis frame as shown in the analysis frame 1111. The translation of the section image horizontally and vertically can produce multiple analysis frames as shown in illustrations 1113, 1115, 1117, etc. The surrounding area can initially be zero-padded, depicted by a dark color (or black) as shown in FIG. 11B. However, the surrounding area may not always be black. The technology disclosed can apply horizontal and vertical reflection padding, as shown in FIG. 11A, to fill the surrounding area with reflected section image.

Transfer Learning Using Fine-Tuning

Figure 12A:
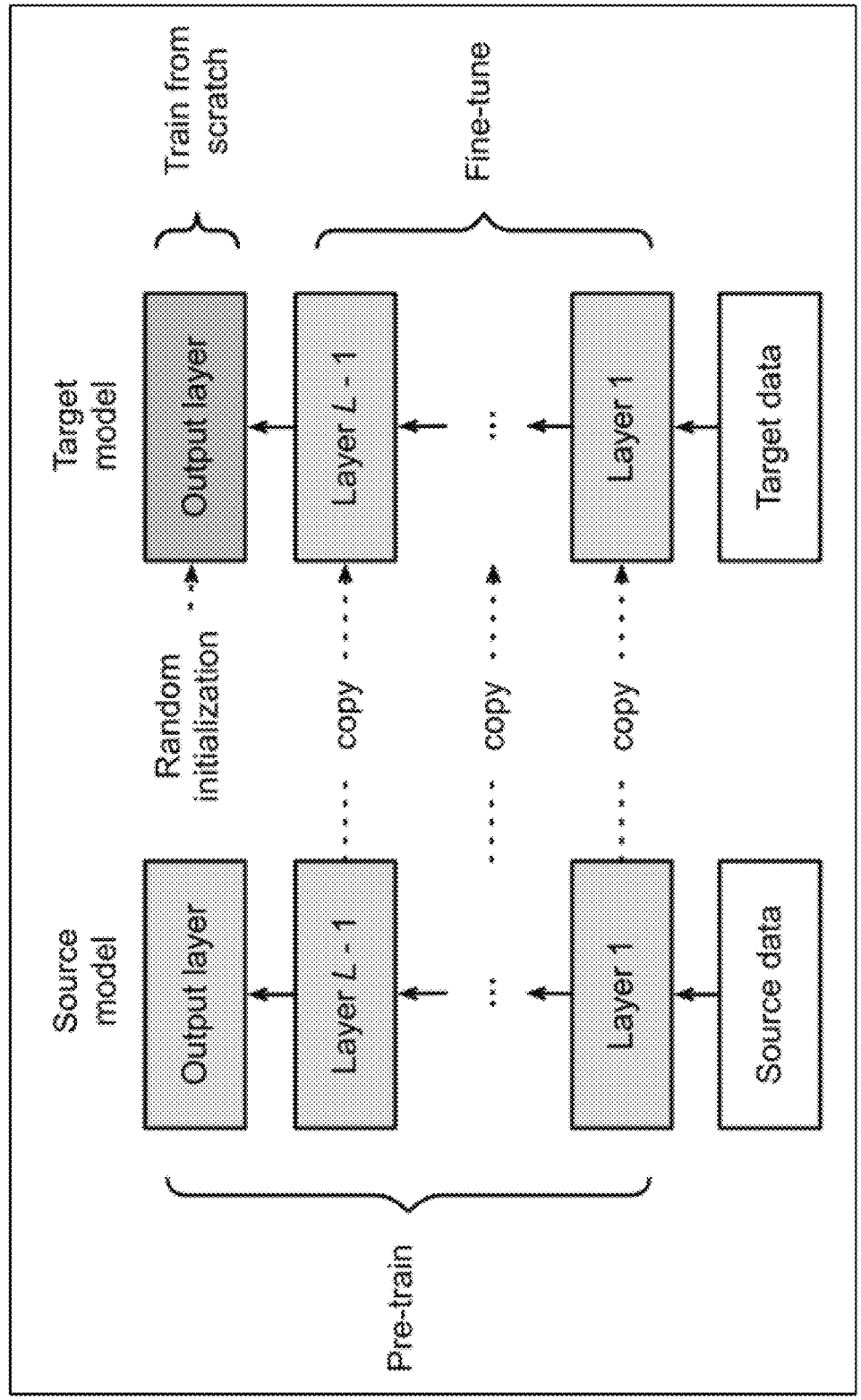
FIG. 12A illustrates transfer learning steps to train a convolutional neural network using fine-tuning.

In many real-world applications, an entire convolutional neural network (CNN) is not trained from scratch with random initialization. This is because in most cases training datasets are small. It is common to pretrain a CNN on a large dataset such as ImageNet, which contains around 14 million images with 1000 categories (available at <<image-net.org>>), and then use the pretrained CNN as an initialization or a fixed feature extractor for the task of interest. This process is known as transfer learning to migrate the knowledge learned from the source dataset to a target dataset. A commonly used transfer learning technique is referred to as fine-tuning. FIG. 12A, reproduced from <<d21.ai/chapter_computer-vision/fine-tuning.html>>, illustrates fine-tuning (1200). There are four steps to fine-tune a deep learning model.

Step 1: Pre-train a neural network model, i.e., the source model, on a source dataset (e.g., the ImageNet dataset).

Step 2: The second step is to create a new neural network model, i.e., the target model. This replicates all model designs and their parameters on the source model, except the output layer. We assume that these model parameters contain the knowledge learned from the source dataset and this knowledge will be equally applicable to the target dataset. We also assume that the output layer of the source model is closely related to the labels of the source dataset and is therefore, not used in the target model.

Step 3: The third step is to add an output layer to the target model whose output size is the number of target data set categories, and randomly initialize the model parameters of this layer. Therefore, for the detection task, the output layer of our model can have two categories (normal and failed). For the classification task, the output layer of our model can have five categories corresponding to the five defect categories. The model can have an additional category to classify images with unknown failure types not classified in existing known failure categories.

Step 4: The fourth step is to train the target model on a target dataset. In our case, the training dataset includes around 75 thousand labeled section images. We train the output layer from scratch, while the parameters of all remaining layers are fine-tuned based on the parameters of the source model.

Network Architecture of VGG-16 Model

The VGG architecture (Simonyan et al. 2015 available at <<arxiv.org/abs/1409.1556>>) has been widely used in computer vision in recent years. It includes stacked convolutional and max pooling layers. We have used the smaller and hence faster, 16-layer architecture known as VGG-16. The architecture (1210) is presented in FIG. 12B. The model consists of five convolutional layers conv1 (1220), conv2 (1222), conv3 (1224), conv4 (1226) and conv5 (1228). One way to analyze the output of the convolution is through a fully connected (FC) network. Therefore, the outputs of the convolution layers are given to fully connected (FC) layers. There are three fully connected layers, fc6 (1240), fc7 (1242), and fc8 (1244). The model uses "max pooling" in between convolutional layers and between the last convolutional layer and fully connected layer. There are five "max pooling" layers 1230, 1232, 1234, 1236, and 1238. We extract features from "conv5" layer (1228) which has a stride of 16 pixels.

The model takes as input, image sizes of 224×224 pixels. The input image can be an RGB image. The image is passed through a stack of convolutional (conv) layers, where the filters are used with a very small receptive field: 3×3 (to capture the notion of left/right, up/down, center). In one configuration, it utilizes 1×1 convolution filters, which can be seen as a linear transformation of the input channels (followed by non-linearity). The convolution stride is fixed to 1 pixel; the spatial padding of convolution layer input is such that the spatial resolution is preserved after convolution, i.e., the padding is 1-pixel for 3×3 convolutional layers.

Figure 12B:
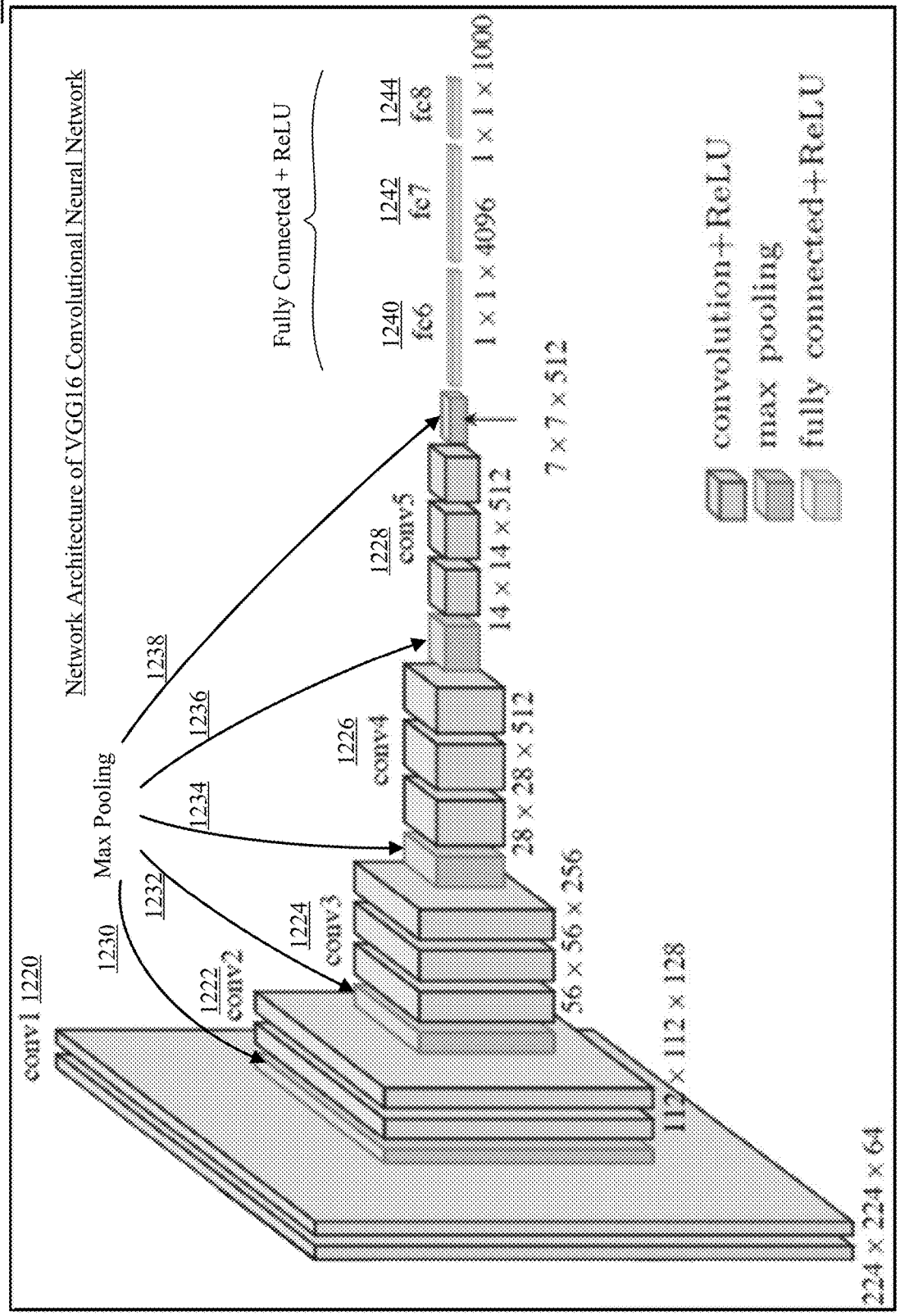
FIG. 12B presents network architecture of an example convolutional neural network model.

Spatial pooling is carried out by five "max pooling" layers 1230, 1232, 1234, 1236, and 1238 as shown in FIG. 12B, which follow some of the convolutional layers. The output of the convolution is also referred to as feature maps. This output is given as input to a max pooling layer. The goal of a pooling layer is to reduce the dimensionality of feature maps. For this reason, it is also called "downsampling". The factor to which the downsampling will be done is called "stride" or "downsampling factor". The pooling stride is denoted by "s". In one type of pooling, called "max-pool", the maximum value is selected for each stride. For example, consider max-pooling with $s=2$ is applied to a 12-dimensional vector $x=[1, 10, 8, 2, 3, 6, 7, 0, 5, 4, 9, 2]$. Max-pooling vector x with stride $s=2$ means we select the maximum value out of every two values starting from the index 0, resulting in the vector [10, 8, 6, 7, 5, 9]. Therefore, max-pooling vector x with stride $s=2$ results in a 6-dimensional vector. In the example, VGG-16 architecture, max-pooling is performed over a 2×2 pixels window, with stride 2.

FIG. 12B illustrates that image size is reduced after passing through each of the five convolutional layers and respective max pooling layers in the VGG model. The input image has dimensions of 224×224 pixels. The image size is reduced to 112×112 pixels after passing through the first convolutional layer labeled as conv1 (1220) and the max pooling layer (1230). The image size is reduced to 56×56 pixels after passing through the second convolutional layer labeled as conv2 (1222) and the max pooling layer (1232). The third convolutional layer labeled as conv 3 (1224) and the max pooling layer (1234) reduce the image size to 28×28 pixels. The fourth convolutional layer labeled as conv 4 (1226) and the max pooling layer (1236) reduce the image size to 14×14 pixels. Finally, fifth convolutional layer labeled as conv 5 (1228) and the max pooling layer (1238) reduce the image size to 7×7 pixels.

Three Fully-Connected (FC) layers 1240, 1242, and 1244 follow a stack of convolutional layers. The first two FC layers 1240 and 1242 have 4096 channels each, the third FC layer 1244 performs 1000-way classification and thus contains 1000 channels (one for each class). The final layer is the soft-max layer. The depth of convolutional layers can vary in different architectures of the VGG model. The configuration of the fully connected layers can be same in different architectures of the VGG model.

FIG. 12C illustrates the VGG-16 architecture 1270 applied by the technology disclosed for detection task. The model architecture illustrates parameter values for the five convolutional layers conv1 through conv5 and three fully connected layers fc 6 to fc 8. The output from the final FC layer 1244 produces two outputs classifying the section image as normal or failed. The labels in FIG. 12C correspond to respective elements in the architecture diagram in FIG. 12B.

Network Architecture of RESNET-18 Model

The ResNet architecture (He et al. CVPR 2016, available at <<arxiv.org/abs/1512.03385>>) was designed to avoid problems with very deep neural networks. Most predominately, the use of residual connections helps to overcome the vanishing gradient problem. We used ResNet-18 architecture which has 18 trainable layers. FIGS. 12D and 12E illustrate the example ResNet-18 architecture 1280. The architecture of the ResNet-18 is organized in four layers 1260, 1262 as shown in FIG. 12D) and 1264, 1268 as shown in FIG. 12E. Each layer comprises two blocks labeled as "0" and "1". Each block comprises two convolutional layers labeled as "conv1" and "conv2". There is one convolutional layer 1259 before the layer 1 block (1260). Therefore, there are a total of 17 convolutional layers separated by batch normalization and ReLU. One Fully-Connected (FC) layer (1270) at the end produces two outputs. This architecture is used for detection task in which the network classifies the section images into normal (or good) and failed (or bad) images.

The training of deep learning models with tens of convolutional layers is challenging as the distribution of inputs to layers deep in the network may change after each mini batch when weights are updated. This reduces the convergence speed of the model. Batch normalization (Ioffe and Szegedy 2015, available at <<arxiv.org/abs/1502.03167>>) technique can overcome this problem. Batch normalization standardizes the inputs to a layer for each mini batch and reduces the number of epochs required to train the deep learning model.

Performance Comparison—Feature Engineering and Deep Learning Models

Figure 13:
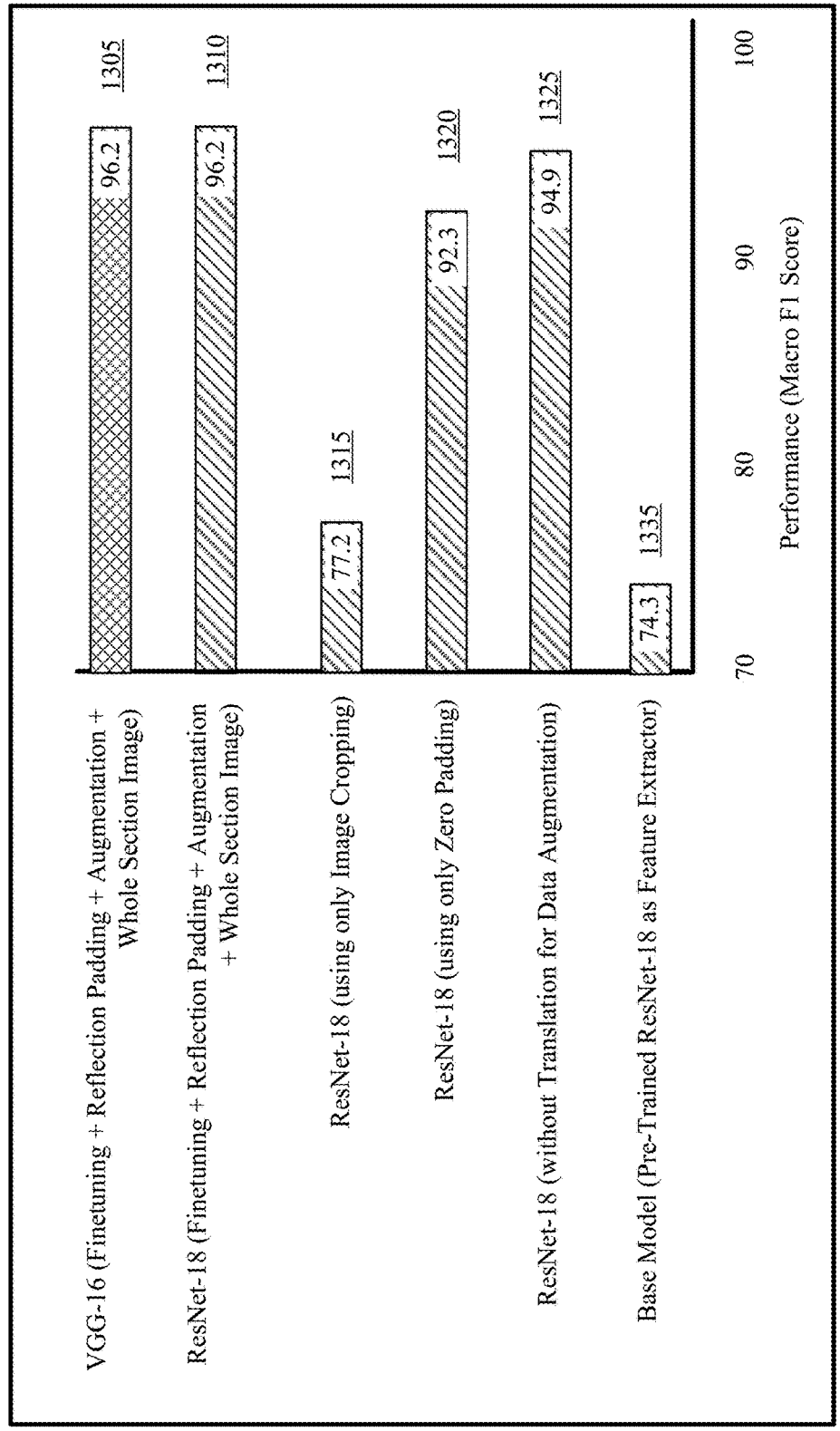
FIG. 13 presents performance of two example convolutional neural networks using different feature engineering techniques.

We compared performance of two models ResNet-18 and VGG-16 using the augmented input data generated by applying feature engineering techniques presented above. The illustration 1300 in FIG. 13 presents the results of performance comparison using macro F1 scores. Macro F1 performance scores can be considered to reflect a combination of precision and recall values. For example, F1 score can combine precision (p) and recall (r) values with an equal weight as shown in Equation (1) below. Macro F1 score can be calculated as average of F1 scores for all failure categories.

$$F_1(r, p) = \frac{2rp}{r+p} \quad (1)$$

Referring back to results in FIG. 13, the top two bars 1305 and 1310, respectively present the scores for VGG-16 and ResNet-18 models. Both models produced same macro F1 (or $F_1$) performance scores of 96.2 when trained with the fine-tuning approach to transfer learning. Both VGG-16 and ResNet-18 models were trained on whole section images of the image generating chip. Reflection padding was used to fill the larger sized analysis frames as described above. Training data is augmented by making copies of images. The system can augment the training data by making multiple copies of labeled images in one class (such as one failure class) to balance the dataset when images belonging to this class are fewer as compared to images belonging to one or more other classes. Alternatively, an image copy can be used multiple times during training to balance the training data.

The graph in FIG. 13 also illustrates performance of ResNet-18 model with different feature engineering techniques the third to fifth bars of the performance comparison graph. The third bar 1315 illustrates that a score of 77.2 is achieved when ResNet-18 model is trained using only cropping technique for feature engineering. The results are not good when only cropping is used for training data generation because many defects do not occur in central part of section images. Therefore, such defects can be missed by the model during training. The fourth bar 1320 shows that the performance score is 92.3 when ResNet-18 model is trained with training data generated using zero padding is used to fill areas in analysis frames surrounding section images. Zero-padding does not perform well because of the unnatural (dark colored) region in analysis frame surrounding the position of section image. The fifth bar from the top labeled 1325 shows that the performance score is 94.9 when ResNet-18 model is trained using training data augmented by making copies of the labeled images. In this case translation is not used to create additional training data variations.

The bar 1335 at the bottom of graph 1300 presents the performance for the base model. The base model is ResNet-18 CNN which is used as a feature extractor with no finetuning. Feature engineering technique such as reflection padding is not used. Data augmentation is also not used. The score for the base model is 74.3.

Figure 14:
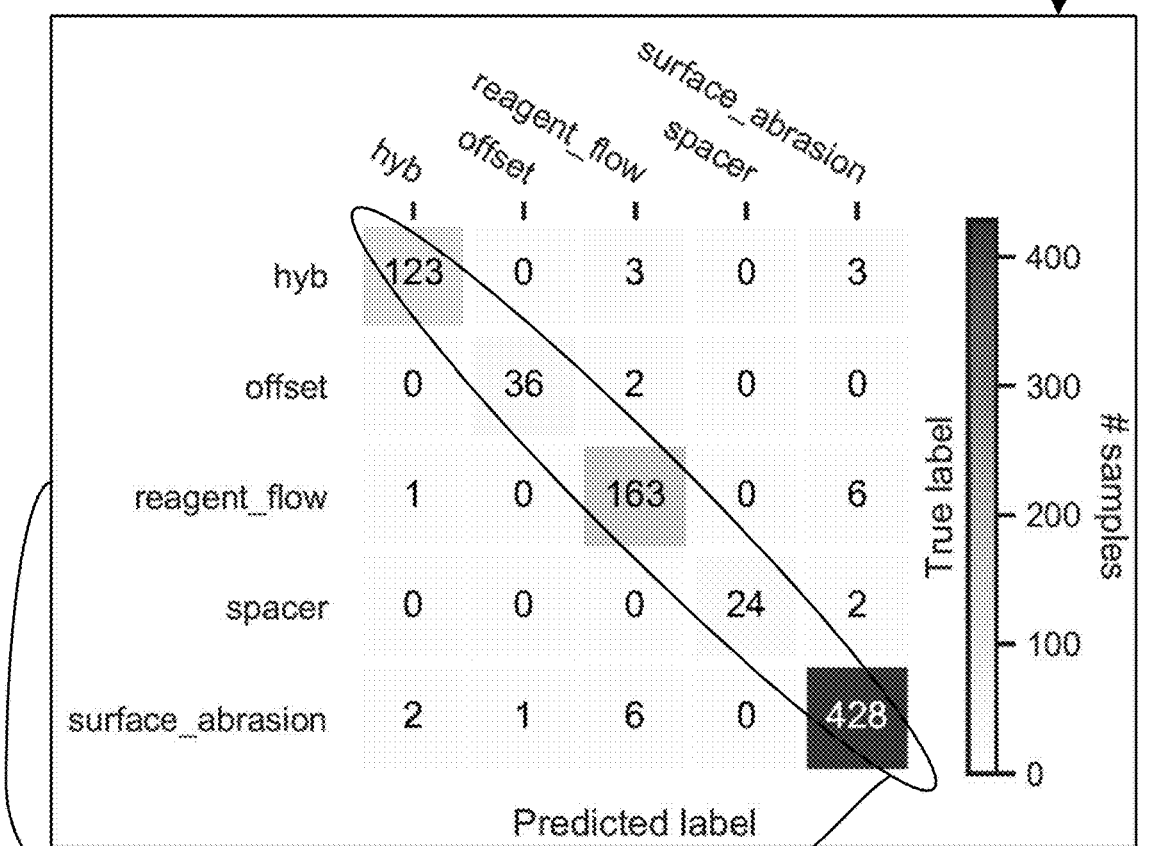
FIG. 14 presents summary of model performance metrics for failure categories.

FIG. 14 presents breakdown of performance scores by failure category of the best performing model disclosed. The best model achieved an overall macro F1 score of 97% and accuracy of 96%. The table 1401 in FIG. 14 presents F1 scores for different failure categories, examples of which are presented above in FIGS. 5A-5I.

A confusion matrix 1420 illustrates the performance of the model in terms of predicted labels vs. true labels for five failure categories. Most of the defect categories are predicted correctly as indicated by values on the diagonal (labeled 1425). A vertical bar on the right indicates the number of samples with different failure categories. The number of samples with a particular type of failure can be calculated by summing the numbers in a row for that failure type (labeled 1430). For example, the number of samples containing offset and spacer type failures are 38 and 26 respectively. The correct predictions for a failure category can be determined by looking at the values in the diagonal. For example, the model correctly predicted 36 samples with offset failures and 24 samples with space shift failures. Similarly, out of 129 samples with hybridization or "hyb" failures, 123 were predicted correctly. The model predicted 163 samples with reagent flow failures correctly out of a total of 170 samples with reagent flow failure. The highest number of samples contained surface abrasion failures. Out of a total of 437 samples with abrasion failures, a total of 428 samples were predicted correctly.

Misclassified Samples

Figure 15:
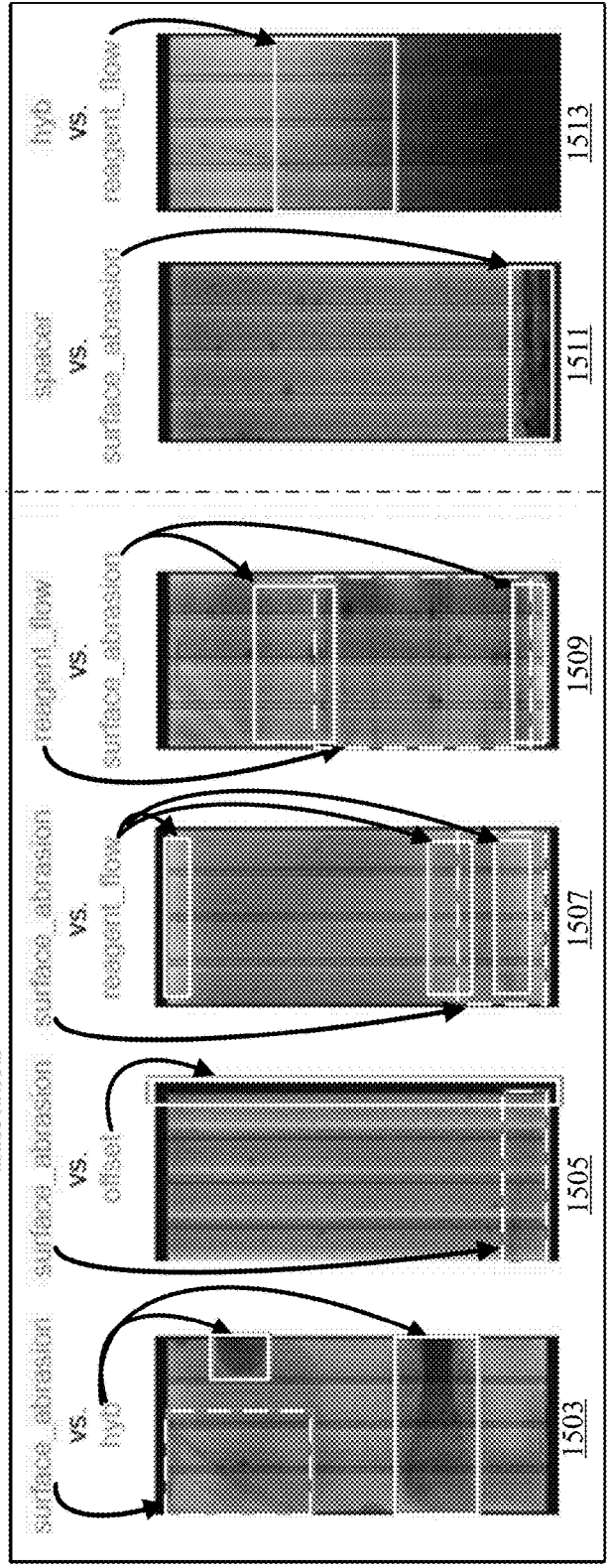
FIG. 15 presents examples of failed section images with mixed defects indicating manually annotated defect labels and predicted defect categories.

FIG. 15 presents an analysis of six images, from the 26 misclassifications in the confusion matrix presented in FIG. 14. For each section image, the manually annotated failure label is listed in the top row and the predicted label from the model is listed in the bottom row. Some images were misclassified by the deep learning model and others were misclassified by the humans who labeled the training set.

Four sample images from the left 1503, 1505, 1507, and 1509 have multiple defects belonging to different failure categories. The manual annotation represents only one of the multiple defects. For example, the first image on the left (labeled 1503) is labeled as having surface abrasion by a human annotator. The surface abrasion is present in the top left portion of the image as indicated in the bounding box. The model predicted the image as having hybridization or hyb failure. It can be seen that the image has hyb failure on two locations, in a top right portion of the image and near the bottom of the image as pointed by the arrows.

The last two images 1511 and 1513 were incorrectly labeled by the human annotator and the deep learning model correctly predicted these images. For example, the fifth image from the left (labeled 1511) is labeled as having spacer shift failure. However, the model predicted the image as having surface abrasion failure. The human annotator may have incorrectly identified the failure category due to close positioning of the dark portion of the image to the bottom edge of the image. Similarly, the sixth image from the left (labeled 1513) is labeled as having hybridization or hyb failure by the human annotator. The model predicted the failure category as reagent flow failure which is the correct failure category for the image. Thus, performance of the machine learning is even better than indicated by the F1 scores.

Performance Improvement by Using Deep Learning

We compared the performance of deep learning-based approach (deepIBEX) with the earlier solutions using random forest model (IBEX) on the same split of the dataset. The results show that, in both tasks of anomaly detection (separating good vs. bad images) and classification (identifying root cause of bad images), the deepIBEX performs better than IBEX, measured by the macro F1 score and accuracy.

Methodology

The dataset of section images is split into the training, validation, and test sets, with the ratios of samples: 70%, 15%, and 15%. For the two models (deepIBEX and IBEX) compared here, we used the same split of dataset for tuning parameters, training, and evaluation. We tuned the model hyperparameters on the training and validation sets, using random grid search. We evaluated the model performance on the test set finally.

Parameters Tested

Ten sets of hyperparameters were examined for each model through random grid search. In IBEX, the major hyperparameters we tuned are the final dimension of PCA and the depth of trees in the random forest. In deepIBEX, we tuned the learning rate, batch size, momentum.

Macro F1 Score and Accuracy Measure

The deepIBEX model performed better than the IBEX model, as indicated by Macro F1 scores and accuracy. F1 score of each category can be defined as the harmonic mean of the recall and precision of that category. F1 score can also be calculated using equal weights for precision and recall as shown in Equation (1) above. Macro F1 score can be calculated as the average of F1 scores of all failure categories. Macro F1 score and accuracy measure the performance of model on the test set is presented in the table below (Table 1). A higher macro F1 score, or higher accuracy means better performance of the model on the test data. Accuracy is defined as the proportion of correctly labeled samples among all the test samples. For both detection and classification, deepIBEX outperformed IBEX.

TABLE 1

Comparison of DeepIBEX and IBEX Models

| Task | Model | Parameters | Macro F1 Score (%) | Accuracy (%) |
|---|---|---|---|---|
| Detection | deepIBEX | Finetune | 88.9 | 94.4 |
| Detection | IBEX | 200 Components, depth = 5 | 80.5 | 89.1 |
| Detection | GaussianNB | 50 Components | 76.2 | 89.0 |
| Classification | deepIBEX | Finetune | 96.2 | 96.8 |
| Classification | IBEX | 150 Components, depth = 50 | 68.5 | 75.4 |
| Classification | GaussianNB | 50 Components | 69.7 | 72.5 |

Process Flow for Training and Applying a Good Vs. Bad Classifier

Figure 16:
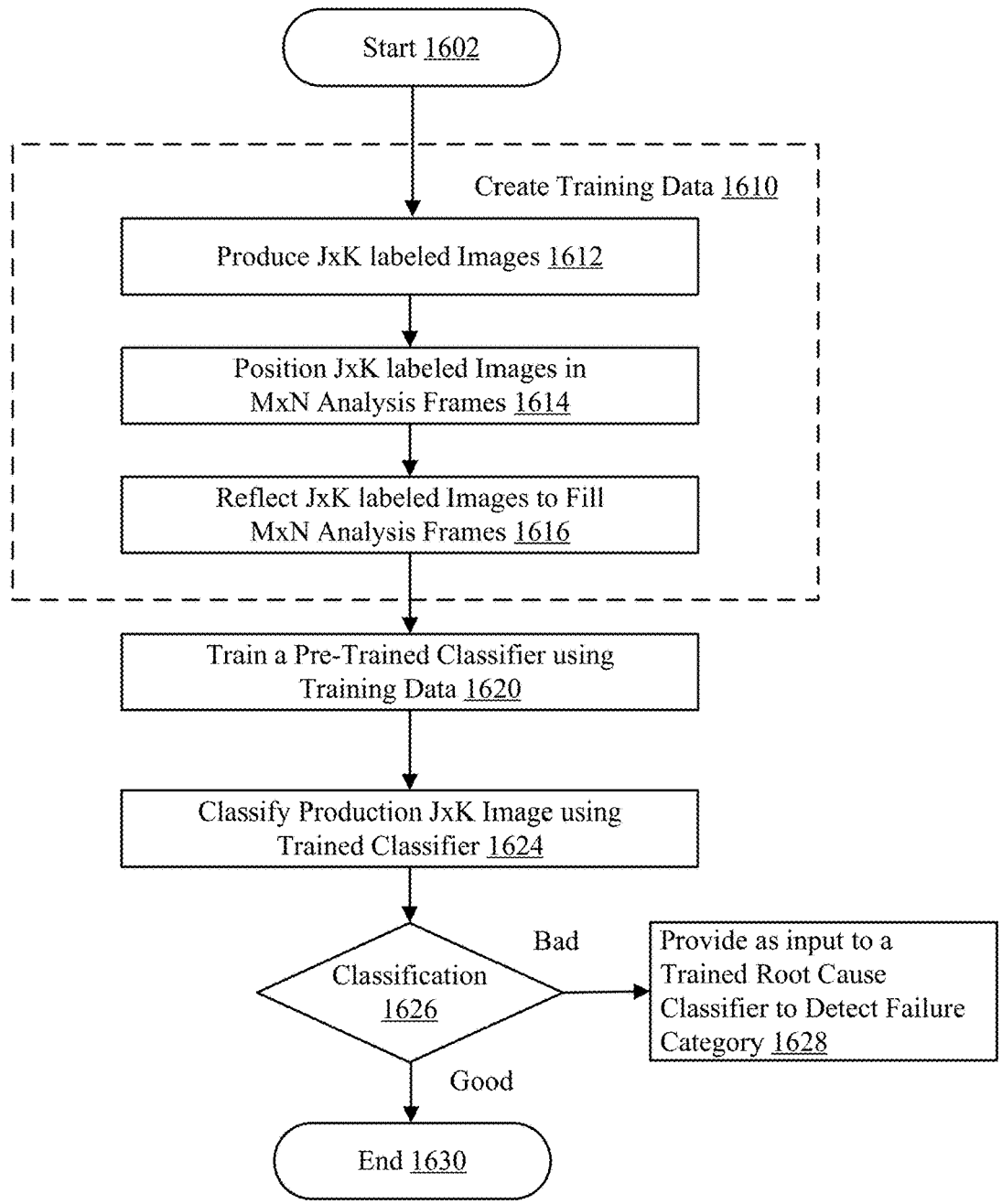
FIG. 16 presents a process flowchart for training a good vs. bad classifier and applying the trained classifier to classify images of sections of an image generating chip.

FIG. 16 presents a flowchart 1601 presenting process steps for training a good vs. bad classifier and applying the trained classifier to classify production images of sections of an image generating chip.

The processing steps presented in the flowchart 1601 can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. Furthermore, it will be appreciated that the flowchart herein shows only steps that are pertinent to an understanding of the technology, and it will be understood that numerous additional steps for accomplishing other functions can be performed before, after and between those shown.

The process starts at a step 1602. A create training data process step 1610 can include multiple operations (1612, 1614, and 1616) that can be performed to create training data comprising labeled images of sections of an image generating chip. The training data creation can include producing J×K labeled images (step 1612). This step can include cropping out portions from larger images to produce the J×K labeled images. The J×K labeled images can be positioned at multiple locations in M×N analysis frames (step 1614). The M×N analysis frames are sized to match the input image size required by the convolutional neural networks (CNNs). The J×K image may not completely fill the M×N analysis frame as these can be smaller in size to M×N analysis frames. Further, the M×N analysis frames can be square-shaped and the J×K images can be rectangular-shaped. At a step 1616, one portion of the J×K labeled image positioned in the M×N analysis frame can be used to fill in around edges of J×K labeled image. Horizontal reflection can be used to fill the M×N analysis frame along left and right edges of the analysis frame. Vertical reflection can be used to fill the M×N analysis frame along top and bottom edges of the M×N analysis frame. The steps presented above can be repeated to produce many training examples by varying the position of a same J×K labeled image in the M×N analysis frame.

A convolutional neural network (CNN) can be trained at a step 1620 using the training data generated by performing process steps presented above. The system can train a pre-trained CNN such as VGG-16 or ResNet-18 models. The trained CNN model can then be applied to production images of sections to classify the images as good or bad (step 1624). Feature engineering techniques such as reflection padding can be applied to production images of sections of image generating chip to fill M×N input frames to the CNN model. Images classified as good or normal by the classifier can indicate a successfully completed process. The images classified as bad or failed can indicate process failure (step 1626). The process can continue at a step 1628 to further classify the bad process cycle images to determine the root cause of failure. If the production image is classified as good, the process can end at a step 1630.

Particular Implementations

The technology disclosed applies image classification for evaluation and root cause analysis of genotyping process. Two tasks are performed by the classifiers: separation of successful and unsuccessful production images, then root cause analysis of unsuccessful images.

Training and Inference of Good Vs. Bad Classifier

We first present classification of successful and unsuccessful production images. In one implementation of the technology disclosed, a method is described for training a convolutional neural network (CNN) to identify and classify images of sections of an image generating chip from bad or failed or unsuccessful process resulting in process cycle failures. The method includes using a convolutional neural network (CNN), pretrained to extract image features. The pretrained CNN can accept images of dimensions M×N. Examples of image dimensions for input to CNNs can include 224×224 pixels, 227×227 pixels, 299×299 pixels. Alternatively, the size of input images to a CNN can be in the range of 200 to 300 pixels on a side or in the range of 75 to 550 pixels on a side. The input images can be square-shaped or rectangular-shaped. The method includes creating a training data set using labeled images of dimensions J×K, which is smaller than M×N, that are normal and that depict process failure. Example dimensions of J×K sized labeled images are 180×80, 224×100 pixels, 200×90 pixels, 120×120 pixels, 224×224 pixels, 504×224 pixels, etc. The method includes creating a training data set using labeled images of dimensions J×K, which is smaller than M×N, that are normal and that depict process failure. The images are from sections of the image generating chip. The method includes positioning the J×K labeled images at multiple locations in M×N (224×224) frames. The method includes using at least one portion of a particular J×K labeled image to fill in around edges of the particular J×K labeled image, thereby filling the M×N frame.

The method includes further training the pretrained CNN to produce a section classifier using the training data set. The method includes storing coefficients of the trained classifier to identify and classify images of sections of the image generating chip from production process cycles. The trained classifier can accept images of sections of the image generating chip and classify the images as normal or depicting process failure.

In a production implementation, the trained CNN can be applied to identify bad process cycle images of sections of an image generating chip. We now present a method of identifying bad process cycle images of sections of an image generating chip causing failure of process cycle. The method includes creating input to a trained classifier.

The input can either fill the M×N input aperture of the image processing framework, or it can have smaller dimensions J×K and be reflected to fill the M×N analysis frame. Taking the later approach, the creation of input includes accessing the image of the section having dimensions J×K. The method includes positioning the J×K image in an M×N analysis frame. The method includes using horizontal and/or vertical reflections along edges of the J×K image positioned in the M×N analysis frame to fill the M×N analysis frame. Depending on the relative size of J×K vs M×N, some zero padding could be applied, for instance to fill narrow strips along the top and bottom of the analysis frame, but reflection was found to perform better. The method includes inputting to the trained classifier the M×N analysis frame. The method includes using the trained classifier to classify the image of the section of the image generating chip as normal or depicting process failure. The method includes outputting a resulting classification of the section of the image generating chip.

This method implementation and other methods disclosed optionally include one or more of the following features. This method can also include features described in connection with methods presented above. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

In one implementation, the method further includes positioning the J×K image in a center of the M×N analysis frame.

In one implementation, the method includes applying horizontal reflection to the at least one portion of the particular J×K labeled image to fill in around edges of the particular J×K labeled image in the M×N analysis frame.

In one implementation, the method includes applying vertical reflection to the at least one portion of the particular J×K labeled image to fill in around edges of the particular J×K labeled image in the M×N analysis frame.

In one implementation, the producing the J×K labeled images by cropping out portions from larger images and placing the J×K cropped out portions in the M×N frames. Examples of larger image sizes include images of dimensions 504×224 pixels or even larger images.

The labeled images of dimensions J×K can be obtained by downsampling high resolution images from a scanner resulting in reduction in resolution of the high-resolution images by ½ to ⅟₅₀ times per side of the original resolution in pixels. Reduction to ⅟₂₅ times per side reduces the count of pixels to ⅟₆₂₅ of the original pixel count. In one implementation, the high-resolution images of sections obtained from the scanner or the genotyping instrument have a size of 3600×1600 pixels.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer-implemented methods described above. Alternatively, the program instructions can be loaded on a non-transitory CRM and, when combined with appropriate hardware, become a component of one or more of the computer-implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

Training and Inference Root Cause Analysis

In one implementation of the technology disclosed, a method is described for training a convolutional neural network (CNN) to classify images of sections of an image generating chip by root cause of process failure. The method includes using a CNN, pretrained to extract image features. The pretrained CNN can accept images of dimensions M×N. Examples of image dimensions include 224×224 pixels. The method includes creating a training data set using labeled images of dimensions J×K, that belongs to at least one failure category from a plurality of failure categories resulting in process failure. Example dimensions of J×K sized labeled images are 180×80, 200×90 pixels, etc. The images are from sections of the image generating chip. The method includes positioning the J×K labeled images at multiple locations in M×N (224×224) frames. The method includes using at least one portion of a particular J×K labeled image to fill in around edges of the particular J×K labeled image, thereby filling the M×N frame. The method includes further training the pretrained CNN to produce a section classifier using the training data set. The method includes storing coefficients of the trained classifier to identify and classify images of sections of the image generating chip from production process cycles. The trained classifier can accept images of sections of the image generating chip and classify the images by root cause of process failure, among the plurality of failure categories.

In a production implementation, the trained CNN can be applied to classify bad process cycle images of sections. We now present a method of identifying and classifying bad process cycle images of sections of an image generating chip causing failure of process cycle. The method includes creating input to a trained classifier.

The input can either fill the M×N input aperture of the image processing framework, or it can have smaller dimensions J×K and be reflected to fill the M×N analysis frame. Taking the later approach, the creation of input includes accessing the image of the section having dimensions J×K. The method includes positioning the J×K image in an M×N analysis frame. The method includes using horizontal and/or vertical reflections along edges of the J×K image positioned in the M×N analysis frame to fill the M×N analysis frame. Depending on the relative size of J×K vs M×N, some zero padding could be applied, for instance to fill narrow strips along the top and bottom of the analysis frame, but reflection was found to perform better. The method includes inputting to the trained classifier the M×N analysis frame. The method includes using the trained classifier to classify the image of the section of the image generating chip by root cause of process failure, among a plurality of failure categories. The method includes outputting a resulting classification of the section of the image generating chip.

This method implementation and other methods disclosed optionally include one or more of the following features. This method can also include features described in connection with methods presented above. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

In one implementation, the method further includes positioning the J×K image in a center of the M×N analysis frame.

In one implementation, the method includes applying horizontal reflection to the at least one portion of the particular J×K labeled image to fill in around edges of the particular J×K labeled image in the M×N analysis frame.

In one implementation, the method includes applying vertical reflection to the at least one portion of the particular J×K labeled image to fill in around edges of the particular J×K labeled image in the M×N analysis frame.

In one implementation, the producing the J×K labeled images by cropping out portions from larger images and placing the J×K cropped out portions in the M×N frames. Examples of larger image sizes include images of dimensions 504×224 pixels or even larger images.

The labeled images of dimensions J×K are obtained by downsampling high resolution images from a scanner resulting in reduction in resolution of the high-resolution images by ½ to ⅟₅₀ times the original resolution. In one implementation, the high-resolution images of sections obtained from the scanner or the genotyping instrument have a size of 3600×1600 pixels.

The plurality of failure categories can include at least a hybridization failure, a space shift failure, an offset failure, a surface abrasion failure, and a reagent flow failure.

The plurality of failure categories can include a residual failure category indicating unhealthy patterns on images due to unidentified causes of failure.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer-implemented methods described above. Alternatively, the program instructions can be loaded on a non-transitory CRM and, when combined with appropriate hardware, become a component of one or more of the computer-implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

Combined, Single Pass Good Vs Bad Detection and Root Cause of Process Failure

In one implementation of the technology disclosed, a method is described for training a convolutional neural network (CNN) to identify and classify images of sections of an image generating chip from bad process cycles resulting in process cycle failures. The method includes using a CNN, pretrained to extract image features. The pretrained CNN can accept images of dimensions M×N. The method includes creating a training data set using labeled images of dimensions J×K, that are normal and that belong to at least one failure category from a plurality of failure categories resulting in process failure. The images are from sections of the image generating chip. The method includes positioning the J×K labeled images at multiple locations in M×N (224× 224) frames. The method includes using at least one portion of a particular J×K labeled image to fill in around edges of the particular J×K labeled image, thereby filling the M×N. The method includes further training the pretrained CNN to produce a section classifier using the training data set. The method includes storing coefficients of the trained classifier to identify and classify images of sections of the image generating chip from production process cycles. The trained classifier can accept images of sections of the image generating chip and classify the images as normal or as belonging to at least one failure category from a plurality of failure categories resulting in process failure.

In a production implementation, the trained CNN can be applied to classify bad process cycle images of sections. We present a method of identifying bad process cycle images of sections of an image generating chip causing failure of process cycle. The method includes creating input to a trained classifier.

The input can either fill the M×N input aperture of the image processing framework, or it can have smaller dimensions J×K and be reflected to fill the M×N analysis frame. Taking the later approach, the creation of input includes accessing the image of the section having dimensions J×K. The method includes positioning the J×K image in an M×N analysis frame. The method includes using horizontal and/or vertical reflections along edges of the J×K image positioned in the M×N analysis frame to fill the M×N analysis frame. Depending on the relative size of J×K vs M×N, some zero padding could be applied, for instance to fill narrow strips along the top and bottom of the analysis frame, but reflection was found to perform better. The method includes inputting to the trained classifier the M×N analysis frame. The method includes using the trained classifier to classify the image of the section of the image generating chip as normal or as belonging to at least one failure category from a plurality of failure categories. The method includes outputting a resulting classification of the section of the image generating chip.

This method can also include features described in connection with methods presented above. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer-implemented methods described above. Alternatively, the program instructions can be loaded on a non-transitory CRM and, when combined with appropriate hardware, become a component of one or more of the computer-implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

Computer System

Figure 17:
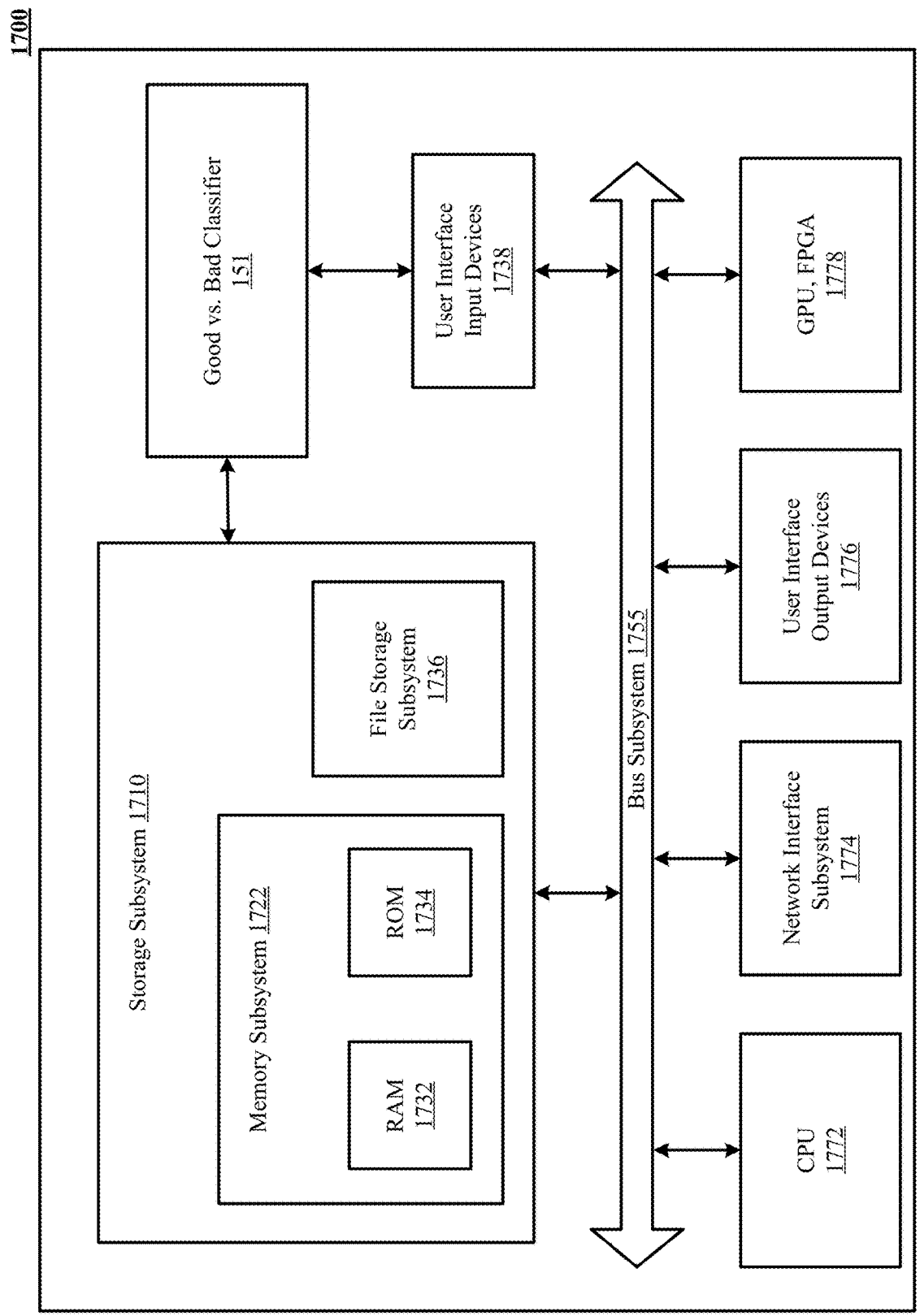
FIG. 17 is a simplified block diagram of a computer system that can be used to implement the technology disclosed.

FIG. 17 is a simplified block diagram of a computer system 1700 that can be used to implement the technology disclosed. Computer system typically includes at least one processor 1772 that communicates with a number of peripheral devices via bus subsystem 1755. These peripheral devices can include a storage subsystem 1710 including, for example, memory subsystem 1722 and a file storage subsystem 1736, user interface input devices 1738, user interface output devices 1776, and a network interface subsystem 1774. The input and output devices allow user interaction with computer system. Network interface subsystem provides an interface to outside networks, including an interface to corresponding interface devices in other computer systems.

In one implementation, the Good vs. Bad classifier 151 to classify bad images is communicably linked to the storage subsystem and user interface input devices.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices 1776 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system to the user or to another machine or computer system.

Storage subsystem 1710 stores programming and data constructs that provide the functionality of some or all of the modules and methods described herein. These software modules are generally executed by processor alone or in combination with other processors.

Memory used in the storage subsystem can include a number of memories including a main random access memory (RAM) 1732 for storage of instructions and data during program execution and a read only memory (ROM) 1734 in which fixed instructions are stored. The file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem in the storage subsystem, or in other machines accessible by the processor.

Bus subsystem 1755 provides a mechanism for letting the various components and subsystems of computer system communicate with each other as intended. Although bus subsystem is shown schematically as a single bus, alternative implementations of the bus subsystem can use multiple busses.

Computer system itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system depicted in FIG. 17 is intended only as a specific example for purposes of illustrating the technology disclosed. Many other configurations of computer system are possible having more or less components than the computer system depicted in FIG. 17.

The computer system 1700 includes GPUs or FPGAs 1778. It can also include machine learning processors hosted by machine learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligent Processor Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

What is claimed is:

1. A method of training a convolutional neural network to identify and classify images of sections of an image generating chip resulting in process failure, the method comprising:
    using the convolutional neural network, pretrained to extract image features, wherein the pretrained convolutional neural network accepts images of dimensions M×N;
    creating a training data set using labeled images of dimensions J×K, which is smaller than the dimensions M×N, that depict process success and failure;
    the labeled images are from the sections of the image generating chip,
    positioning the J×K labeled images at multiple locations in at least one M×N frame,
    using at least one portion of a particular J×K labeled image to fill in around edges of the particular J×K labeled image, thereby filling the at least one M×N frame;
    further training the pretrained convolutional neural network to produce a trained classifier using the training data set; and
    storing coefficients of the trained classifier to identify and classify images of sections of the image generating chip from production process cycles.

2. The method of claim 1, wherein the trained classifier is configured to accept the images of the sections of the image generating chip and classify the images as depicting process success and failure.

3. The method of claim 1, wherein the using the at least one portion of the particular J×K labeled image to fill in around the edges of the particular J×K labeled image, further comprises:
    applying horizontal reflection to the at least one portion of the particular J×K labeled image.

4. The method of claim 1, wherein the using the at least one portion of the particular J×K labeled image to fill in around the edges of the particular J×K labeled image, further comprises:
    applying vertical reflection to the at least one portion of the particular J×K labeled image.

5. The method of claim 1, wherein the creating the training data set using the labeled images of dimensions J×K, further comprises:
    producing the J×K labeled images by cropping out portions from larger images and placing the J×K cropped out portions in the at least one M×N frame.

6. The method of claim 1, wherein the labeled images of dimensions J×K are obtained by downsampling high-resolution images from a scanner resulting in reduction in resolution of the high-resolution images by ½ to ⅟₅₀ times per side.

7. The method of claim 6, wherein the high-resolution images obtained from the scanner have a size of 3600×1600 pixels.

8. The method of claim 1, further comprising, identifying process cycle images of sections of the image generating chip causing failure of process cycle, including:
    creating input to the trained classifier including:
    accessing the image of the section having the dimensions J×K,
    positioning the J×K image in an M×N analysis frame,
    inputting to the trained classifier the M×N analysis frame;
    applying the trained classifier, classifying the image of the section of the image generating chip as good or failed; and outputting a resulting classification of the section of the image generating chip.

9. The method of claim 8, wherein the creating the input to the trained classifier, further comprises:
using at least one portion of a particular J×K labeled image to fill in around edges of the particular J×K labeled image, thereby filling the M×N analysis frame.

10. At least one non-transitory computer readable storage medium impressed with computer program instructions to identify and classify images of sections of an image generating chip resulting in process failure, including, the instructions, when executed on at least one processor, are configured to cause the at least one processor to:
use a convolutional neural network, pretrained to extract image features, wherein the pretrained convolutional neural network accepts images of dimensions M×N;
create a training data set using labeled images of dimensions J×K, which is smaller than the dimensions M×N, that depict process success and failure;
the labeled images are from the sections of the image generating chip,
position the J×K labeled images at multiple locations in at least one M×N frame,
use at least one portion of a particular J×K labeled image to fill in around edges of the particular J×K labeled image, thereby filling the at least one M×N frame;
further train the pretrained convolutional neural network to produce a trained classifier using the training data set; and
store coefficients of the trained classifier to identify and classify images of sections of the image generating chip from production process cycles.

11. The non-transitory computer readable storage medium of claim 10, wherein the trained classifier is configured to accept the images of the sections of the image generating chip and classify the images as depicting process success and failure.

12. The non-transitory computer readable storage medium of claim 10, wherein the at least one processor being configured to use the at least one portion of the particular J×K labeled image to fill in around the edges of the particular J×K labeled image, further comprises the at least one processor being configured to:
apply horizontal reflection to the at least one portion of the particular J×K labeled image.

13. The non-transitory computer readable storage medium of claim 10, wherein the at least one processor being configured to use the at least one portion of the particular J×K labeled image to fill in around the edges of the particular J×K labeled image further comprises the at least one processor being configured to:
apply vertical reflection to the at least one portion of the particular J×K labeled image.

14. The non-transitory computer readable storage medium of claim 10, wherein the at least one processor being configured to create the training data set using the labeled images of the dimensions J×K further comprises the at least one processor being configured to:
produce the J×K labeled images by cropping out portions from larger images and placing the J×K cropped out portions in the at least one M×N frame.

15. The non-transitory computer readable storage medium of claim 10, wherein the labeled images of dimensions J×K are configured to be obtained by downsampling high-resolution images from a scanner resulting in reduction in resolution of the high-resolution images by ½ to ¹⁄₅₀ times per side.

16. The non-transitory computer readable storage medium of claim 15, wherein the high-resolution images obtained from the scanner have a size of 3600×1600 pixels.

17. The non-transitory computer readable storage medium of claim 10 wherein the instructions are further configured to cause the at least one processor to:
create input to the trained classifier including being configured to:
access the image of the section having dimensions J×K,
position the J×K image in an M×N analysis frame,
input to the trained classifier the M×N analysis frame;
apply the trained classifier, classifying the image of the section of the image generating chip as good or failed; and
output a resulting classification of the section of the image generating chip.

18. The non-transitory computer readable storage medium of claim 17, wherein the instructions are further configured to cause the at least one processor to:
use at least one portion of a particular J×K labeled image to fill in around edges of the particular J×K labeled image, thereby filling the M×N analysis frame.

19. A system including one or more processors coupled to memory, the memory loaded with computer instructions to identify and classify images of sections of an image generating chip resulting in process failure, the instructions being configured to, when executed on the one or more processors, cause the one or more processors to:
use a convolutional neural network, pretrained to extract image features, wherein the pretrained convolutional neural network accepts images of dimensions M×N;
create a training data set using labeled images of dimensions J×K, which is smaller than the dimensions M×N, that depict process success and failure;
the labeled images are from the sections of the image generating chip,
position the J×K labeled images at multiple locations in at least one M×N frame,
use at least one portion of a particular J×K labeled image to fill in around edges of the particular J×K labeled image, thereby filling the at least one M×N frame;
further train the pretrained convolutional neural network to produce a trained classifier using the training data set; and
store coefficients of the trained classifier to identify and classify images of sections of the image generating chip from production process cycles.

20. The system of claim 19, wherein the trained classifier is configured to accept the images of the sections of the image generating chip and classify the images as depicting process success and failure.

21. The system of claim 19, wherein the instructions being configured to cause the one or more processors to use the at least one portion of the particular J×K labeled image to fill in around the edges of the particular J×K labeled image, further comprises the instructions being configured to cause the one or more processors to:
apply horizontal reflection to the at least one portion of the particular J×K labeled image.

22. The system of claim 19, wherein the instructions being configured to cause the one or more processors to use the at least one portion of the particular J×K labeled image to fill in around the edges of the particular J×K labeled image, further comprises the instructions being configured to cause the one or more processors to:
apply vertical reflection to the at least one portion of the particular J×K labeled image.

23. The system of claim 19, wherein the instructions being configured to cause the one or more processors to create the training data set using the labeled images of the dimensions J×K, further comprises the instructions being configured to cause the one or more processors to:
produce the J×K labeled images by cropping out portions from larger images and placing the J×K cropped out portions in the at least one M×N frame.

24. The system of claim 19, wherein the labeled images of the dimensions J×K are configured to be obtained by downsampling high-resolution images from a scanner resulting in reduction in resolution of the high-resolution images by ½ to 1/50 times per side.

25. The system of claim 24, wherein the high-resolution images are configured to be obtained from the scanner having a size of 3600×1600 pixels.

26. The system of claim 19, wherein the instructions being configured to cause the one or more processors to:
create input to the trained classifier including being configured to:
access the image of the section having dimensions J×K,
position the J×K image in an M×N analysis frame,
input to the trained classifier the M×N analysis frame;
apply the trained classifier, classifying the image of the section of the image generating chip as good or failed; and
output a resulting classification of the section of the image generating chip.

27. The system of claim 26, wherein the instructions being configured to cause the one or more processors to:
use at least one portion of a particular J×K labeled image to fill in around edges of the particular J×K labeled image, thereby filling the M×N analysis frame.

* * * * *